(12) United States Patent
Osawa et al.

(10) Patent No.: US 12,103,144 B2
(45) Date of Patent: Oct. 1, 2024

(54) FASTENING TOOL

(71) Applicant: MAX CO., LTD., Tokyo (JP)

(72) Inventors: Yusuke Osawa, Tokyo (JP); Kazuya Takeuchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/942,811

(22) Filed: Sep. 12, 2022

(65) Prior Publication Data

US 2023/0078681 A1 Mar. 16, 2023

(30) Foreign Application Priority Data

Sep. 14, 2021 (JP) ................................. 2021-149655
Sep. 14, 2021 (JP) ................................. 2021-149656
(Continued)

(51) Int. Cl.
*B25B 21/00* (2006.01)
*B25B 23/00* (2006.01)
(Continued)

(52) U.S. Cl.
CPC .......... *B25B 21/007* (2013.01); *B25B 21/002* (2013.01); *B25B 21/008* (2013.01);
(Continued)

(58) Field of Classification Search
CPC ..... B25B 23/04; B25B 21/007; B25B 21/002; B25B 21/008; B25B 23/0035; B25F 5/001; H02P 23/04; H02P 23/14
See application file for complete search history.

(56) References Cited

U.S. PATENT DOCUMENTS 5,549,169 A * 8/1996 Matsumura ............. B23P 19/06
173/176
7,458,282 B1 * 12/2008 Wuester, Sr. ........... B23P 19/06
414/751.1
(Continued)

FOREIGN PATENT DOCUMENTS

EP 2644322 A2 10/2013
EP 4052848 A1 9/2022
(Continued)

OTHER PUBLICATIONS

Extended European Search Report dated Jan. 31, 2023, issued by the European Patent Office in the corresponding European Patent Application No. 22195069.4. (8 pages).

*Primary Examiner* — Andrew M Tecco
*Assistant Examiner* — Nicholas E Igbokwe
(74) *Attorney, Agent, or Firm* — Banner & Witcoff, Ltd.

(57) ABSTRACT

A fastening tool includes: a bit holding portion which detachably holds a driver bit and is configured to rotate in a circumferential direction of the driver bit and move in an axial direction of the driver bit; a first motor configured to rotate the bit holding portion; a second motor configured to move the bit holding portion along the axial direction; and a control unit configured to control a position of the bit holding portion along the axial direction by the number of rotations of the second motor. The control unit is configured to control a moving speed of a screw moved by rotation of the first motor or a rotation speed of the first motor.

9 Claims, 37 Drawing Sheets

(30) Foreign Application Priority Data

Sep. 14, 2021 (JP) .................................. 2021-149657
Apr. 15, 2022 (JP) .................................. 2022-067701
Apr. 15, 2022 (JP) .................................. 2022-067704

(51) Int. Cl.
*B25B 23/04* (2006.01)
*B25F 5/00* (2006.01)
*H02P 23/04* (2006.01)
*H02P 23/14* (2006.01)
*B25B 23/06* (2006.01)

(52) U.S. Cl.
CPC .......... *B25B 23/0035* (2013.01); *B25B 23/04*
(2013.01); *B25F 5/001* (2013.01); *H02P 23/04*
(2013.01); *H02P 23/14* (2013.01); *B25B 23/06*
(2013.01)

(56) References Cited

U.S. PATENT DOCUMENTS

| | | | | |
|---|---|---|---|---|
| 9,370,848 B2* | 6/2016 | Harada | ............... | B23P 19/06 |
| 2010/0189523 A1* | 7/2010 | Nonaka | ............... | B23B 51/00 |
| | | | | 408/226 |
| 2011/0245833 A1* | 10/2011 | Anderson | ............... | B23B 49/02 |
| | | | | 606/80 |
| 2023/0234175 A1* | 7/2023 | Sugioka | ............... | B25B 23/14 |
| | | | | 81/467 |

FOREIGN PATENT DOCUMENTS

| | | |
|---|---|---|
| JP | 5262461 B2 | 8/2013 |
| JP | 6197547 B2 | 9/2017 |
| WO | 98/10900 A2 | 3/1998 |
| WO | 2020/009159 A1 | 1/2020 |

* cited by examiner

FASTENING TOOL

CROSS-REFERENCE TO RELATED APPLICATIONS

This application is based on and claims priority under 35 USC 119 from Japanese Patent Application No. 2021-149655 filed on Sep. 14, 2021, Japanese Patent Application No. 2021-149656 filed on Sep. 14, 2021, Japanese Patent Application No. 2021-149657 filed on Sep. 14, 2021, Japanese Patent Application No. 2022-067701 filed on Apr. 15, 2022, and Japanese Patent Application No. 2022-067704 filed on Apr. 15, 2022, the contents of which are incorporated herein by reference.

TECHNICAL FIELD

The present disclosure relates to a fastening tool in which a driver bit is engaged with a screw, the screw is pressed against a fastening target by the driver bit, and the driver bit is rotated to screw.

BACKGROUND ART

There is a tool called a portable striking machine which uses an air pressure of compressed air supplied from an air compressor or a combustion pressure of gas to sequentially strike connection stoppers loaded in a magazine from a tip end of a driver guide.

As a tool which rotates a bit to tighten a screw and moves the bit in a direction of tightening the screw, a pneumatic screw driving machine is proposed in the related art, in which the bit is rotated by an air motor and moved in a direction of tightening the screw by an air pressure (for example, see Publication of Japanese Patent No. 5262461).

A screwdriver is proposed in which a spring is compressed by a driving force of a motor which rotates a screw, and the screw is driven by biasing of the spring (for example, see Publication of Japanese Patent No. 6197547).

In a tool having a configuration in which a bit is moved in a direction of tightening a screw, the faster a forward speed of the bit than a forward speed of the screw determined by a rotation speed of the screw, the greater a so-called reaction that separates a tool body from a fastening target. When the reaction becomes large, the tool body may float up from the fastening target, resisting a force with which an operator presses the tool body against the fastening target.

However, if the tool body floats up from the fastening target by the reaction, an operation may be completed in a state where the screw cannot be completely tightened.

Therefore, in order to improve quality of screw tightening, it is necessary to prevent the reaction, that is, to operate the bit (move the bit forward) at an appropriate speed in accordance with the rotation speed of the screw.

However, in a fastening tool in the related art, there is no idea of controlling the forward speed of the bit in accordance with the rotation speed. In both of the screw driving machine which uses the air pressure and the screwdriver which drives the screw by biasing of the spring, it is difficult to control a moving speed of a driver bit by an operation of moving the driver bit in a direction of tightening the screw.

The present disclosure is made to solve such a problem, and an object of the present disclosure is to provide a fastening tool capable of controlling a moving speed of a driver bit by an operation of moving the driver bit in a direction of tightening a screw.

SUMMARY

An aspect of the present disclosure relates to a fastening tool including: a bit holding portion which detachably holds a driver bit and is configured to rotate in a circumferential direction of the driver bit and move in an axial direction of the driver bit; a first motor configured to rotate the bit holding portion; a second motor configured to move the bit holding portion along the axial direction; and a control unit configured to control a position of the bit holding portion along the axial direction by the number of rotations of the second motor. The control unit is configured to control a moving speed of a screw moved by rotation of the first motor or a rotation speed of the first motor.

DESCRIPTION OF EMBODIMENTS

Hereinafter, an embodiment of a fastening tool according to the present disclosure will be described with reference to the drawings.

Configuration Example of Fastening Tool According to Present Embodiment

Figure 1A:
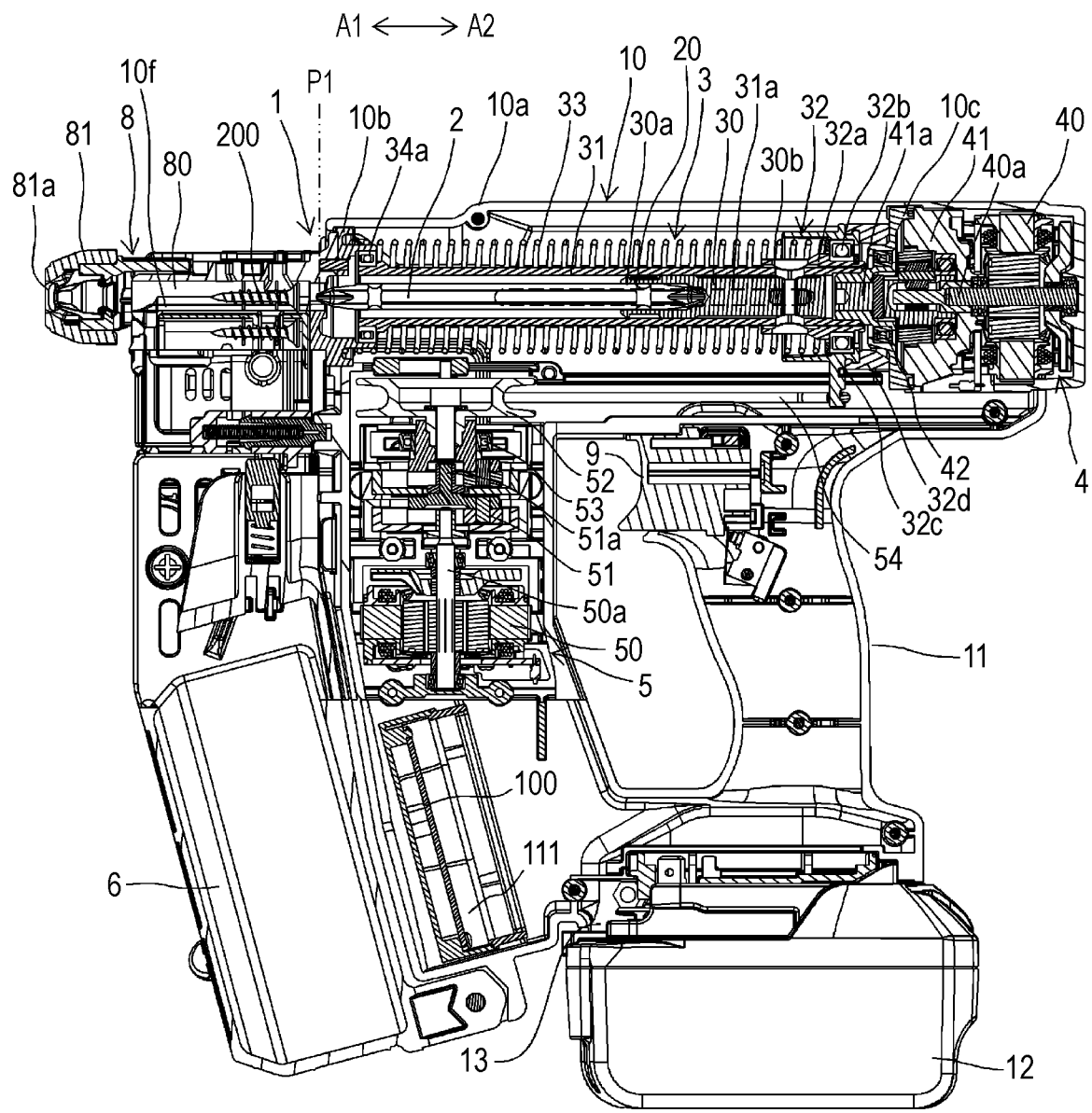
FIG. 1A is a side cross-sectional view showing an example of an internal structure of a fastening tool according to the present embodiment.

FIG. 1A is a side cross-sectional view showing an example of an internal structure of the fastening tool according to the present embodiment.

Figure 1B:
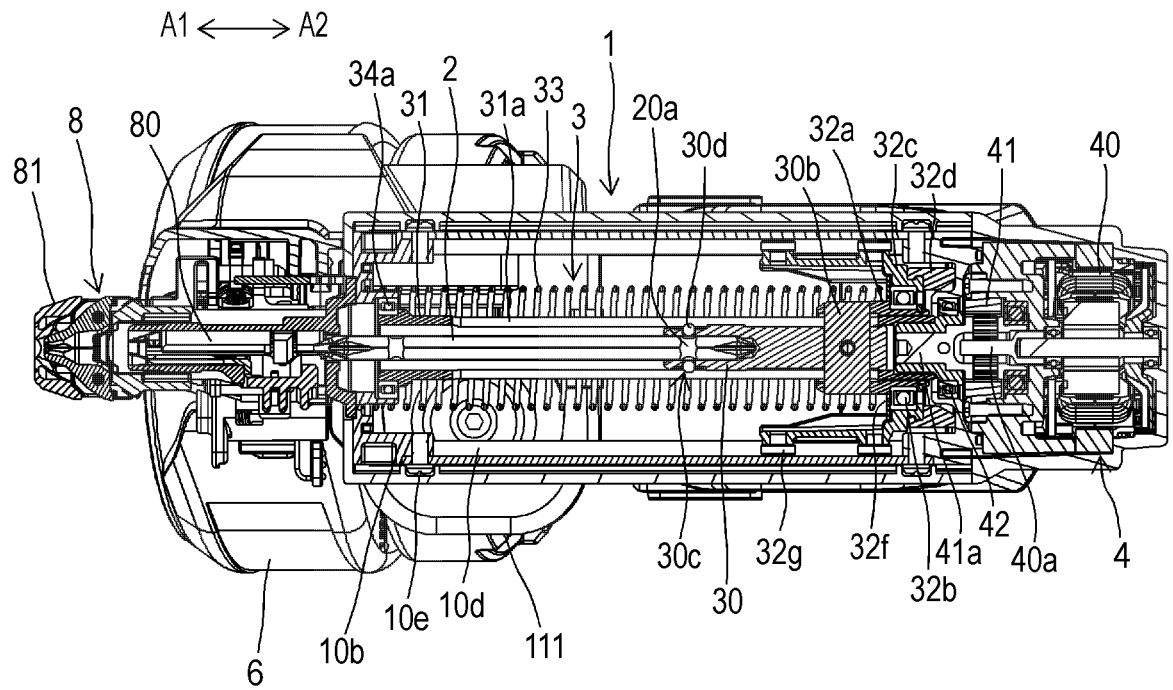
FIG. 1B is a top cross-sectional view showing an example of the internal structure of the fastening tool according to the present embodiment.

FIG. 1B is a top cross-sectional view showing an example of the internal structure of the fastening tool according to the present embodiment.

Figure 1C:
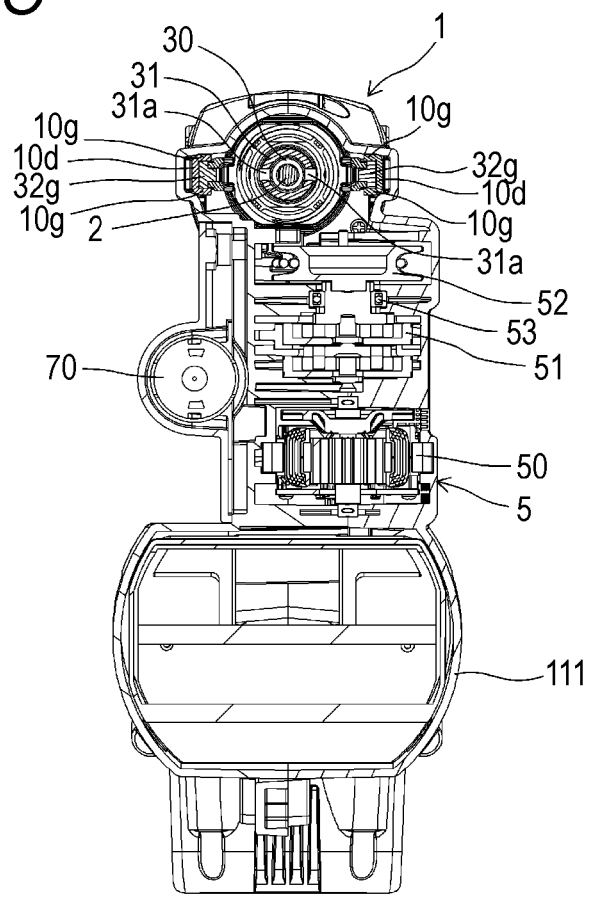
FIG. 1C is a front cross-sectional view showing an example of the internal structure of the fastening tool according to the present embodiment.

FIG. 1C is a front cross-sectional view showing an example of the internal structure of the fastening tool according to the present embodiment.

Figure 2A:
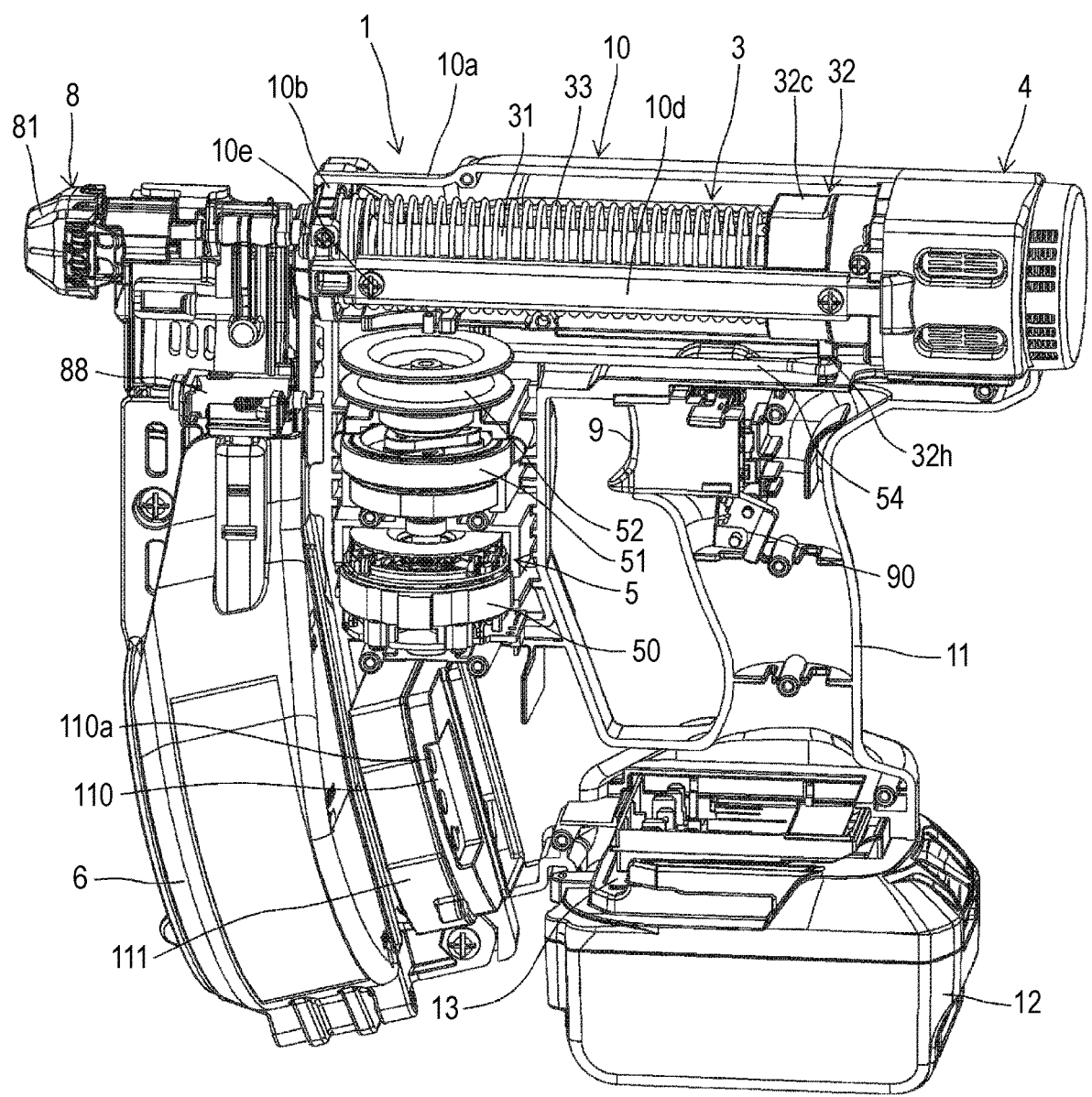
FIG. 2A is an exploded perspective view showing an example of the internal structure of the fastening tool according to the present embodiment.

FIG. 2A is an exploded perspective view showing an example of the internal structure of the fastening tool according to the present embodiment.

Figure 2B:
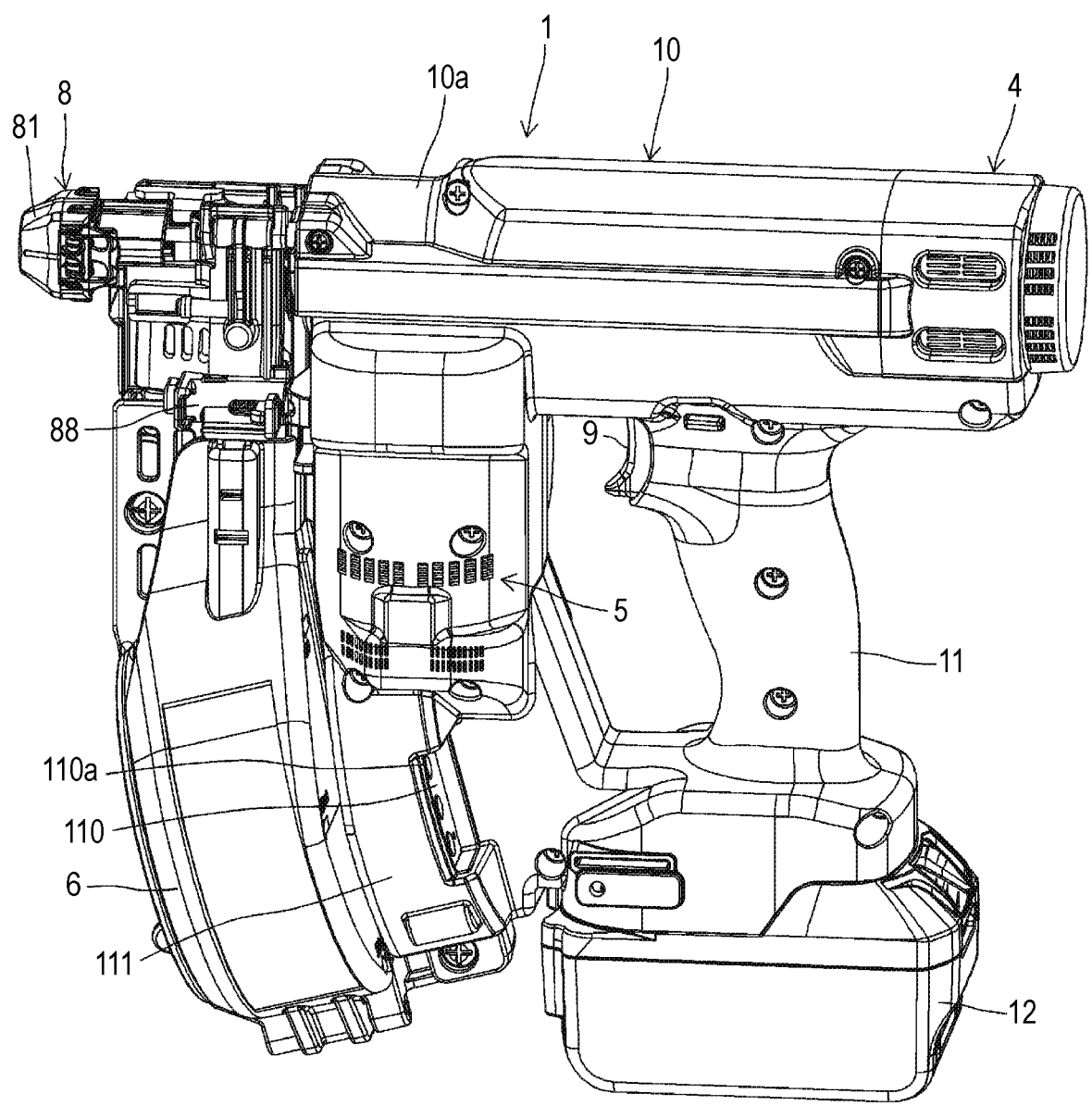
FIG. 2B is an external perspective view showing an example of the fastening tool according to the present embodiment.

FIG. 2B is an external perspective view showing an example of the fastening tool according to the present embodiment.

The fastening tool 1 according to the present embodiment includes a bit holding portion 3 that holds a driver bit 2 so as to be rotatable and movable in an axial direction, a first drive unit 4 that rotates the driver bit 2 held by the bit holding portion 3, and a second drive unit 5 that moves the driver bit 2 held by the bit holding portion 3 in the axial direction.

The fastening tool 1 includes a screw accommodating portion 6 in which a screw 200 is accommodated, a screw feeding portion 7 that feeds the screw accommodated in the screw accommodating portion 6, and a nose portion 8 that is pressed against a fastening target to which the screw 200 is fastened and into which the screw is injected.

Further, the fastening tool 1 includes a tool body 10 and a handle 11. The fastening tool 1 includes a battery attachment portion 13 to which a battery 12 is detachably attached at an end portion of the handle 11.

In the fastening tool 1, the tool body 10 extends in one direction along the axial direction of the driver bit 2 indicated by arrows A1 and A2, and the handle 11 extends in another direction intersecting an extending direction of the tool body 10. In the fastening tool 1, a direction in which the tool body 10 extends, that is, the axial direction of the driver bit 2 indicated by the arrows A1 and A2 is a front-rear direction. In the fastening tool 1, a direction in which the handle 11 extends is an upper-lower direction. Further, in the fastening tool 1, a direction orthogonal to the extending direction of the tool body 10 and an extending direction of the handle 11 is a left-right direction.

The first drive unit 4 is provided on a rear side, which is one side of the tool body 10, with the handle 11 interposed therebetween.

The second drive unit 5 is provided on a front side, which is the other side of the tool body 10, with the handle 11 interposed therebetween.

In the screw accommodating portion 6, a plurality of screws 200 are connected by a connecting band, and a connecting screw wound in a spiral shape is accommodated.

Figure 3A:
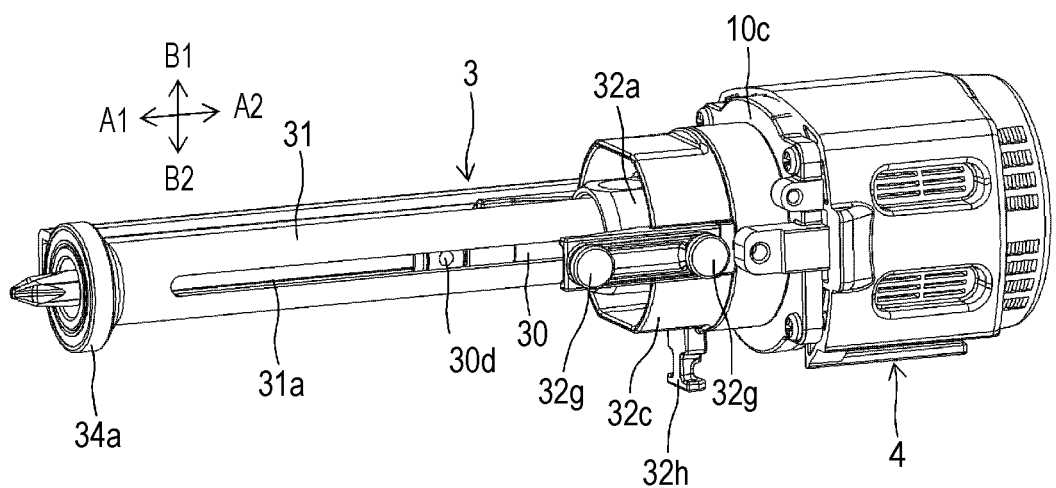
FIG. 3A is a perspective view showing an example of configurations of main parts of the fastening tool according to the present embodiment.
Figure 3B:
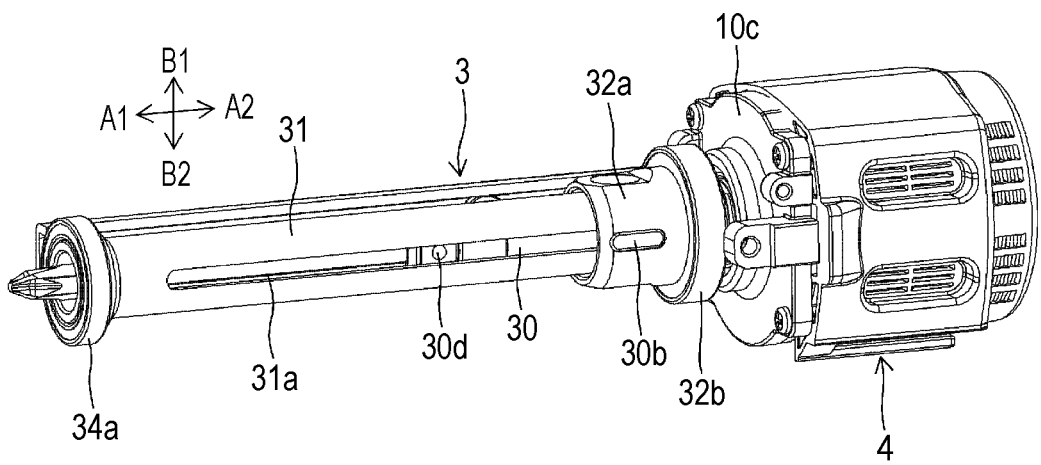
FIG. 3B is a perspective view showing an example of configurations of main parts of the fastening tool according to the present embodiment.
Figure 4A:
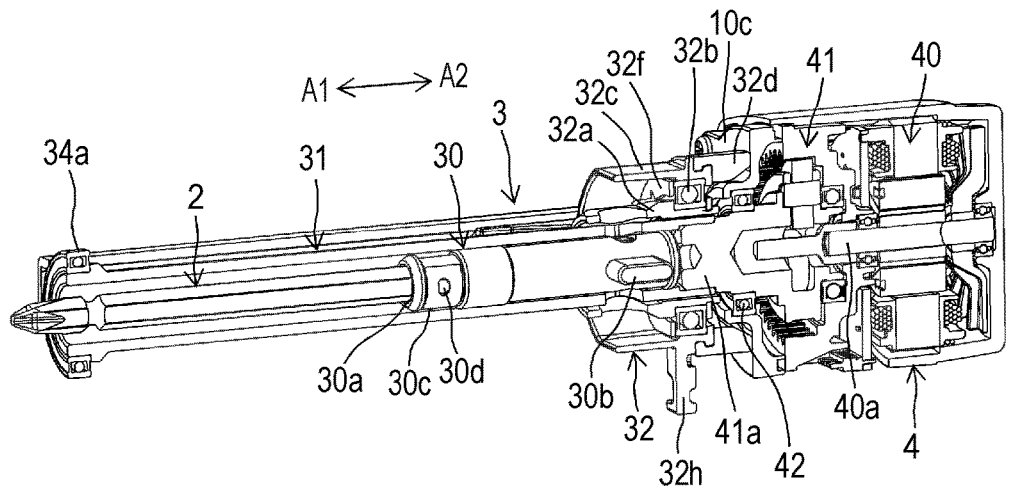
FIG. 4A is a cross-sectional perspective view showing an example of configurations of main parts of the fastening tool according to the present embodiment.
Figure 4B:
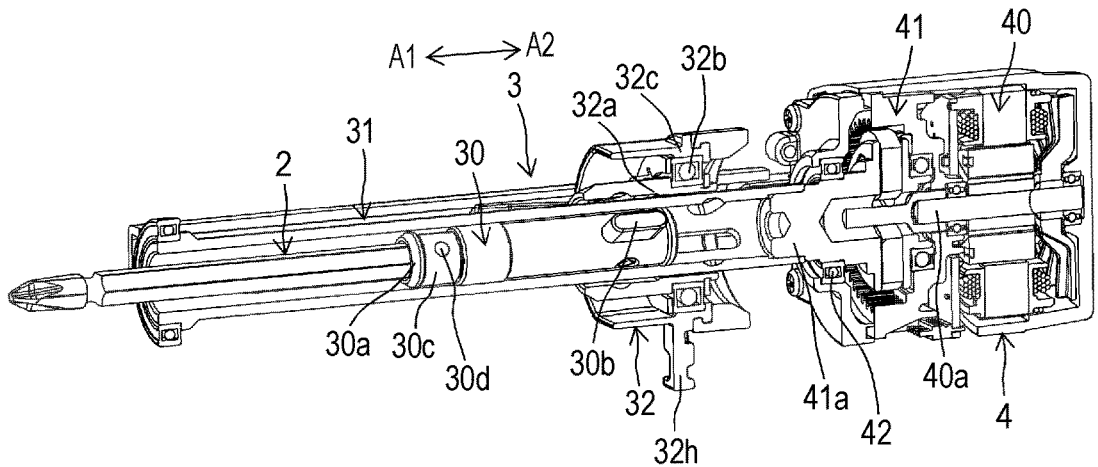
FIG. 4B is a cross-sectional perspective view showing an example of configurations of main parts of the fastening tool according to the present embodiment.
Figure 4C:
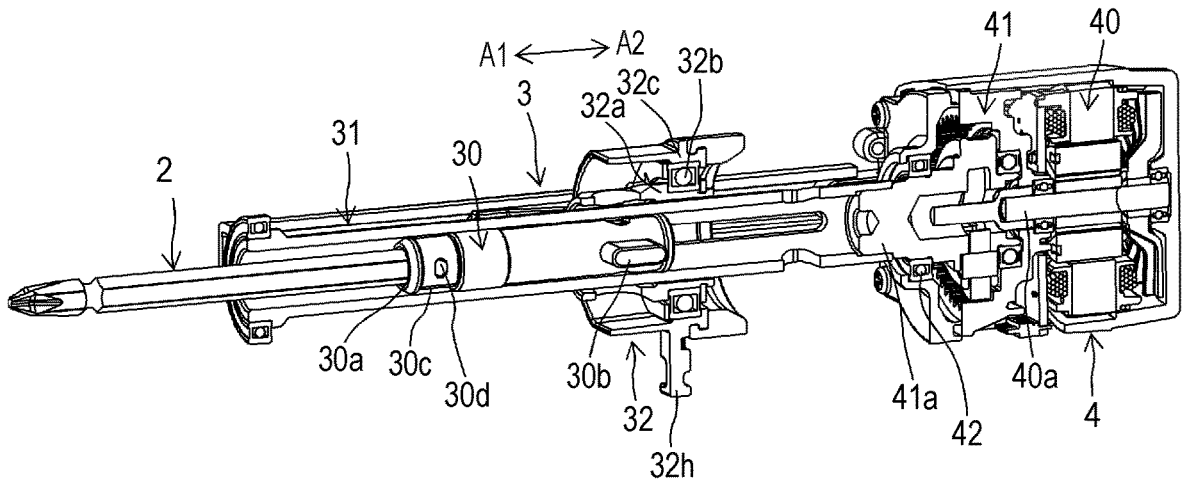
FIG. 4C is a cross-sectional perspective view showing an example of configurations of main parts of the fastening tool according to the present embodiment.
Figure 5:
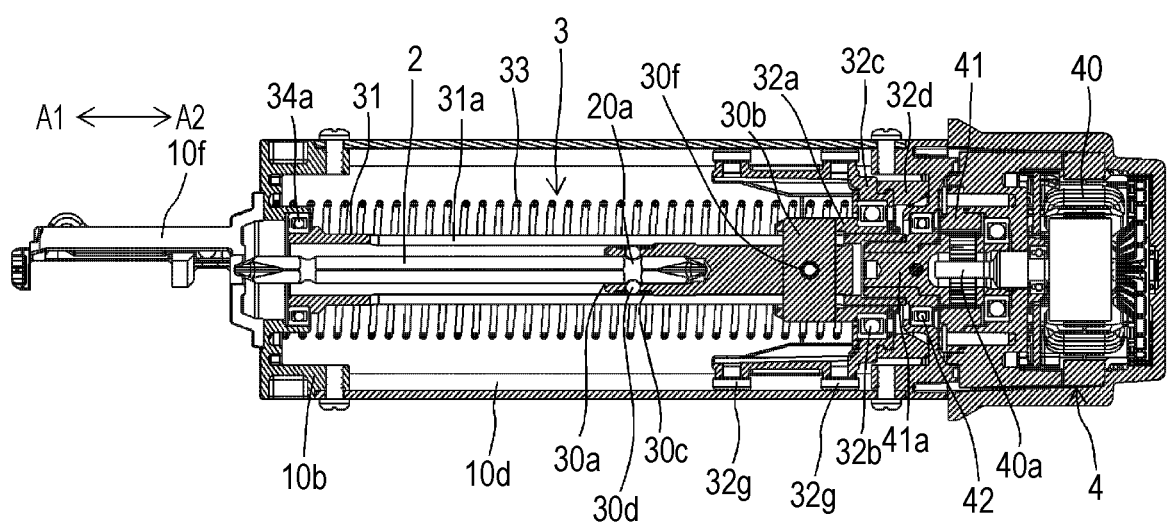
FIG. 5 is a top cross-sectional view showing an example of configurations of main parts of the fastening tool according to the present embodiment.

FIGS. 3A and 3B are perspective views showing an example of configurations of main parts of the fastening tool according to the present embodiment. FIGS. 4A to 4C are cross-sectional perspective views showing an example of configurations of main parts of the fastening tool according to the present embodiment. FIG. 5 is a top cross-sectional view showing an example of configurations of main parts of the fastening tool according to the present embodiment, and shows details of the bit holding portion 3 and the first drive unit 4. Next, the bit holding portion 3 and the first drive unit 4 will be described with reference to the drawings.

The bit holding portion 3 is an example of a tip end tool holding portion, and includes a holding member 30 that detachably holds the driver bit 2, which is an example of a tip end tool, a rotation guide member 31 that supports the holding member 30 so as to be movable in the front-rear direction indicated by the arrows A1 and A2 along the axial direction of the driver bit 2 and rotates together with the holding member 30, a moving member 32 that moves the holding member 30 in the front-rear direction along the rotation guide member 31, and a biasing member 33 that biases the moving member 32 in a rear direction indicated by the arrow A2.

The holding member 30 has an outer diameter slightly smaller than an inner diameter of the rotation guide member 31, and is formed of, for example, a columnar member inserted inside the rotation guide member 31. In the holding member 30, an opening 30*a* having a shape matching a cross-sectional shape of the driver bit 2 is provided at an end portion on a front side along the axial direction of the driver bit 2. The holding member 30 includes, in the opening 30*a*, an attachment and detachment holding mechanism 30*c* that detachably holds the driver bit 2. In the holding member 30, the opening 30*a* is exposed to an inside of the rotation guide member 31, and the driver bit 2 is detachably inserted into the opening 30*a*.

The rotation guide member 31 extends along the extending direction of the tool body 10, that is, along the front-rear direction indicated by the arrows A1 and A2 along the axial direction of the driver bit 2. The rotation guide member 31 has a cylindrical shape into which the holding member 30 enters, and an end portion on a front side of the rotation guide member 31 is rotatably supported by a metal front frame 10*b* provided on a front side of a resin case 10*a* forming an exterior of the tool body 10 via a bearing 34*a* that is an example of a bearing. An end portion on a rear side of the rotation guide member 31 is connected to the first drive unit 4.

In the rotation guide member 31, groove portions 31*a* extending in the front-rear direction indicated by the arrows A1 and A2 along the axial direction of the driver bit 2 are formed at two positions of side portions facing each other in a radial direction. The rotation guide member 31 penetrates the holding member 30 in the radial direction, and a connecting member 30*b* protruding from both sides of the holding member 30 enters the groove portions 31*a*, so that the rotation guide member 31 is connected to the holding member 30 via the connecting member 30*b*.

The holding member 30 is provided with a hole portion penetrating in a direction perpendicular to a rotation direction of the driver bit 2, and the connecting member 30*b* is inserted into the hole portion and fixed by a pin 30*f*. The connecting member 30*b* is formed of a tubular member having an oval cross-sectional shape.

The connecting member 30*b* is oriented with a longitudinal direction of the oval shape along an extending direction of the groove portion 31*a* parallel to the axial direction of the driver bit 2 indicated by the arrows A1 and A2, a lateral direction of the oval shape orthogonal to the extending direction of the groove portion 31*a* indicated by arrows B1 and B2, that is, along a rotation direction of the rotation guide member 31. The connecting member 30*b* is configured such that a width of the lateral direction of the oval shape, that is, a width of the rotation guide member 31 along the rotation direction is slightly smaller than a width of the groove portion 31*a* along the same direction.

Accordingly, the connecting member 30*b* inserted into the groove portion 31*a* is supported by the groove portion 31*a* so as to be movable along an axial direction of the rotation guide member 31. Movement of the connecting member 30*b* along the rotation direction with respect to the rotation guide member 31 is restricted between one side surface and the other side surface of the groove portion 31*a* along the extending direction of the groove portion 31*a*. Therefore, by an operation of rotating the rotation guide member 31, the connecting member 30*b* is pressed by one side surface or the other side surface of the groove portion 31*a* according to the rotation direction of the rotation guide member 31, and receives a force in a circumferential direction which is the rotation direction from the rotation guide member 31.

Therefore, when the rotation guide member 31 rotates, the connecting member 30*b* is pressed by the groove portion 31*a* of the rotation guide member 31, so that the holding member 30 rotates together with the rotation guide member 31. The connecting member 30b is guided by the groove portion 31a of the rotation guide member 31, and the holding member 30 moves in the front-rear direction along the axial direction of the driver bit 2.

The moving member 32 is an example of a transmission member, and includes a first moving member 32a which rotates together with the holding member 30 and moves the holding member 30 in the front-rear direction along the rotation guide member 31, a second moving member 32c which is supported by the first moving member 32a via a bearing 32b and presses the first moving member 32a via the bearing 32b, and a buffer member 32d which is attached to a rear side of the second moving member 32c.

The first moving member 32a has an inner diameter slightly larger than an outer diameter of the rotation guide member 31, and is formed of, for example, a cylindrical member inserted outside the rotation guide member 31. The first moving member 32a is connected to the holding member 30 via the connecting member 30b protruding from the groove portion 31a of the rotation guide member 31, so that the first moving member 32a is supported so as to be movable along the axial direction of the rotation guide member 31.

The bearing 32b is an example of the bearing and is inserted between an outer circumference of the first moving member 32a and an inner circumference of the second moving member 32c. The first moving member 32a forms a bearing inner ring holding member which holds an inner ring of the bearing 32b, and the second moving member 32c forms a bearing outer ring holding member which holds an outer ring of the bearing 32b. In the bearing 32b, the inner ring is supported on the outer circumference of the first moving member 32a so as not to be movable in the rotation direction and the axial direction, and the outer ring is supported on the inner circumference of the second moving member 32c so as not to be movable in the rotation direction and the axial direction.

Accordingly, the second moving member 32c is connected to the first moving member 32a via the bearing 32b in a state in which movement of the second moving member 32c in the front-rear direction along the axial direction is restricted. The second moving member 32c rotatably supports the first moving member 32a via the bearing 32b.

Therefore, the first moving member 32a is pressed by the second moving member 32c via the bearing 32b by a movement operation of the second moving member 32c in the front-rear direction along the axial direction, and moves in the front-rear direction along the axial direction together with the second moving member 32c. The first moving member 32a is rotatable with respect to the second moving member 32c that is not rotatable with respect to the rotation guide member 31.

The biasing member 33 is formed of a coil spring in the present example, is outside the rotation guide member 31, and is inserted between the front frame 10b provided on the front side of the case 10a of the tool body 10 and the second moving member 32c of the moving member 32, and abuts against a spring seat 32f that contacts an end surface of the outer ring of the bearing 32b. The biasing member 33 is compressed by movement of the moving member 32 in a forward direction indicated by the arrow A1, and applies a force for pressing the moving member 32 in a rearward direction indicated by the arrow A2 to the moving member 32.

The first drive unit 4 includes a bit rotation motor 40 which is driven by electricity supplied from the battery 12, and a speed reducer 41. The bit rotation motor 40 is an example of a motor or a first motor, and a shaft 40a of the bit rotation motor 40 is connected to the speed reducer 41, and a shaft 41a of the speed reducer 41 is connected to the rotation guide member 31. In the first drive unit 4, the speed reducer 41 uses planetary gears, and the bit rotation motor 40 is disposed coaxially with the rotation guide member 31, the holding member 30, and the driver bit 2 held by the holding member 30.

In the first drive unit 4, the bit rotation motor 40 and the speed reducer 41 are attached to a metal rear frame 10c provided on a rear side of the case 10a of the tool body 10, and the shaft 41a of the speed reducer 41 is supported by the rear frame 10c via a bearing 42. The end portion on the rear side of the rotation guide member 31 is connected to the shaft 41a of the speed reducer 41, and the shaft 41a is supported by the rear frame 10c via the bearing 42, so that the rotation guide member 31 is rotatably supported via the bearing 42, which is an example of the bearing.

The bit holding portion 3 and the first drive unit 4 are integrally assembled by connecting the front frame 10b and the rear frame 10c by a coupling member 10d extending in the front-rear direction, and the front frame 10b is fixed to the case 10a of the tool body 10 by a screw 10e.

In the bit holding portion 3, the end portion on the front side of the rotation guide member 31 is supported by the front frame 10b fixed to the front side of the case 10a of the tool body 10 via the bearing 34a, and the end portion on the rear side of the rotation guide member 31 is supported by the rear frame 10c fixed to the rear side of the case 10a via the shaft 41a of the speed reducer 41 and the bearing 42. Therefore, in the bit holding portion 3, the rotation guide member 31 is rotatably supported by the tool body 10.

Accordingly, the first drive unit 4 rotates the rotation guide member 31 by the bit rotation motor 40. When the rotation guide member 31 rotates, the connecting member 30b is pressed by the groove portion 31a of the rotation guide member 31, so that the holding member 30 holding the driver bit 2 rotates together with the rotation guide member 31.

In the bit holding portion 3, the second moving member 32c is provided with a guide member 32g. The coupling member 10d is provided with a pair of guide wall portions 10g at an interval slightly larger than a diameter of the guide member 32g, and the guide member 32g enters between the pair of guide wall portions 10g, the pair of guide wall portions 10g face a circumferential surface of the guide member 32g.

Accordingly, the guide member 32g is guided by the coupling member 10d, so that the second moving member 32c is movable in the front-rear direction indicated by the arrows A1 and A2 along the axial direction of the driver bit 2, and rotation of the second moving member 32c following the rotation guide member 31 is restricted.

Figure 6A:
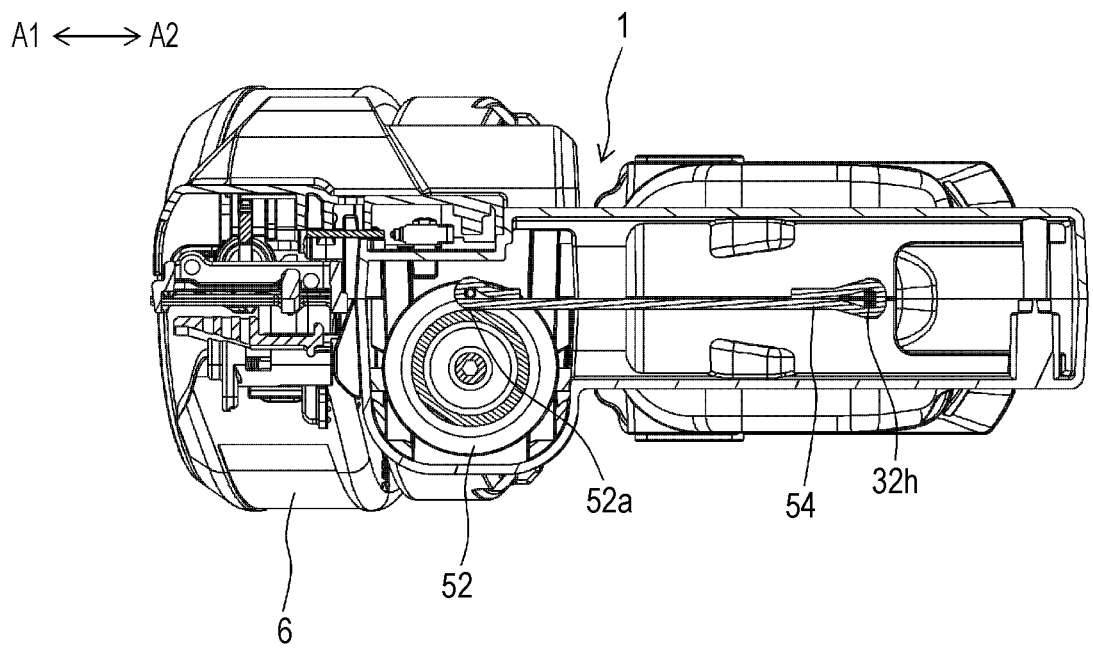
FIG. 6A is a top cross-sectional view showing an example of the internal structure of the fastening tool according to the present embodiment.
Figure 6B:
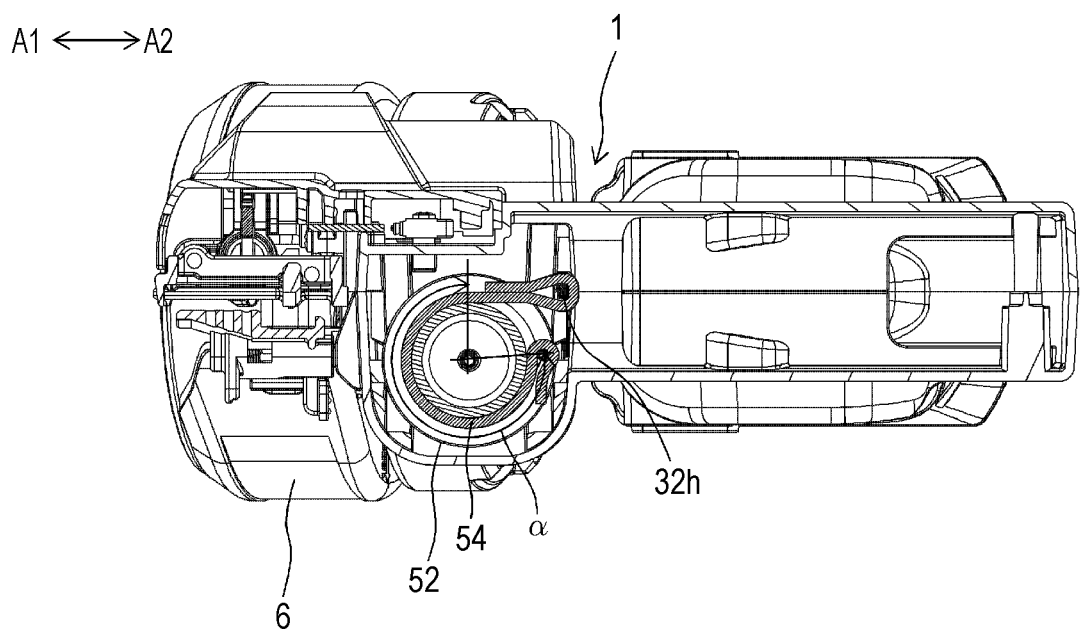
FIG. 6B is a top cross-sectional view showing an example of the internal structure of the fastening tool according to the present embodiment.

FIGS. 6A and 6B are top cross-sectional views showing an example of an internal structure of the fastening tool according to the present embodiment, and show details of the second drive unit 5. Next, the second drive unit 5 will be described with reference to the drawings.

The second drive unit 5 includes a bit movement motor 50 which is driven by electricity supplied from the battery 12, and a speed reducer 51. The bit movement motor 50 is an example of a motor or a second motor, and a shaft 50a of the bit movement motor 50 is connected to the speed reducer 51, and a shaft 51a of the speed reducer 51 is connected to a pulley 52 which is an example of the transmission member. In the second drive unit 5, the pulley 52 is supported by the tool body 10 via a bearing 53. In the second drive unit 5, the shaft 50a of the bit movement motor 50 is disposed along the extending direction of the handle 11.

In the second drive unit 5, one end of a linear wire 54, which is an example of the transmission member, is connected to the pulley 52, and the wire 54 is wound around the pulley 52 by rotation of the pulley 52. The other end of the wire 54 is connected to a wire connecting portion 32h provided in the second moving member 32c of the moving member 32.

Accordingly, the second drive unit 5 rotates the pulley 52 by the bit movement motor 50 to wind the wire 54, thereby moving the second moving member 32c in the forward direction indicated by the arrow A1. In the bit holding portion 3, when the second moving member 32c moves in the forward direction, the first moving member 32a is pressed via the bearing 32b, and the first moving member 32a moves in the forward direction along the axial direction together with the second moving member 32c. When the first moving member 32a moves in the forward direction, the holding member 30 connected to the first moving member 32a via the connecting member 30b moves in the forward direction, and the driver bit 2 held by the holding member 30 moves in the forward direction indicated by the arrow A1.

The second drive unit 5 is offset to one side with respect to a substantially center of the fastening tool 1 in the left-right direction such that a tangential direction of a portion of the pulley 52 around which the wire 54 is wound is along an extending direction of the rotation guide member 31. That is, a center of the pulley 52, in the present example, the shaft 50a of the bit movement motor 50 is offset to one side with respect to the rotation guide member 31, and a portion 52a of the pulley 52 around which the wire 54 is wound overlaps the rotation guide member 31 when viewed from an axial direction of the pulley 52.

The pulley 52 and the like are disposed such that the wire 54 between the pulley 52 and the second moving member 32c is parallel to the axial direction of the rotation guide member 31 in a radial direction of the pulley 52 as shown in FIGS. 6A and 6B, and is parallel to the axial direction of the rotation guide member 31 also in an axial direction of the bit movement motor 50 orthogonal to the radial direction of the pulley 52 as shown in FIG. 1A.

Further, when the wire 54 is wound on the pulley 52 in an overlapping manner, a distance from a center of the pulley 52 to the wire 54 changes according to the number of turns, so that a movement amount of the driver bit 2 when the pulley 52 makes one rotation changes. An angle formed by a direction in which the wire 54 extends between the pulley 52 and the second moving member 32c and a moving direction of the driver bit 2 along the axial direction of the rotation guide member 31 changes.

Therefore, a diameter and the like of the pulley 52 are set so that a rotation amount a of the pulley 52 necessary for moving the driver bit 2 by a predetermined amount is less than 360°.

Accordingly, when the pulley 52 winds the wire 54 in order to move the driver bit 2 by a predetermined amount, as shown in FIG. 6B, the wire 54 is not wound around the pulley 52 in an overlapping manner, and the movement amount of the driver bit 2 is prevented from becoming inaccurate. A change in parallelism between the direction in which the wire 54 extends between the pulley 52 and the second moving member 32c and the moving direction of the driver bit 2 along the axial direction of the rotation guide member 31 is prevented.

Therefore, a relationship between the number of rotations of the bit movement motor 50 and a movement amount of the holding member 30 becomes a one-to-one relationship in an entire movable range of the holding member 30, and the movement amount of the holding member 30 along the axial direction of the rotation guide member 31 can be controlled by controlling the number of rotations of the bit movement motor 50. That is, the movement amount of the driver bit 2 attached to the holding member 30 can be controlled by controlling the number of rotations of the bit movement motor 50.

Regardless of a winding amount of the wire 54, a tension applied to the wire 54 is always parallel to the moving direction of the driver bit 2 along the axial direction of the rotation guide member 31, and it is possible to move the driver bit 2 and prevent a decrease of transmission efficiency of a force for pressing the screw 200 via the driver bit 2.

Accordingly, the wire 54 between the pulley 52 and the second moving member 32c extends linearly along a moving direction of the moving member 32, and an increase in a load when the wire 54 is wound by the pulley 52 and an increase in a load when the wire 54 is pulled out from the pulley 52 are prevented.

Since the wire 54 is flexible enough to be wound around the pulley 52, the wire 54 cannot press the second moving member 32c to move the moving member 32 rearward. Therefore, the biasing member 33 is provided which is compressed by the movement of the moving member 32 in the forward direction indicated by the arrow A1, and that applies the force for pressing the moving member 32 in the rearward direction indicated by the arrow A2 to the moving member 32. Accordingly, the wire 54 is wound by the pulley 52 to move the driver bit 2 forward, so that the driver bit 2 after moving forward can be moved rearward.

By engagement between the connecting member 30b provided in the holding member 30 and the groove portion 31a provided in the rotation guide member 31, the holding member 30 holding the driver bit 2 is supported so as to be movable in the front-rear direction with respect to the rotation guide member 31 and rotates together with the rotation guide member 31.

Therefore, in a configuration in which the bit rotation motor 40 is disposed coaxially with the rotation guide member 31 and the holding member 30 and the driver bit 2 held by the holding member 30, it is possible to implement a configuration in which the driver bit 2 is rotated and the driver bit 2 is moved in the front-rear direction without moving the bit rotation motor 40 in the front-rear direction.

In the configuration in which the bit rotation motor 40 is disposed coaxially with the driver bit 2, a configuration is considered in which a rotation operation of the bit rotation motor 40 is converted into movement of the driver bit 2 in the front-rear direction by using a feed screw.

However, in the configuration using the feed screw, a forward movement amount of the driver bit 2 per rotation of the motor cannot be increased, so that it is difficult to increase a moving speed of the driver bit 2 even when a rotation speed of the motor is increased.

In the fastening tool 1, in order to shorten a time required to press the screw 200 against the fastening target by the driver bit 2, it is necessary to increase the moving speed of the driver bit 2. However, in the configuration using the feed screw, it is difficult to shorten the time until the screw 200 is pressed against the fastening target by the driver bit 2.

On the other hand, in the configuration in which the holding member 30 holding the driver bit 2 is supported so as to be movable in the front-rear direction with respect to the rotation guide member 31, the pulley 52 is rotated by the second drive unit 5 to wind up the wire 54, and the holding member 30 is moved in the forward direction, the moving speed of the driver bit 2 can be increased according to a rotation speed of the bit movement motor 50. Therefore, it is possible to shorten the time until the screw 200 is pressed against the fastening target by the driver bit 2.

Figure 7A:
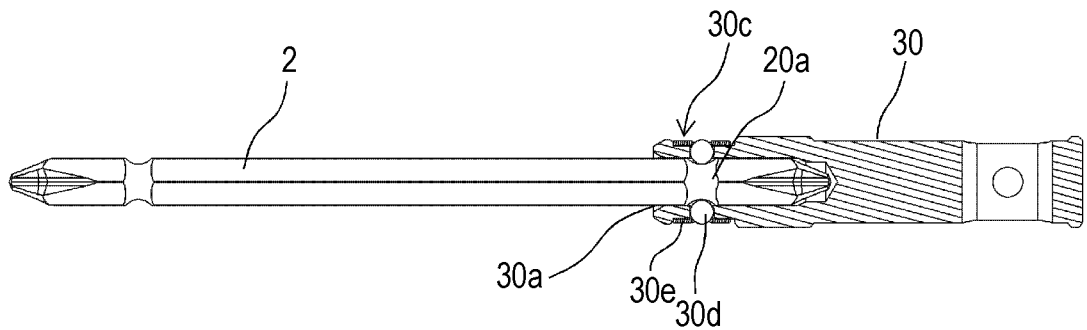
FIG. 7A is a cross-sectional view showing an example of an attachment and detachment holding mechanism.
Figure 7B:
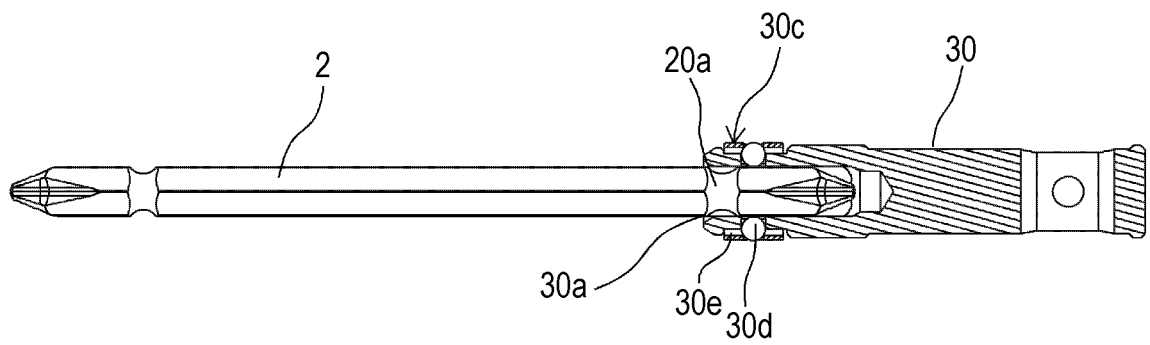
FIG. 7B is a cross-sectional view showing an example of the attachment and detachment holding mechanism.
Figure 8A:
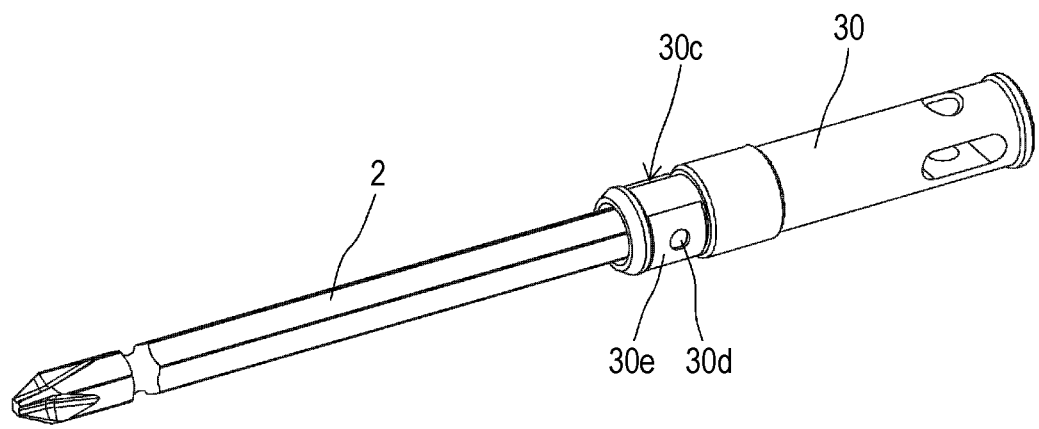
FIG. 8A is a perspective view showing an example of the attachment and detachment holding mechanism.
Figure 8B:
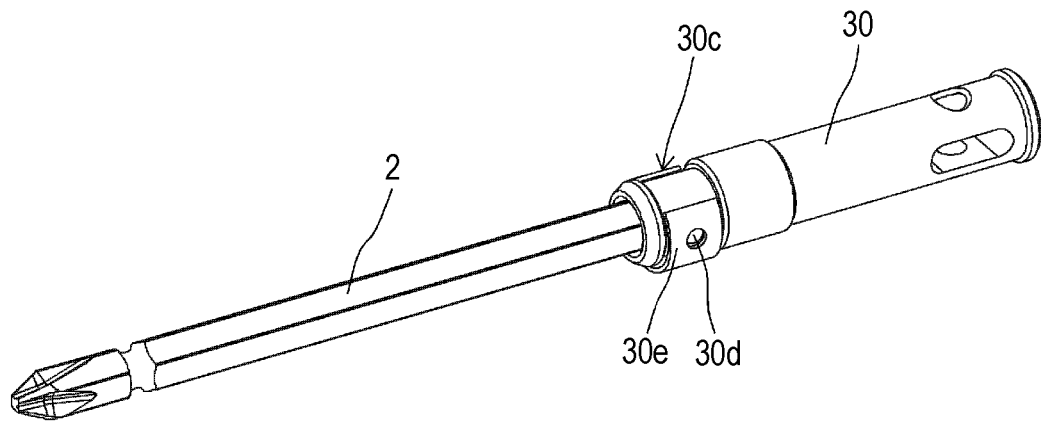
FIG. 8B is a perspective view showing an example of the attachment and detachment holding mechanism.

FIGS. 7A and 7B are cross-sectional views showing examples of the attachment and detachment holding mechanism. FIGS. 8A and 8B are perspective views showing examples of the attachment and detachment holding mechanism, and shows details of the attachment and detachment holding mechanism 30c. Next, the attachment and detachment holding mechanism 30c will be described with reference to the drawings.

The attachment and detachment holding mechanism 30c includes a ball 30d exposed in the opening 30a and a spring 30e that biases the ball 30d in a direction of exposing the ball 30d in the opening 30a. The spring 30e is formed of an annular leaf spring and is fitted to an outer circumference of the holding member 30.

When an insertion portion 20 of the driver bit 2 is inserted into the opening 30a of the holding member 30, the attachment and detachment holding mechanism 30c retracts in an outer circumferential direction of the holding member 30 while the ball 30d pressed by the insertion portion 20 deforms the spring 30e in a direction of increasing a diameter of the annular spring 30e.

When the insertion portion 20 of the driver bit 2 is inserted into the opening 30a of the holding member 30 to a position where a groove portion 20a formed on an outer circumference of the insertion portion 20 faces the ball 30d, the ball 30d biased by the spring 30e is fitted into the groove portion 20a. Accordingly, the driver bit 2 is prevented from being inadvertently detached from the holding member 30.

When a force equal to or greater than a predetermined force is applied in a direction of pulling the driver bit 2 out from the holding member 30, the ball 30d retracts while deforming the spring 30e in the direction of increasing the diameter of the annular spring 30e, so that the driver bit 2 can be pulled out from the holding member 30.

In operations of inserting and removing the insertion portion 20 of the driver bit 2 into and from the opening 30a of the holding member 30, the ball 30d retracts in the outer circumferential direction of the holding member 30. Therefore, a space for the ball 30d retracting is required in the outer circumference of the holding member 30. On the other hand, since the holding member 30 is inserted into the tubular rotation guide member 31, a space for the ball 30d retracting cannot be secured between the outer circumference of the holding member 30 and an inner circumference of the rotation guide member 31.

When a diameter difference between the holding member 30 and the rotation guide member 31 is set in order to secure the space for the ball 30d retracting between the outer circumference of the holding member 30 and the inner circumference of the rotation guide member 31, the outer diameter of the holding member 30 cannot be reduced because a dimension of the driver bit 2 in the radial direction is determined, so that it is necessary to increase the outer diameter of the rotation guide member 31. Therefore, a size of the device is increased.

On the other hand, the rotation guide member 31 is provided with the groove portion 31a that guides the connecting member 30b. The groove portion 31a penetrates from an inner circumferential side to an outer circumferential side of the rotation guide member 31 on the front and rear sides, and extends in the axial direction of the rotation guide member 31.

Therefore, in the attachment and detachment holding mechanism 30c, the ball 30d is provided in accordance with a position in the groove portion 31a of the rotation guide member 31. That is, in the holding member 30, the connecting member 30b and the ball 30d of the attachment and detachment holding mechanism 30c are provided coaxially along the axial direction of the rotation guide member 31. Accordingly, in the attachment and detachment holding mechanism 30c, the ball 30d is exposed to the groove portion 31a of the rotation guide member 31 in both operations of rotating the rotation guide member 31 and the holding member 30 and an operation of moving the holding member 30 in the axial direction with respect to the rotation guide member 31.

Therefore, when the insertion portion 20 of the driver bit 2 is inserted into or removed from the opening 30a of the holding member 30, the ball 30d retracted in the outer circumferential direction of the holding member 30 enters the groove portion 31a of the rotation guide member 31.

Therefore, in the configuration in which the holding member 30 is inserted into the tubular rotation guide member 31, it is possible to secure the space for the ball 30d of the attachment and detachment holding mechanism 30c retracting. Since the groove portion 31a into which the connecting member 30b enters is also used as the space for the ball 30d retracting, an area of an opening provided in the rotation guide member 31 is reduced, and strength can be secured.

Further, the diameter difference between the holding member 30 and the rotation guide member 31 is increased, so that it is not necessary to secure the space for the ball 30d retracting between the outer circumference of the holding member 30 and the inner circumference of the rotation guide member 31, and it is possible to prevent an increase in the size of the device.

Figure 9:
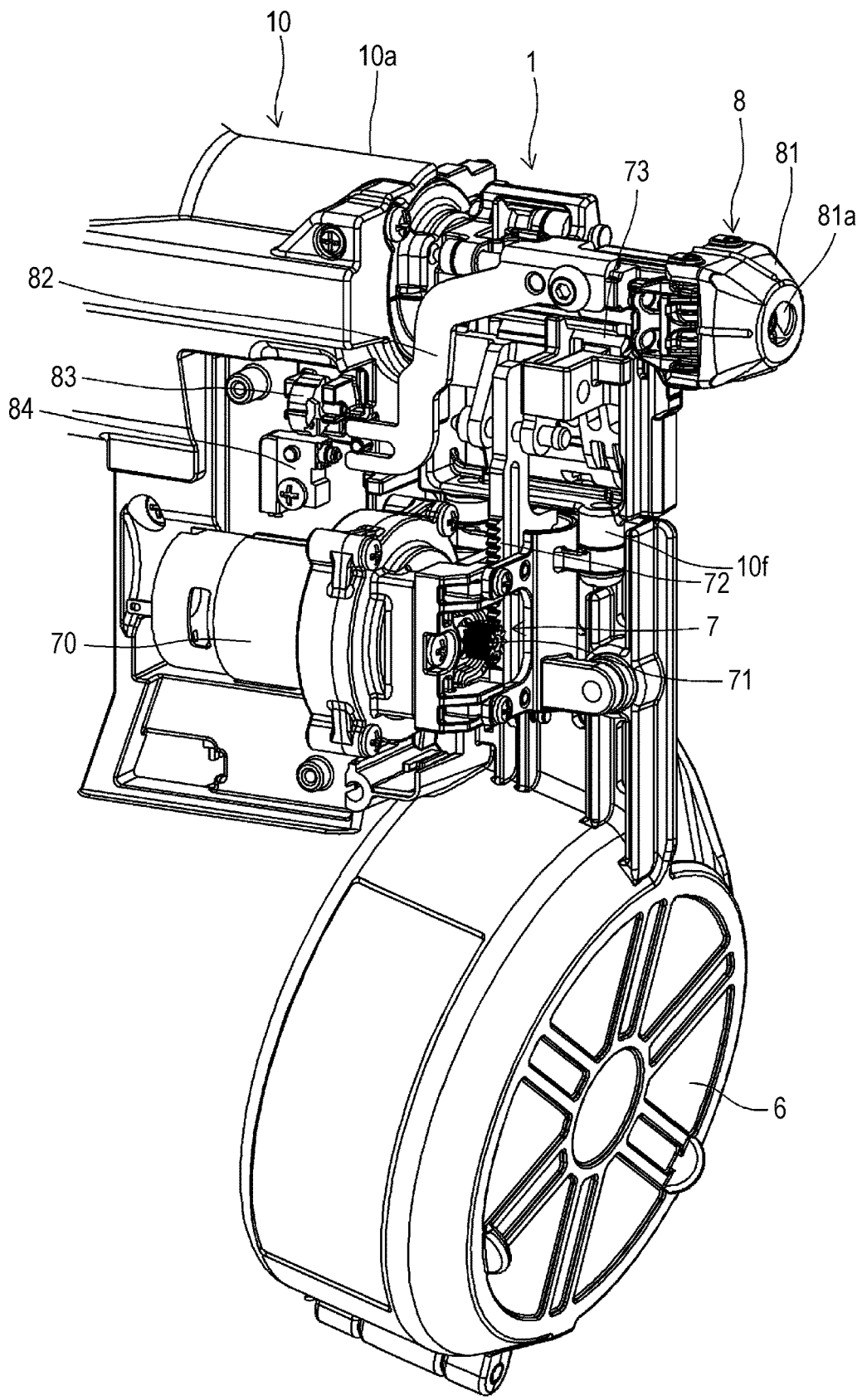
FIG. 9 is a perspective view showing an example of a screw feeding portion and a nose portion according to the present embodiment.

FIG. 9 is a perspective view showing an example of a screw feeding portion and a nose portion according to the present embodiment, and shows details of the screw feeding portion 7 and the nose portion 8. Next, the screw feeding portion 7 and the nose portion 8 will be described with reference to the drawings.

The screw feeding portion 7 includes a screw feeding motor 70, pinion gears 71 attached to a shaft of the screw feeding motor 70 via a speed reducer, rack gears 72 meshing with the pinion gears 71, and an engagement portion 73 connected to the rack gears 72 and engaged with a connecting screw fed from the screw accommodating portion 6.

In the screw feeding portion 7, the rack gears 72 are supported so as to be movable in the upper-lower direction along a feeding direction of the connecting screw. In the screw feeding portion 7, the screw feeding motor 70 rotates forward and reversely, so that the engagement portion 73 engaged with the connecting screw moves in the upper-lower direction, and the connecting screw is fed.

The nose portion 8 includes an injection passage 80 to which the screw 200 is supplied by the screw feeding portion 7 and through which the driver bit 2 passes, a contact member 81 that has an injection port 81a communicating with the injection passage 80 and contacts the fastening target, a contact arm 82 that moves in the front-rear direction in conjunction with the contact member 81, and an adjustment portion 83 that restricts a movement amount of the contact arm 82. The nose portion 8 includes a cover member 88 that openably and closably covers a path through which the screw 200 passes from the screw accommodating portion 6 to the injection passage 80.

The fastening tool 1 includes the nose portion 8 with each component forming the injection passage 80, the contact member 81 and the contact arm 82 assembled, and the nose portion 8 is fixed to the front frame 10b and a nose body portion 10f forming the tool body 10. The fastening tool 1 includes a contact switch portion 84 that is operated by being pressed by the contact arm 82.

In the nose portion 8, the contact member 81 is supported so as to be movable in the front-rear direction indicated by the arrows A1 and A2, and the contact arm 82 moves in the front-rear direction in conjunction with the contact member 81. In the nose portion 8, the contact member 81 is biased in the forward direction by a biasing member (not shown), and the contact member 81 that is pressed against the fastening target and moves rearward is biased by the biasing member and moves in the forward direction.

In the nose portion 8, the contact member 81 is pressed against the fastening target, the contact arm 82 moves rearward, and the movement amount of the contact arm 82 until the contact switch portion 84 is operated is adjusted by the adjustment portion 83. The contact switch portion 84 is pressed by the contact arm 82 to switch presence or absence of an operation. In the present example, a state in which the contact switch portion 84 is not operated without being pressed by the contact arm 82 is set to OFF of the contact switch portion 84, and a state in which the contact switch portion 84 is operated by being pressed by the contact arm 82 is set to ON of the contact switch portion 84.

Next, a configuration related to control over the fastening tool 1 and an operation of the fastening tool 1 will be described with reference to the drawings. The fastening tool 1 includes a trigger 9 that receives an operation and a trigger switch portion 90 that is operated by the operation of the trigger 9. The trigger 9 is provided on the front side of the handle 11, and is configured to be operable by a finger of a hand gripping the handle 11. The trigger switch portion 90 is operated by being pressed by the trigger 9.

The trigger switch portion 90 is pressed by the trigger 9 to switch presence or absence of an operation. In the present example, a state in which the trigger switch 90 is not operated without operating the trigger 9 and without being pressed by the trigger 9 is set to OFF of the trigger switch 90, and a state in which the trigger switch 90 is operated by operating the trigger 9 and being pressed by the trigger 9 is set to ON of the trigger switch 90.

The fastening tool 1 includes a control unit 100 that controls the first drive unit 4, the second drive unit 5, and the screw feeding portion 7 based on output of the trigger switch portion 90 operated by an operation of the trigger 9 and the contact switch portion 84 operated by being pressed by the contact arm 82.

The control unit 100 is formed of a substrate on which various electronic components are mounted, and is provided in a substrate accommodating portion 111 provided on a rear surface side of the screw accommodating portion 6 between the screw accommodating portion 6 and the handle 11.

In an electric power tool used by holding a handle with a hand, an accommodating portion in which consumables such as screws are accommodated is provided in front of the handle. In order to allow the handle to be gripped by the hand, a space for fingers of the hand to enter is required between the handle and the accommodating portion.

Therefore, the fastening tool 1 includes the substrate accommodating portion 111 on the rear surface side of the screw accommodating portion 6 by using the space between the screw accommodating portion 6 and the handle 11.

In an electric power tool used by holding a handle with a hand, a configuration is proposed in which a battery is attached to a lower portion of the handle and a substrate is provided between the handle and the battery. With such a configuration, a dimension in an upper-lower direction of the electric power tool along an extending direction of the handle increases.

On the other hand, by providing the substrate accommodating portion 111 on the rear surface side of the screw accommodating portion 6, a dimension of the fastening tool 1 in the upper-lower direction along the extending direction of the handle 11 is prevented from increasing. Since the connecting screw wound in a spiral shape is accommodated in the screw accommodating portion 6, a surface of the screw accommodating portion 6 facing the handle 11 has a substantially circular shape. Accordingly, it is possible to secure a volume of the substrate accommodating portion 111 while preventing an increase in the size of the fastening tool 1.

Figure 10A:
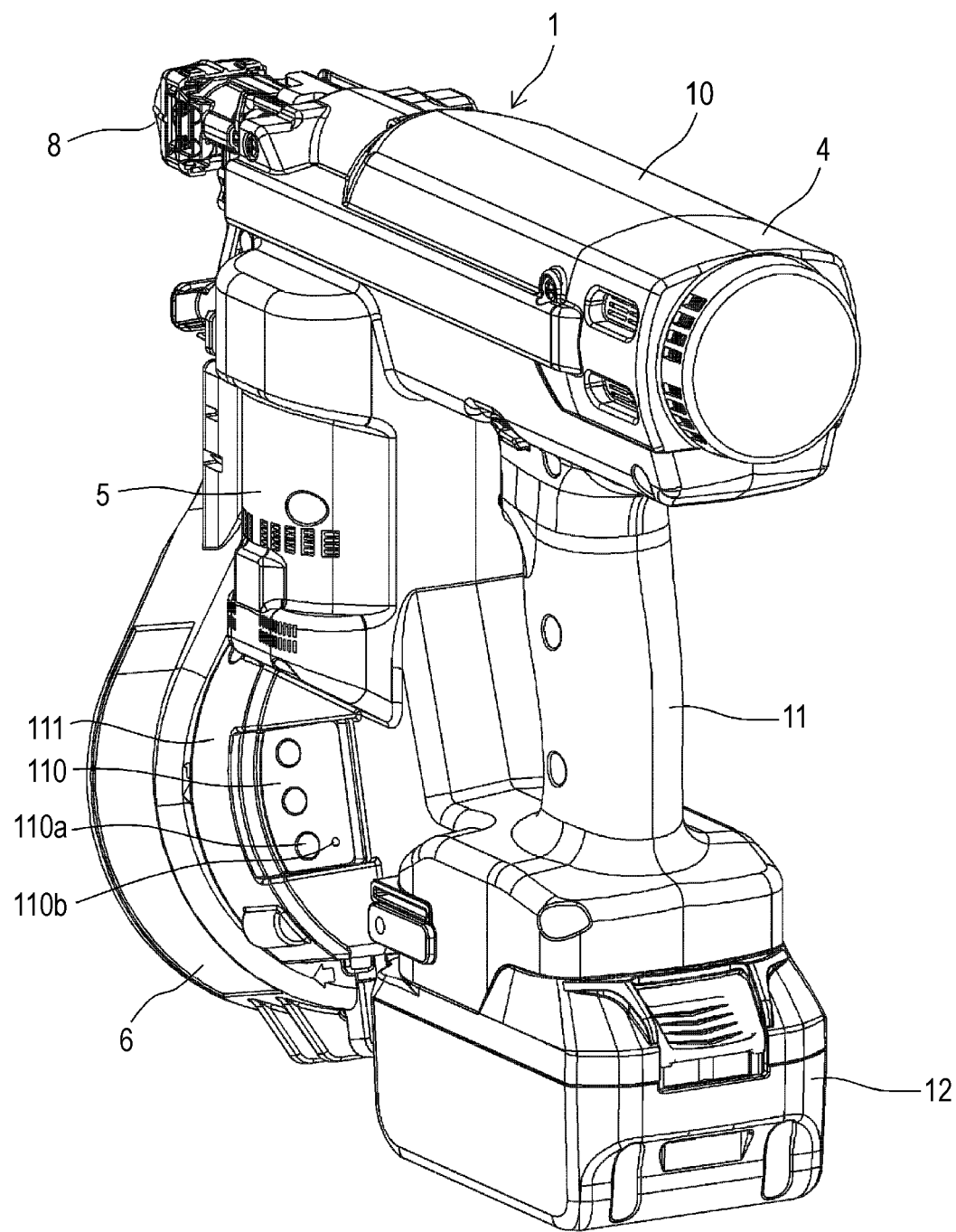
FIG. 10A is a perspective view showing an example of the fastening tool according to the present embodiment as viewed from a rear side.
Figure 10B:
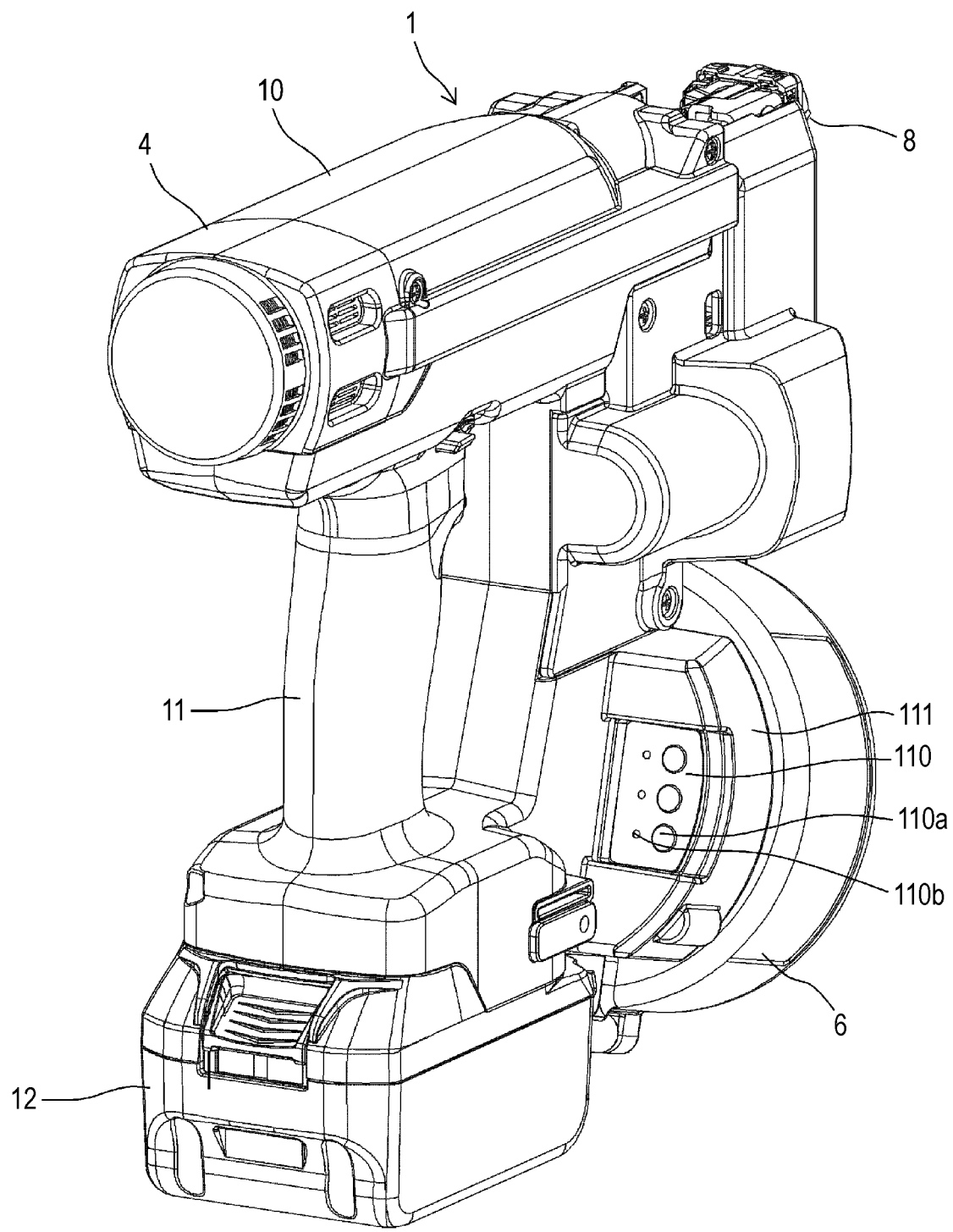
FIG. 10B is a perspective view showing an example of the fastening tool according to the present embodiment as viewed from the rear side.
Figure 10C:
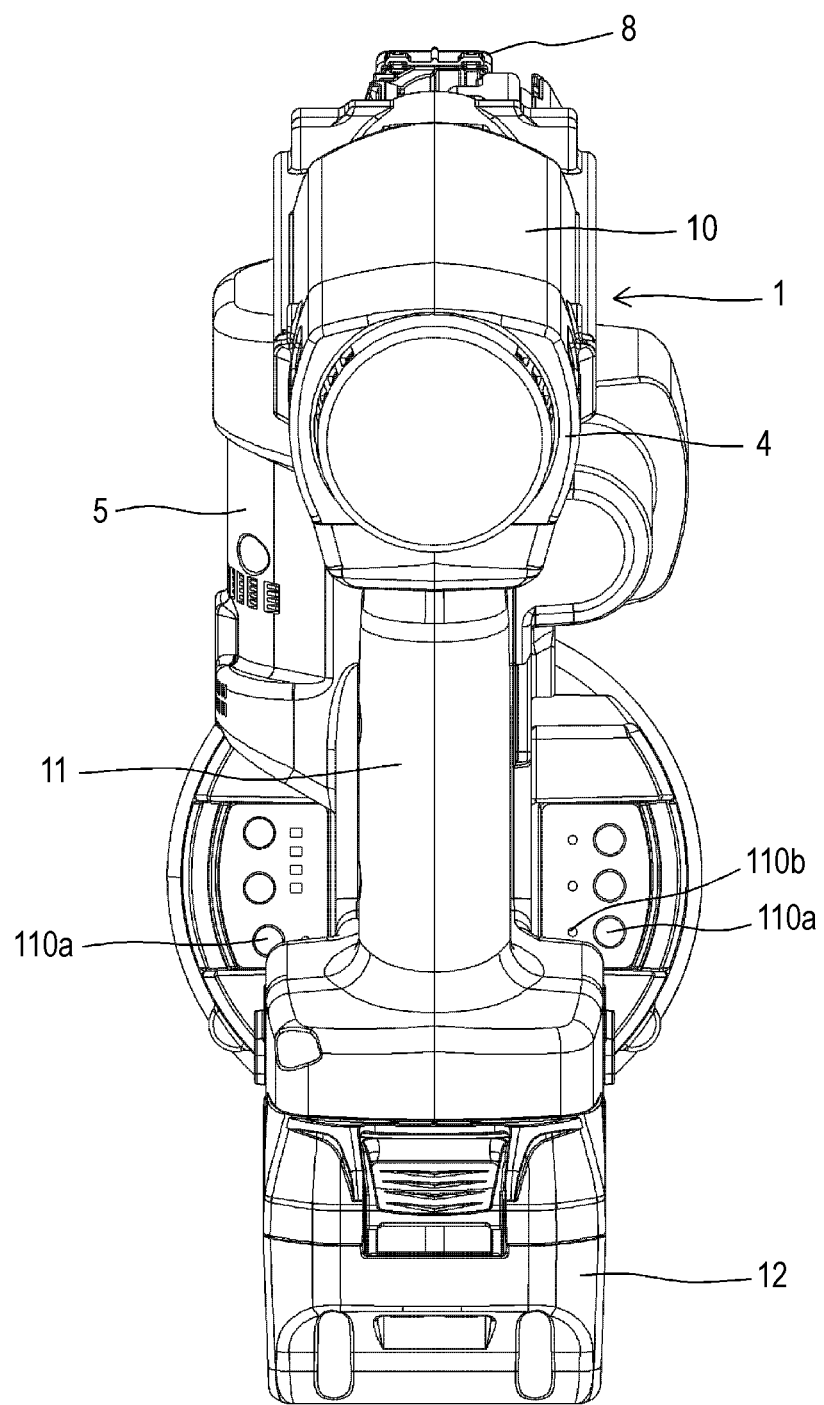
FIG. 10C is a perspective view showing an example of the fastening tool according to the present embodiment as viewed from the rear side.
Figure 11:
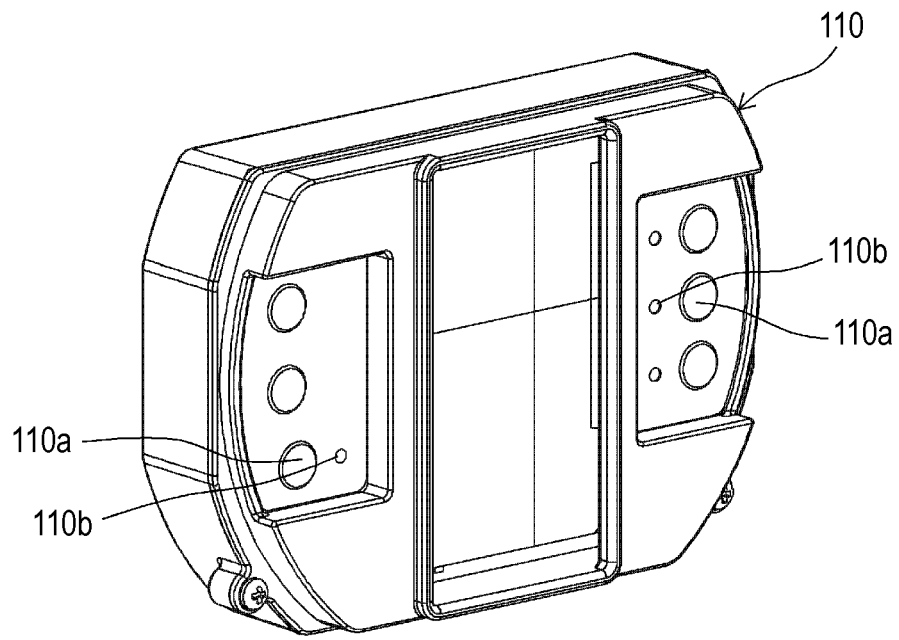
FIG. 11 is a perspective view showing an example of a setting portion.

FIGS. 10A to 10C are perspective views showing examples of the fastening tool according to the present embodiment as viewed from a rear side. FIG. 11 is a perspective view showing an example of a setting portion and shows details of a setting portion 110. Next, the setting portion 110 will be described with reference to the drawings.

The fastening tool 1 includes the second drive unit 5 that moves the driver bit 2 in the front-rear direction along the axial direction, in which the second drive unit 5 is driven by the bit movement motor 50, and the moving member 32 connected to the pulley 52, which is driven and rotated by the bit movement motor 50, by the wire 54 and the holding member 30 connected to the moving member 32 move in the forward direction along the axial direction of the driver bit 2 along the rotation guide member 31.

Accordingly, the movement amount (forward movement amount) of the driver bit 2 can be controlled by controlling the number of rotations of the bit movement motor 50. That is, by rotating the bit movement motor 50 in conjunction with rotation of the bit rotation motor 40 that rotates the driver bit 2 in a direction of fastening the screw 200, it is possible to control the forward movement amount of the driver bit 2 that moves forward following the screw 200 with fastening of the screw 200 by the number of rotations of the bit movement motor 50, and to control a stop position of the driver bit 2 along the axial direction.

Therefore, the fastening tool 1 includes the setting portion 110 for setting the forward movement amount of the driver bit 2. The setting portion 110 is an example of a setting unit, and is configured such that a desired set value can be selected from a plurality of setting values, or a desired set value can be selected steplessly.

In the present example, the setting portion 110 has a configuration in which a setting value is selected by an operation portion 110a having a button. An operation portion 110a may have a configuration in which a setting value is selected by a rotary dial. The setting portion 110 may be configured to display a selected setting value by a method of indicating a current value using a label, an inscription, or the like, or a method of indicating the current value on a display portion 110b such as an LED so that an operator can easily grasp a current setting value.

Setting portions 110 are respectively provided on both left and right sides of a surface on a side facing the handle 11 in the substrate accommodating portion 111 provided on the rear surface side of the screw accommodating portion 6.

Accordingly, when the fastening tool 1 is viewed from the rear side, the setting portion 110 can be visually recognized from both left and right sides of the handle 11.

In a use mode in which the handle 11 is held by hand, a surface of the screw accommodating portion 6 on a side facing the handle 11 faces the operator holding the fastening tool 1. Accordingly, in the substrate accommodating portion 111 provided on the rear surface side of the screw accommodating portion 6, the setting portion 110 is provided on the surface on the side facing the handle 11, so that the display portion 110b provided on the setting portion 110 is easily visible. Therefore, it is possible to reduce a possibility that the operator overlooks display. Contents displayed on the display portion 110b include, in addition to a setting value of a screw depth defined by the forward movement amount of the driver bit 2, an ON or OFF state of a power supply, an operation mode selected from various selectable operation modes, presence or absence of a screw, a remaining amount of screws, presence or absence of an abnormality, and the like.

In the use mode in which the handle 11 is held by hand, the operation portion 110a such as a button provided on the setting portion 110 is also easily visible. Therefore, in a state in which the handle 11 is held by one hand, the operation portion 110a can be operated by the other hand while the operation portion 110a is visually recognized, and an operation can be reliably performed.

Further, a substrate forming the control unit 100 is accommodated in the substrate accommodating portion 111. By mounting switches and the like forming the operation portion 110a and lamps and the like forming the display portion 110b on a surface of the substrate facing the handle 11, a substrate for the setting portion 110, separately from the control unit 100, can be omitted.

Figure 12:
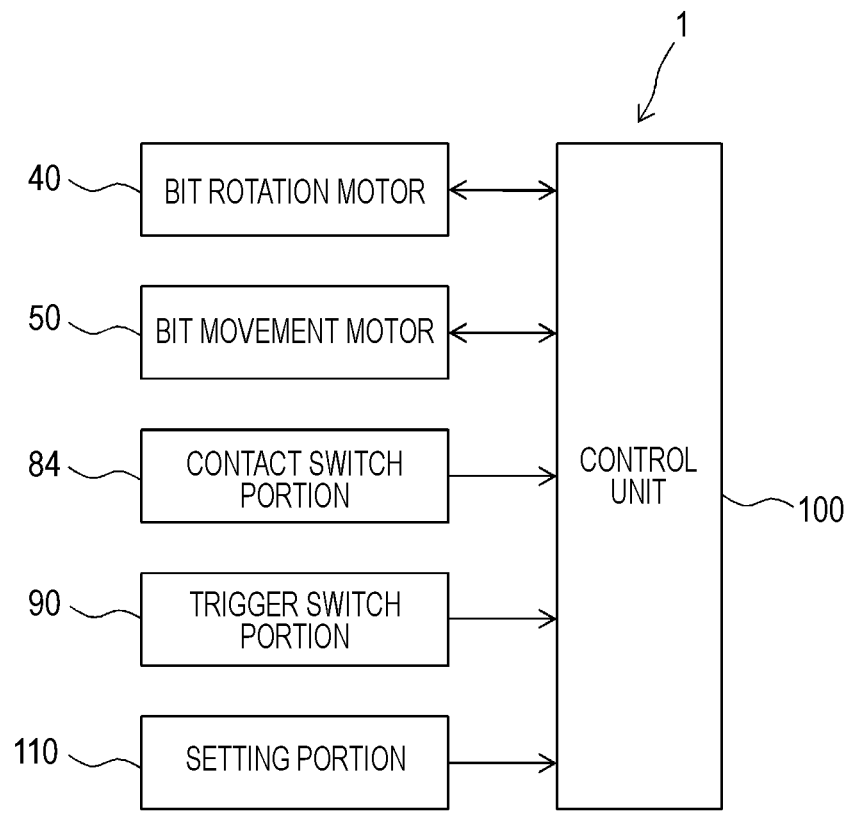
FIG. 12 is a block diagram showing an example of the fastening tool according to the present embodiment.

FIG. 12 is a block diagram showing an example of the fastening tool according to the present embodiment. As described above, the fastening tool 1 includes the second drive unit 5 that moves the driver bit 2 in the front-rear direction along the axial direction, and the second drive unit 5 is driven by the bit movement motor 50. The holding member 30 to which the driver bit 2 is attached is connected to the moving member 32, and the moving member 32 is connected to the pulley 52, which is driven and rotated by the bit movement motor 50, by the wire 54. The holding member 30 and the moving member 32 are configured to move in the forward direction along the axial direction of the driver bit 2 along the rotation guide member 31.

Accordingly, the control unit 100 can control the movement amount (forward movement amount) of the driver bit 2 by controlling the number of rotations of the bit movement motor 50. That is, by rotating the bit movement motor 50 in conjunction with rotation of the bit rotation motor 40 that rotates the driver bit 2 in the direction of fastening the screw 200, it is possible to control the forward movement amount of the driver bit 2 that moves forward following the screw 200 with fastening of the screw 200 by the number of rotations of the bit movement motor 50, and to control the stop position of the driver bit 2 along the axial direction.

The control unit 100 sets, by the setting portion 110, the number of rotations of the bit movement motor 50 that defines the forward movement amount of the driver bit 2. Further, the control unit 100 controls, based on a combination of ON/OFF of the contact switch portion 84 and ON/OFF of the trigger switch portion 90, whether the bit movement motor 50 of the second drive unit 5 and the bit rotation motor 40 of the first drive unit 4 are driven.

Operation Example of Fastening Tool According to Present Embodiment

Figure 13A:
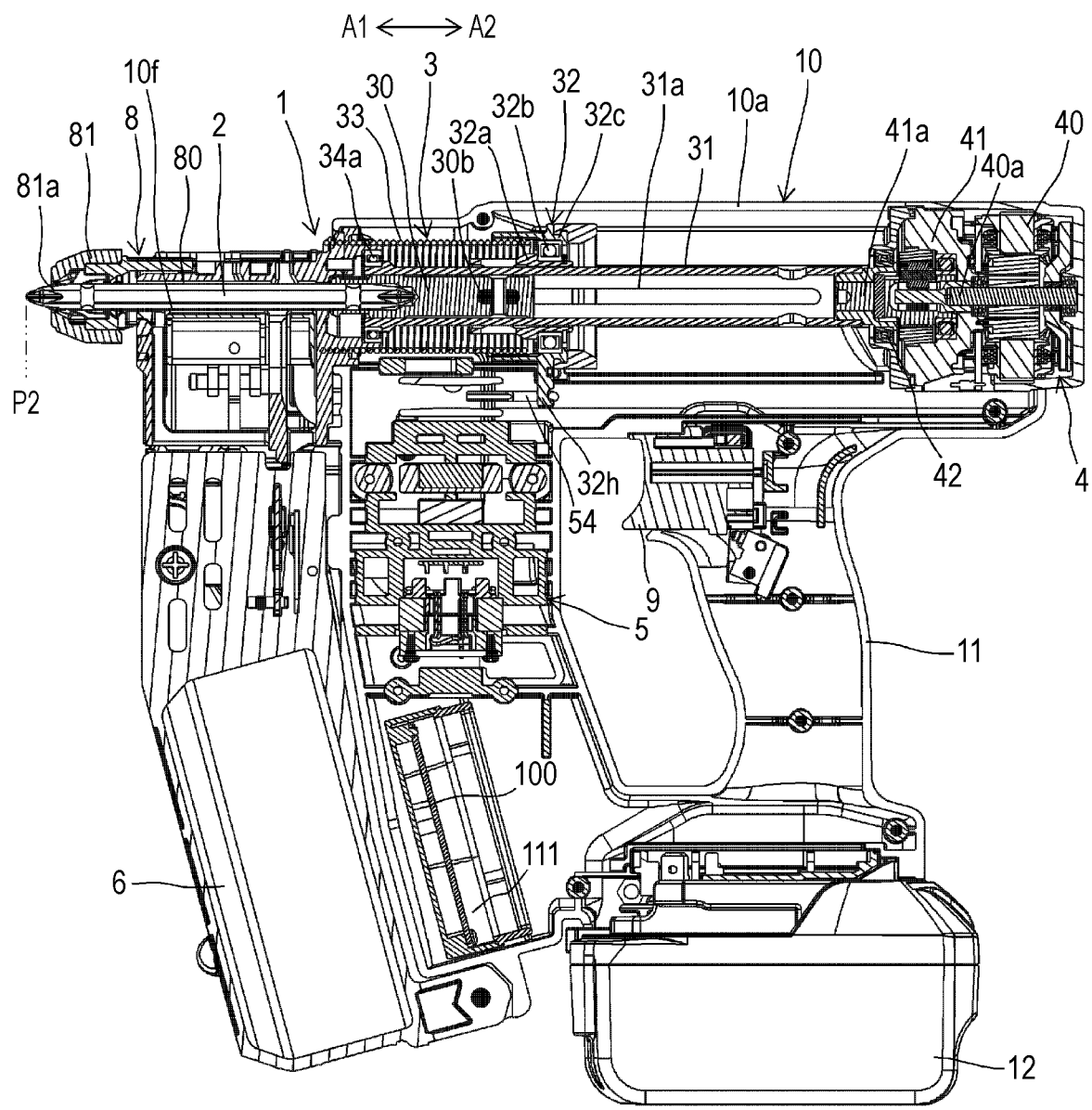
FIG. 13A is a side cross-sectional view showing an example of an operation of the fastening tool according to the present embodiment.
Figure 13B:
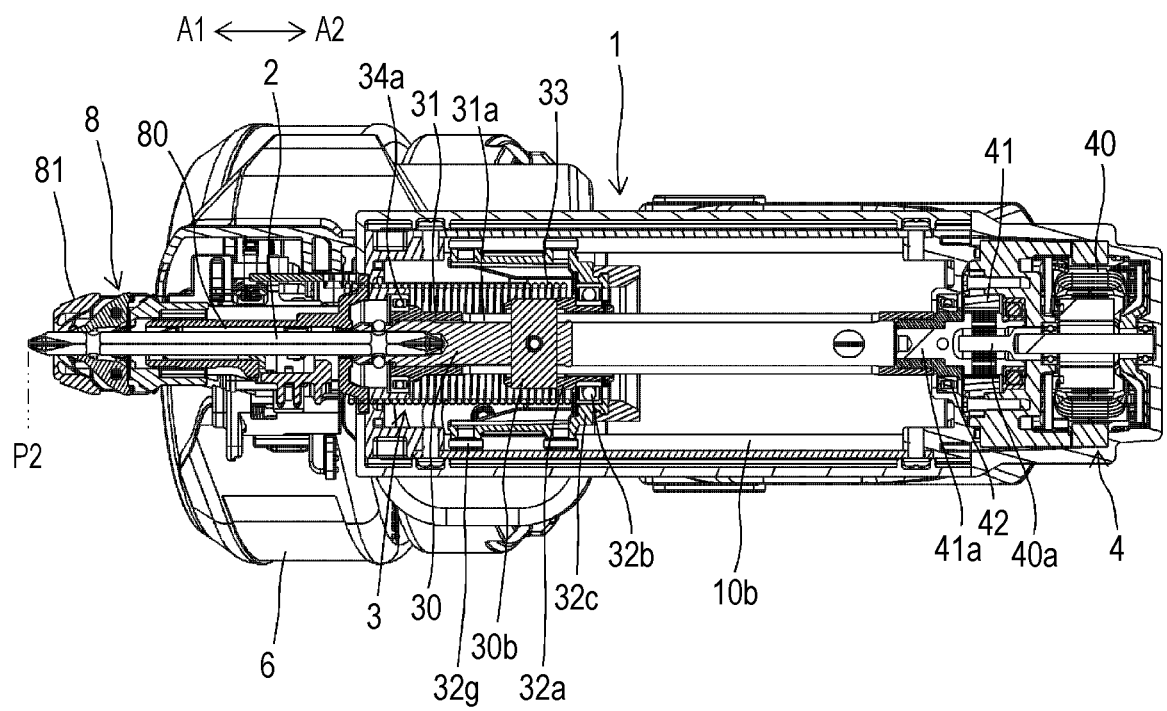
FIG. 13B is a top cross-sectional view showing an example of the operation of the fastening tool according to the present embodiment.
Figure 14:
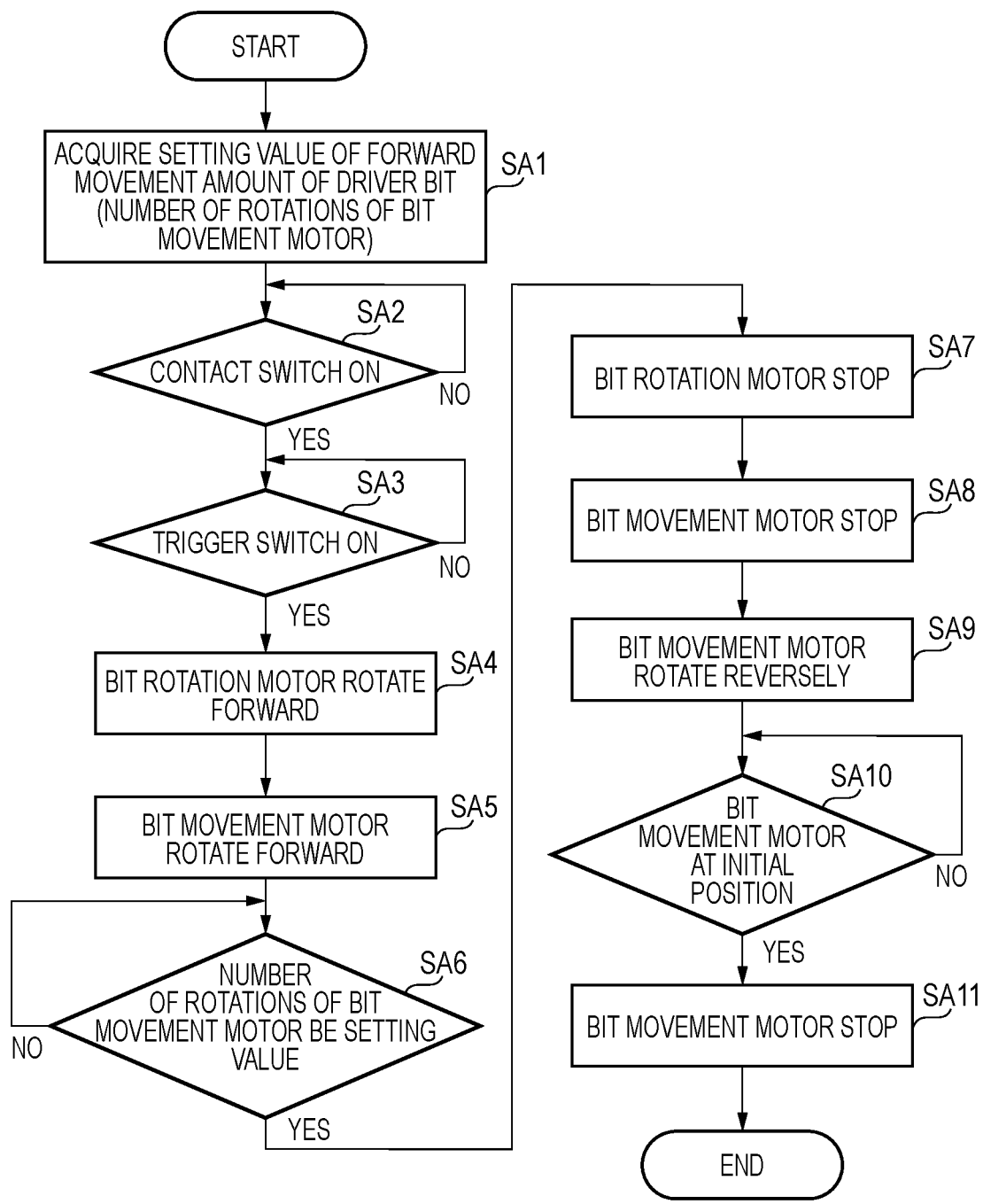
FIG. 14 is a flowchart showing an example of the operation of the fastening tool according to the present embodiment.

FIG. 13A is a side cross-sectional view showing an example of an operation of the fastening tool according to the present embodiment. FIG. 13B is a top cross-sectional view showing an example of the operation of the fastening tool according to the present embodiment. FIG. 14 is a flowchart showing an example of the operation of the fastening tool according to the present embodiment. Next, a fastening operation of the fastening tool according to the present embodiment will be described with reference to the drawings.

In a standby state of the fastening tool 1, as shown in FIG. 1A, a tip end of the driver bit 2 is positioned at a standby position P1 on a rear side of the injection passage 80, and the screw 200 can be supplied to the injection passage 80.

In step SA1 of FIG. 14, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SA2, the trigger 9 is operated, and the trigger switch portion 90 is turned on in step SA3, the control unit 100 drives the bit rotation motor 40 of the first drive unit 4 in step SA4, and drives the bit movement motor 50 of the second drive unit 5 in step SA5.

When the bit movement motor 50 is driven to rotate in a positive direction, which is one direction, the pulley 52 rotates in the positive direction, so that the wire 54 is wound around the pulley 52. When the wire 54 is wound around the pulley 52, the second moving member 32c connected to the wire 54 is guided by the rotation guide member 31 and moves in the forward direction along the axial direction. When the second moving member 32c moves in the forward direction, the first moving member 32a is pressed by the second moving member 32c via the bearing 32b, and moves in the forward direction along the axial direction together with the second moving member 32c while compressing the biasing member 33.

When the first moving member 32a moves in the forward direction, the holding member 30 connected to the first moving member 32a by the connecting member 30b moves in the forward direction along the axial direction of the driver bit 2 with the connecting member 30b guided by the groove portion 31a of the rotation guide member 31.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the rotation guide member 31 rotates in the positive direction. When the rotation guide member 31 rotates in the positive direction, the connecting member 30b connected to the holding member 30 is pressed by the groove portion 31a of the rotation guide member 31, so that the holding member 30 rotates together with the rotation guide member 31.

Accordingly, the driver bit 2 held by the holding member 30 rotates the screw 200 in the positive direction (clockwise)

and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target based on a load applied to the bit rotation motor 40, the number of rotations of the bit rotation motor 40, a load applied to the bit movement motor 50, the number of rotations of the bit movement motor 50, and the like, thereby causing the driver bit 2 to follow the screw to be screwed into the fastening target. In the present embodiment, the load applied to the bit rotation motor 40 or the like is a force based on resistance including a frictional force or the like generated between the screw 200 and the fastening target when the screw 200 is screwed into the fastening target.

When the control unit 100 determines that the number of rotations of the bit movement motor 50 reaches the setting value selected by the setting portion 110 in step SA6 and the tip end of the driver bit 2 reaches a set operation end position P2 as shown in FIGS. 13A and 13B, the control unit 100 stops driving of the bit rotation motor 40 in step SA7, stops rotation of the bit movement motor 50 in the positive direction in step SA8, and then reversely rotates the bit movement motor 50 in step SA9.

When the bit movement motor 50 rotates in a reverse direction, which is another direction, the pulley 52 rotates in the reverse direction, so that the wire 54 is pulled out from the pulley 52. When the wire 54 is pulled out from the pulley 52, the second moving member 32c moves in the forward direction, so that the compressed biasing member 33 extends and presses the second moving member 32c in the rearward direction.

The second moving member 32c is pressed rearward by the biasing member 33, thereby being guided by the rotation guide member 31 and moving rearward along the axial direction. When the second moving member 32c moves in the rearward direction, the first moving member 32a is pulled by the second moving member 32c via the bearing 32b, and moves in the rearward direction along the axial direction together with the second moving member 32c.

When the first moving member 32a moves in the rearward direction, the holding member 30 connected to the first moving member 32a by the connecting member 30b moves in the rearward direction along the axial direction of the driver bit 2 with the connecting member 30b guided by the groove portion 31a of the rotation guide member 31.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SA10, the control unit 100 stops the reverse rotation of the bit movement motor 50 in step SA11.

Since the moving member 32 includes the buffer member 32d made of rubber or the like on the rear side of the second moving member 32c, it is possible to prevent the second moving member 32c from directly hitting the rear frame 10c due to movement of the second moving member 32c in the rear direction, and it is possible to prevent occurrence of sound or damage. When the trigger switch portion 90 is turned off, the control unit 100 rotates the screw feeding motor 70 in one direction to lower the engagement portion 73. When the engagement portion 73 is lowered to a position where the engagement portion 73 is engaged with the next screw 200, the control unit 100 causes the screw feeding motor 70 to rotate reversely, thereby raising the engagement portion 73 and supplying the next screw 200 to the injection passage 80.

Figure 15A:
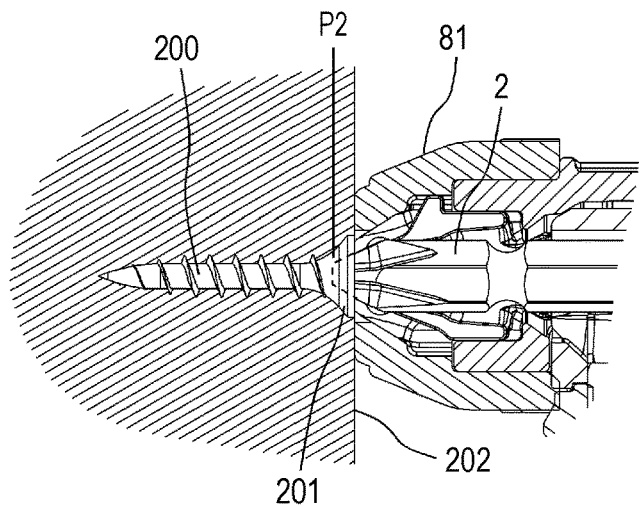
FIG. 15A is a cross-sectional view showing a fastening state of a screw.
Figure 15B:
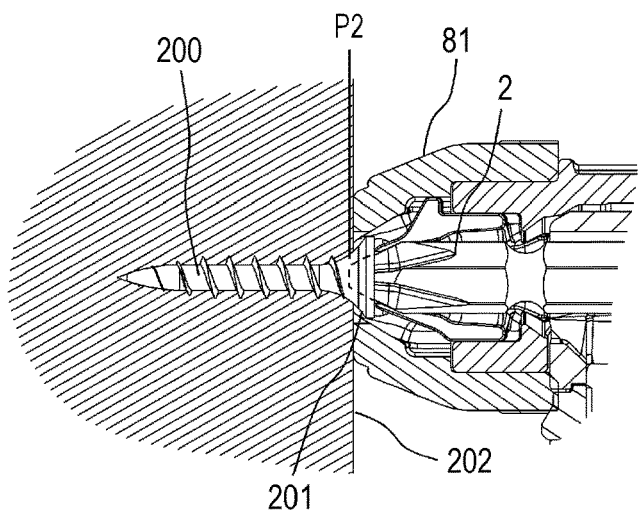
FIG. 15B is a cross-sectional view showing a fastening state of the screw.
Figure 15C:
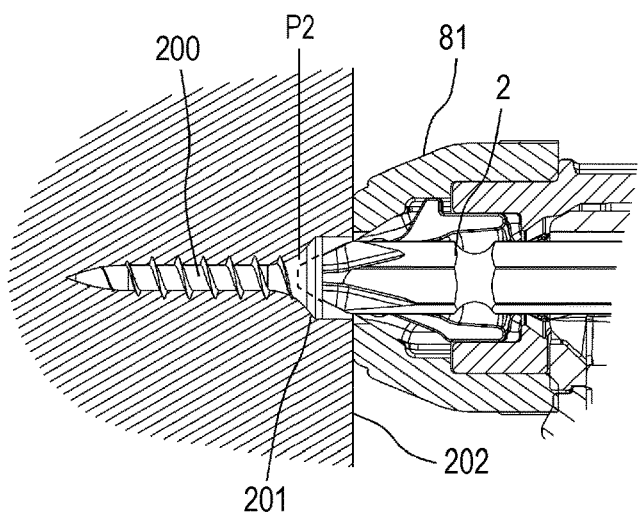
FIG. 15C is a cross-sectional view showing a fastening state of the screw.

FIGS. 15A to 15C are cross-sectional views showing fastening states of the screw, in which FIG. 15A shows a so-called flush state in which a head portion 201 of the screw 200 does not float up from or is not buried in a surface of a fastening target 202, FIG. 15B shows a state in which the head portion 201 of the screw 200 floats from the fastening target 202, and FIG. 15C shows a state in which the head portion 201 of the screw 200 is buried in the fastening target 202.

In the fastening tool 1, when the tip end of the driver bit 2 reaches the operation end position P2, in a case where the screw 200 is a countersunk head screw, as shown in FIG. 15A, the forward movement amount of the driver bit 2 is preferably set such that the surface of the head portion 201 of the screw 200 is in the so-called flush state in which the surface of the head portion 201 is the same as a surface of the fastening target 202. The screw 200 is not limited to the countersunk head screw, and if the screw 200 is a pan head, a bind, a truss, or the like, it is preferable that the forward movement amount of the driver bit 2 is set so that a seating surface of the head portion 201 of the screw 200 contacts the surface of the fastening target 202 and the head portion 201 of the screw 200 does not float from the fastening target 202.

When the tip end of the driver bit 2 reaches the operation end position P2, if the head portion 201 of the screw 200 is in a state of floating from the fastening target 202 as shown in FIG. 15B, the movement amount (forward movement amount) of the driver bit 2 is set by the setting portion 110, and the forward movement amount of the driver bit 2 is increased by increasing the number of rotations (rotation amount) of the bit movement motor 50, and the operation end position P2 is moved forward. On the other hand, when the head portion 201 of the screw 200 is in a state of being buried in the fastening target 202 as shown in FIG. 15C, the movement amount (forward movement amount) of the driver bit 2 is set by the setting portion 110, and the forward movement amount of the driver bit 2 is decreased by decreasing the number of rotations of the bit movement motor 50, and the operation end position P2 is retreated.

As described above, the movement amount (forward movement amount) of the driver bit 2 is defined by the number of rotations of the bit movement motor 50. The bit movement motor 50 is rotated by the number of rotations set by the setting portion 110 starting from the standby position P1, which is an initial position of the driver bit 2, and then the rotation of the bit movement motor 50 is stopped or reversed, so that the operation end position P2 is controlled. Therefore, a tightening depth can be adjusted.

Thus, in order to make it possible to advance a tip end position of the driver bit 2 held by the holding member 30 by a predetermined amount based on the number of rotations of the bit movement motor 50 with reference to the predetermined standby position P1, a standby position of the holding member 30 to which the driver bit 2 is attached and the moving member 32 that moves the holding member 30 is set. An operation of setting the standby position of the holding member 30 and the moving member 32 is referred to as a first initialization operation.

The holding member 30 and the moving member 32 are moved to the set standby position before start of driving and fastening operations, and a position of the holding member 30 and the moving member 32 is controlled by the number of rotations of the bit movement motor 50 with reference to the standby position. The holding member 30 and the moving member 32 are moved forward from the set standby position by a predetermined movement amount (forward movement amount) to perform the fastening operation. An operation of moving the holding member 30 and the moving member 32 to the standby position set in the first initialization operation is referred to as a second initialization operation.

It is conceivable that, as the setting unit that sets the standby position of the holding member 30 and the moving member 32 in the first initialization operation, a sensor is used, or a maximum position in a range in which the holding member 30 and the moving member 32 can move forward and rearward is used as a reference. When the sensor is used, a detection position of the sensor or a position moved from the detection position by a specified amount is set as the standby position.

When the maximum position in the range in which the holding member 30 and the moving member 32 can move forward and rearward is used, a position obtained by moving the holding member 30 and the moving member 32 from a front end position or a rear end position by a specified amount is set as the standby position.

FIGS. 16A to 16D are diagrams showing examples of an operation of setting the standby position of the holding member and the moving member in the first initialization operation. Next, the operation of setting the standby position of the holding member 30 and the moving member 32 will be described. FIGS. 16A to 16D show the examples of the operation of setting the standby position of the holding member 30 and the moving member 32 using the maximum position in the range in which the holding member 30 and the moving member 32 can move forward and rearward.

Figure 16A:
FIG. 16A is a diagram showing an example of an operation of setting a standby position of a holding member and a moving member in a first initialization operation.

As shown in FIG. 16A, the control unit 100 rotates the bit movement motor 50 in the positive direction, which is the one direction, from a state in which the holding member 30 and the moving member 32 are at a desired position. When the bit movement motor 50 rotates forward, the wire 54 is wound around the pulley 52, so that the moving member 32 and the holding member 30 connected to the moving member 32 move in the forward direction along the axial direction of the driver bit 2 along the rotation guide member 31.

Figure 16B:
FIG. 16B is a diagram showing an example of the operation of setting the standby position of the holding member and the moving member in the first initialization operation.

As shown in FIG. 16B, when the bit movement motor 50 rotates forward until the holding member 30 and the moving member 32 move to a front end position PF that is one end position, the control unit 100 stops the forward rotation of the bit movement motor 50 and moves the holding member 30 and the moving member 32 to the front end position PF.

Next, the control unit 100 rotates the bit movement motor 50 in the reverse direction, which is the other direction. When the bit movement motor 50 rotates reversely, the wire 54 is pulled out from the pulley 52, so that the moving member 32 is pressed in the rearward direction by the biasing member 33, and the moving member 32 and the holding member 30 connected to the moving member 32 move in the rearward direction along the axial direction of the driver bit 2 along the rotation guide member 31.

Figure 16C:
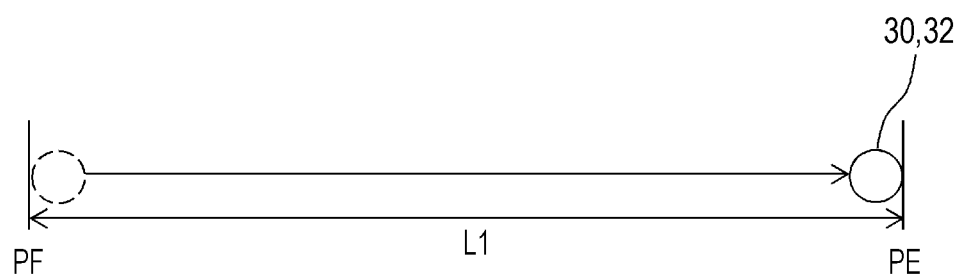
FIG. 16C is a diagram showing an example of the operation of setting the standby position of the holding member and the moving member in the first initialization operation.

As shown in FIG. 16C, when the bit movement motor 50 rotates reversely until the holding member 30 and the moving member 32 move to a rear end position PE that is another end position, the control unit 100 stops the reverse rotation of the bit movement motor 50 and moves the holding member 30 and the moving member 32 to the rear end position PE by biasing of the biasing member 33.

The control unit 100 acquires a movement amount of the holding member 30 and the moving member 32 from the front end position PF to the rear end position PE as a total distance L1. The movement amount from the front end position PF to the rear end position PE is obtained from the number of rotations of the bit movement motor 50.

In the control unit 100, a movement amount of the holding member 30 and the moving member 32 from the standby position to the front end position PF is set in advance as a target movement amount L2. The control unit 100 sets a standby position movement amount L3 to a difference between the total distance L1 from the front end position PF to the rear end position PE and the target movement amount L2 set in advance, and stores the standby position movement amount L3. The standby position movement amount L3 is a movement amount of the holding member 30 and the moving member 32 from the rear end position PE.

Figure 16D:
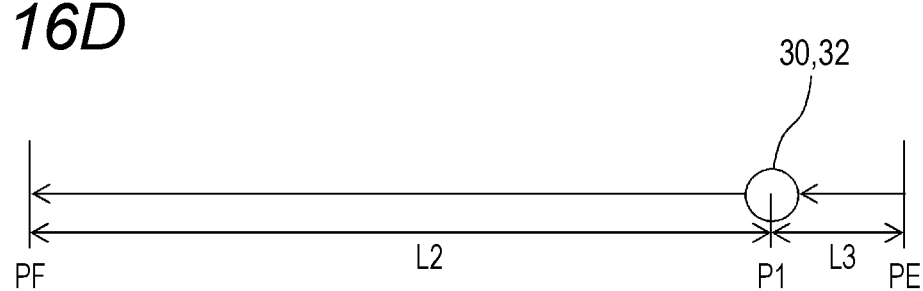
FIG. 16D is a diagram showing an example of the operation of setting the standby position of the holding member and the moving member in the first initialization operation.

As shown in FIG. 16D, the control unit 100 rotates the bit movement motor 50 forward to move the holding member 30 and the moving member 32 in the forward direction from the rear end position PE. When the bit movement motor 50 is rotated forward at the number of rotations corresponding to the standby position movement amount L3, the control unit 100 stops the forward rotation of the bit movement motor 50, moves the holding member 30 and the moving member 32 to the standby position, and moves the tip end of the driver bit 2 held by the holding member 30 to the standby position P1.

When the holding member 30 and the moving member 32 are moved to the front end position PF and the rear end position PE, it is desirable to drive the holding member 30 and the moving member 32 at a low speed that does not affect durability of a tool, for example, when the second moving member 32c hits the buffer member 32d.

Figure 17A:
FIG. 17A is a diagram showing an example of an operation of moving the holding member and the moving member to the standby position in a second initialization operation.
Figure 17B:
FIG. 17B is a diagram showing an example of the operation of moving the holding member and the moving member to the standby position in the second initialization operation.
Figure 17C:
FIG. 17C is a diagram showing an example of the operation of moving the holding member and the moving member to the standby position in the second initialization operation.

FIGS. 17A to 17C are diagrams showing examples of an operation of moving the holding member and the moving member to the standby position in the second initialization operation. Next, the operation of moving the holding member 30 and the moving member 32 to the standby position set in advance will be described.

As shown in FIG. 17A, the control unit 100 rotates the bit movement motor 50 in the reverse direction, which is the other direction, from a state in which the holding member 30 and the moving member 32 are at a desired position. When the bit movement motor 50 rotates reversely, the wire 54 is pulled out from the pulley 52, so that the moving member 32 is pressed in the rearward direction by the biasing member 33, and the moving member 32 and the holding member 30 connected to the moving member 32 move in the rearward direction along the axial direction of the driver bit 2 along the rotation guide member 31.

As shown in FIG. 17B, when the bit movement motor 50 rotates reversely until the holding member 30 and the moving member 32 move to the rear end position PE, the control unit 100 stops the reverse rotation of the bit movement motor 50 and moves the holding member 30 and the moving member 32 to the rear end position PE by biasing of the biasing member 33.

As shown in FIG. 17C, the control unit 100 rotates the bit movement motor 50 forward to move the holding member 30 and the moving member 32 in the forward direction from the rear end position PE. When the bit movement motor 50 is rotated forward at the number of rotations corresponding to the standby position movement amount L3, the control unit 100 stops the forward rotation of the bit movement motor 50, moves the holding member 30 and the moving member 32 to the standby position, and moves the tip end of the driver bit 2 held by the holding member 30 to the standby position P1.

In the first initialization operation described with reference to FIGS. 16A to 16D, an operation of setting the standby position of the holding member 30 and the moving member 32 is executed in a factory, for example, at the time of shipment of a product without depending on an operation of a user, and the standby position movement amount L3 is stored in advance.

On the other hand, in the second initialization operation described with reference to FIGS. 17A to 17C, an operation of moving the holding member 30 and the moving member 32 to the standby position based on the standby position movement amount L3 is preferably performed every time a power supply of the fastening tool 1 is turned on so that a stable fastening operation can be performed.

Therefore, the first initialization operation and the second initialization operation, which are initialization operations related to the standby position of the holding member 30 and the moving member 32, can be selected.

Figure 18:
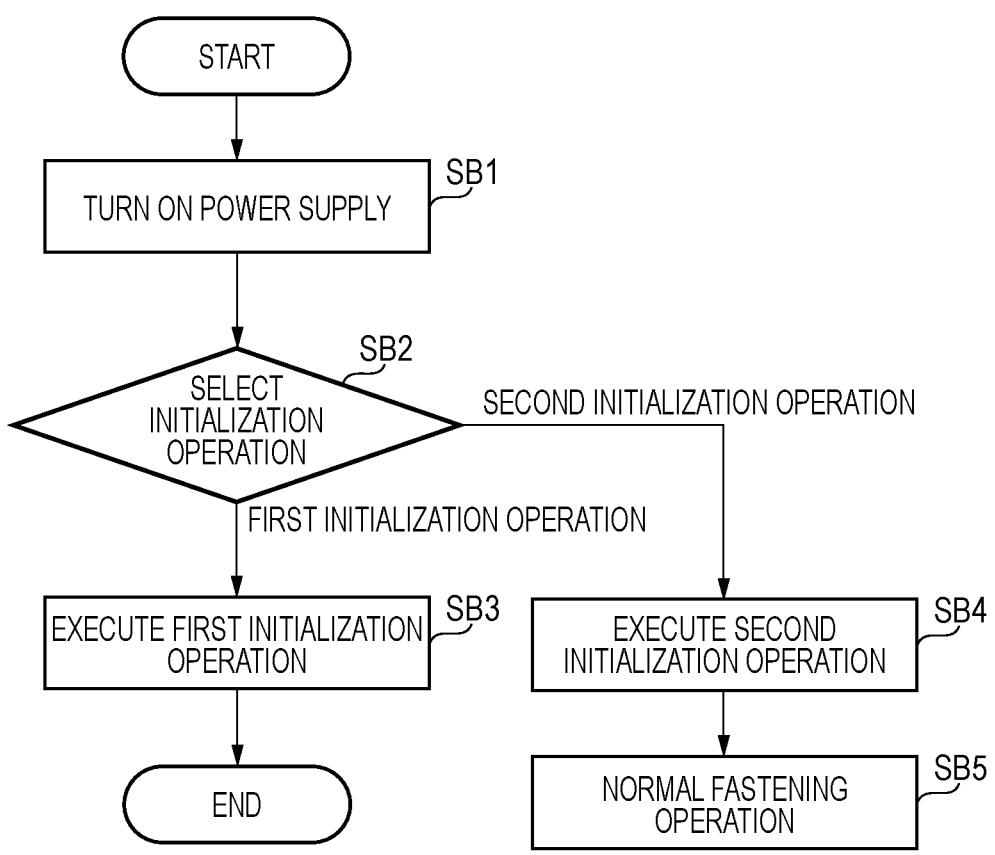
FIG. 18 is a flowchart showing an example of an operation of selecting the first initialization operation and the second initialization operation.

FIG. 18 is a flowchart showing an example of an operation of selecting the first initialization operation and the second initialization operation.

When the power supply is turned on in step SB1 of FIG. 18, the control unit 100 selects an initialization operation to be executed in step SB2. When the control unit 100 selects execution of the first initialization operation, in step SB3, the control unit 100 executes the first initialization operation described above with reference to FIGS. 16A to 16D and sets the standby position of the holding member 30 and the moving member 32. When the control unit 100 selects execution of the second initialization operation, in step SB4, the control unit 100 executes the second initialization operation described above with reference to FIGS. 17A to 17C and moves the holding member 30 and the moving member 32 to the standby position based on the standby position movement amount L3. After executing the second initialization operation, the control unit 100 executes a normal fastening operation in step SB5 according to the flowchart of FIG. 14 described above.

As described above, in the first initialization operation, the holding member 30 and the moving member 32 are moved at a low speed from the front end position PF to the rear end position PE, the total distance L1 from the front end position PF to the rear end position PE is acquired, a movement amount from the rear end position PE, which is determined so that a movement amount from the front end position PF becomes the predetermined target movement amount L2, is set as the standby position movement amount L3, and the standby position movement amount L3 is recorded in a memory on the substrate (not shown) forming the control unit 100. Accordingly, various variations of a machine, such as a difference in dimension within a range of tolerance, can be eliminated, and the standby position of the holding member 30 and the moving member 32 can be set to, for example, a constant position from the front end position PF.

In the second initialization operation, the holding member 30 and the moving member 32 are moved from the rear end position PE to the standby position according to the standby position movement amount L3 every time the power supply is turned on for use by the user, so that the movement amount of the holding member 30 and the moving member 32 can be minimized. Further, in the second initialization operation, the second initialization operation can be executed in a state where the tip end of the driver bit 2 is positioned at the standby position P1 on the rear side of the injection passage 80 and the screw 200 is supplied to the injection passage 80.

As described above, the movement amount (forward movement amount) of the driver bit 2 is defined by the number of rotations of the bit movement motor 50 starting from the standby position of the holding member 30 and the moving member 32, that is, the standby position P1 of the driver bit 2. Therefore, when the standby position of the holding member 30 and the moving member 32, that is, the standby position P1 of the driver bit 2 varies, the tightening depth set by the setting portion 110 varies.

On the other hand, by performing the second initialization operation every time the power supply is turned on, it is possible to accurately adjust the tightening depth of the screw by the operation of rotating the bit movement motor 50 by the number of rotations set by the setting portion 110 starting from the standby position of the holding member 30 and the moving member 32, that is, the standby position P1 of the driver bit 2.

Figure 19:
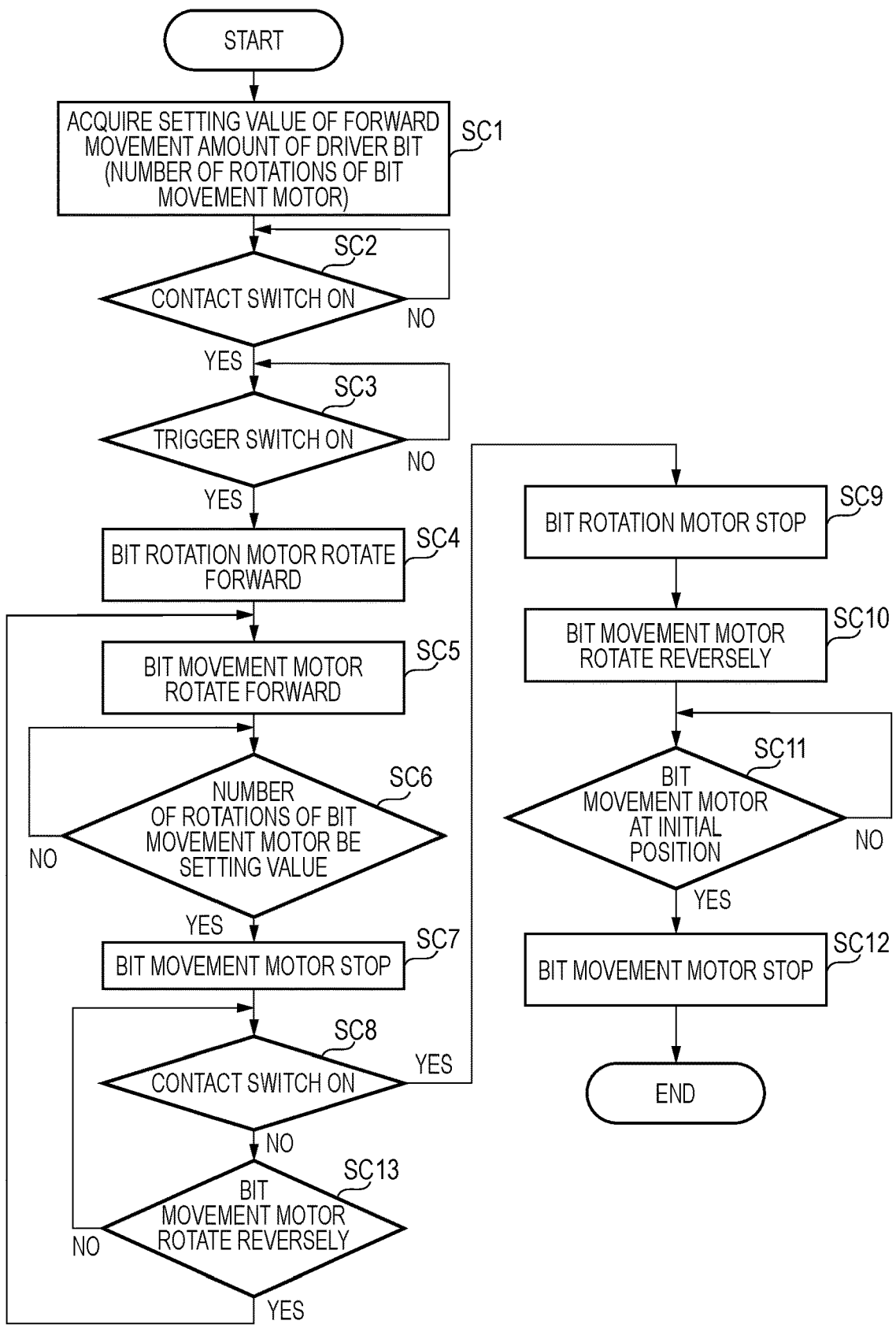
FIG. 19 is a flowchart showing a modification of the operation of the fastening tool according to the present embodiment.
Figure 20:
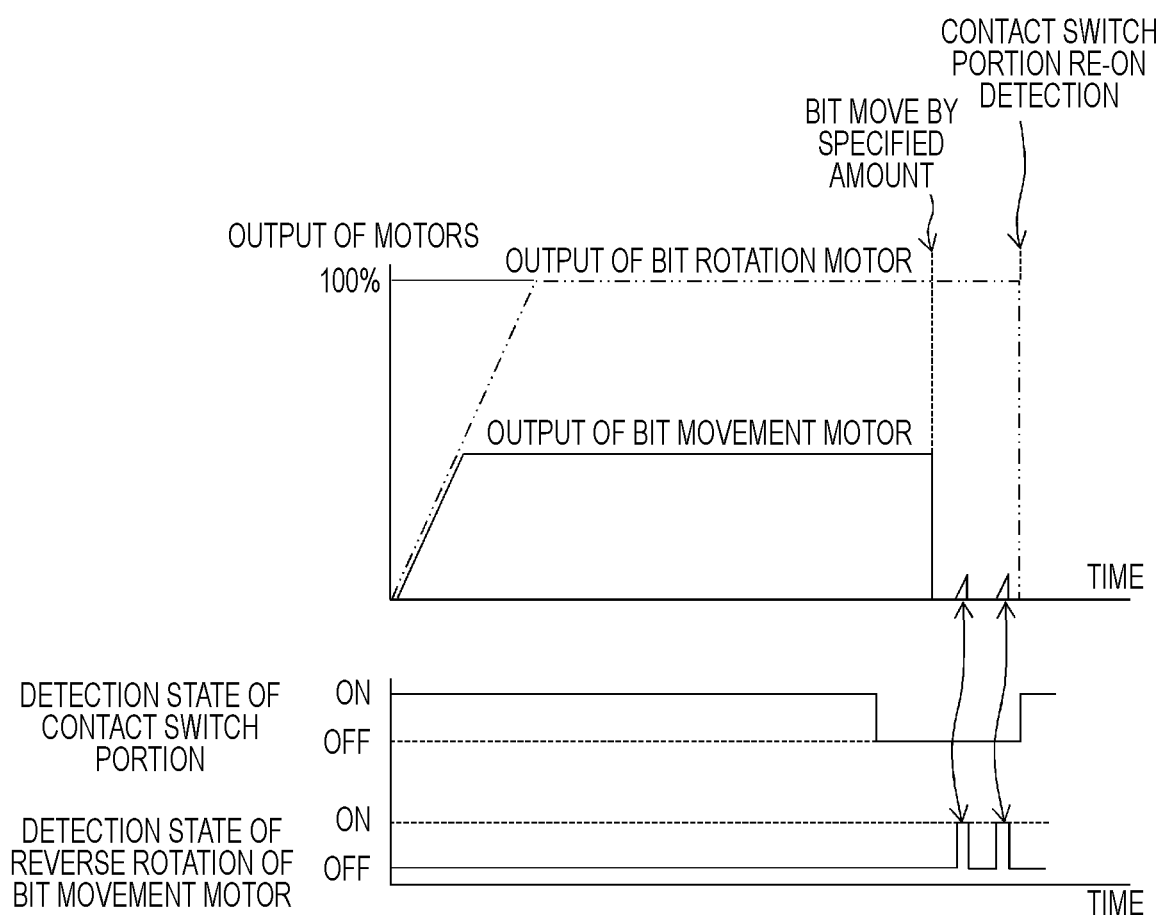
FIG. 20 is a graph showing a relationship between output of a contact switch portion and control over a bit rotation motor and a bit movement motor.

FIG. 19 is a flowchart showing a modification of the operation of the fastening tool according to the present embodiment. FIG. 20 is a graph showing a relationship between output of the contact switch portion and control over the bit rotation motor and the bit movement motor. Next, another example of the fastening operation of the fastening tool according to the present embodiment will be described with reference to the drawings. In this modification, the bit rotation motor 40 and the bit movement motor 50 are controlled by detecting whether the fastening tool 1 floats up with respect to the fastening target from the output of the contact switch portion 84.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SC1 of FIG. 19, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SC2, the trigger 9 is operated, and the trigger switch portion 90 is turned on in step SC3, the control unit 100 drives the bit rotation motor 40 of the first drive unit 4 in step SC4, and drives the bit movement motor 50 of the second drive unit 5 in step SC5.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target based on a load applied to the bit rotation motor 40, the number of rotations of the bit rotation motor 40, a load applied to the bit movement motor 50, the number of rotations of the bit movement motor 50, and the like, thereby causing the driver bit 2 to follow the screw to be screwed into the fastening target.

When the control unit 100 determines in step SC6 that the number of rotations of the bit movement motor 50 reaches the setting value selected by the setting portion 110 and the tip end of the driver bit 2 reaches the set operation end position P2, the control unit 100 stops driving of the bit movement motor 50 in step SC7.

When the control unit 100 stops driving of the bit movement motor 50 in step SC7, the control unit 100 determines whether the contact switch portion 84 is turned on in step SC8. When the contact switch portion 84 is turned on, the control unit 100 determines that the fastening tool 1 does not float up in the direction away from the fastening target, stops rotation of the bit rotation motor 40 in the positive direction in step SC9, and rotates the bit movement motor 50 reversely in step SC10 in order to end the fastening operation.

When the bit movement motor 50 rotates in the reverse direction, which is the other direction, the pulley 52 rotates in the reverse direction, so that the wire 54 is pulled out from the pulley 52, and the moving member 32 in which the second moving member 32*c* is pressed by the biasing member 33 and the holding member 30 connected to the moving member 32 by the first moving member 32*a* move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SC11, the control unit 100 stops the reverse rotation of the bit movement motor 50 in step SC12.

When the contact switch portion 84 is turned off in step SC8, the control unit 100 determines that the fastening tool 1 floats up in the direction away from the fastening target, and continues driving for rotating the bit rotation motor 40 in the positive direction in a state where driving of the bit movement motor 50 is stopped.

Accordingly, the driver bit 2 held by the holding member 30 rotates the screw 200 in the positive direction and further screws the screw 200 into the fastening target, so that the fastening tool 1 moves in a direction approaching the fastening target. Therefore, the fastening tool 1 moves relative to the contact arm 82, and the contact switch portion 84 is pressed by the contact arm 82, and the contact switch portion 84 is turned on. When the contact switch portion 84 is turned on, the control unit 100 executes processing of steps SC9 to SC12 described above in order to end the fastening operation, and performs operations of stopping the bit rotation motor 40 and returning the driver bit 2 to the standby position by the reverse rotation of the bit movement motor 50.

In a state in which the contact switch portion 84 is turned off and driving of the bit movement motor 50 is stopped, by performing control called a braking operation in which the bit movement motor 50 does not rotate by an external force during an operation of rotating the bit rotation motor 40 in the positive direction, the control unit 100 maintains a state in which the holding member 30, the moving member 32, and the driver bit 2 held by the holding member 30 are stopped at the operation end position P2.

However, in a state in which driving of the bit movement motor 50 is stopped, during the operation of rotating the bit rotation motor 40 in the positive direction, the screw 200 is tightened while a force is applied in a direction of pressing the fastening tool 1 against the fastening target by the operator. Therefore, even when the braking operation is performed on the bit movement motor 50, the holding member 30, the moving member 32, and the driver bit 2 held by the holding member 30 may move in the rearward direction from the operation end position P2 due to a force applied by the operator.

Therefore, the control unit 100 detects presence or absence of reverse rotation of the bit movement motor 50 in step SC13, and when the reverse rotation of the bit movement motor 50 is detected, the control unit 100 returns to step SCS, rotates the bit movement motor 50 forward, moves the holding member 30 and the moving member 32 in the forward direction, and returns the driver bit 2 to the operation end position P2. Then, the forward rotation of the bit movement motor 50 is stopped, and the braking operation is performed.

In order to switch ON or OFF the contact switch portion 84 by the contact arm 82, it is necessary to move the contact arm 82 by a predetermined amount. Therefore, as described above, it is detected that the contact switch portion 84 is OFF in step SC8, and in a state in which the driving of the bit movement motor 50 is stopped, the driving of rotating the bit rotation motor 40 in the positive direction is continued, and the position of the holding member 30 and the moving member 32 may fluctuate while the contact arm 82 moves until the contact switch portion 84 is switched from OFF to ON. Therefore, it is desirable to provide a detection unit that detects a position of the contact arm 82. Rotation of the bit holding portion 3 and movement of the bit holding portion 3 in the axial direction may be performed by a single motor. The control unit 100 may control a timing of stopping driving of the single motor based on presence or absence of an operation of the contact switch portion 84.

Figure 21:
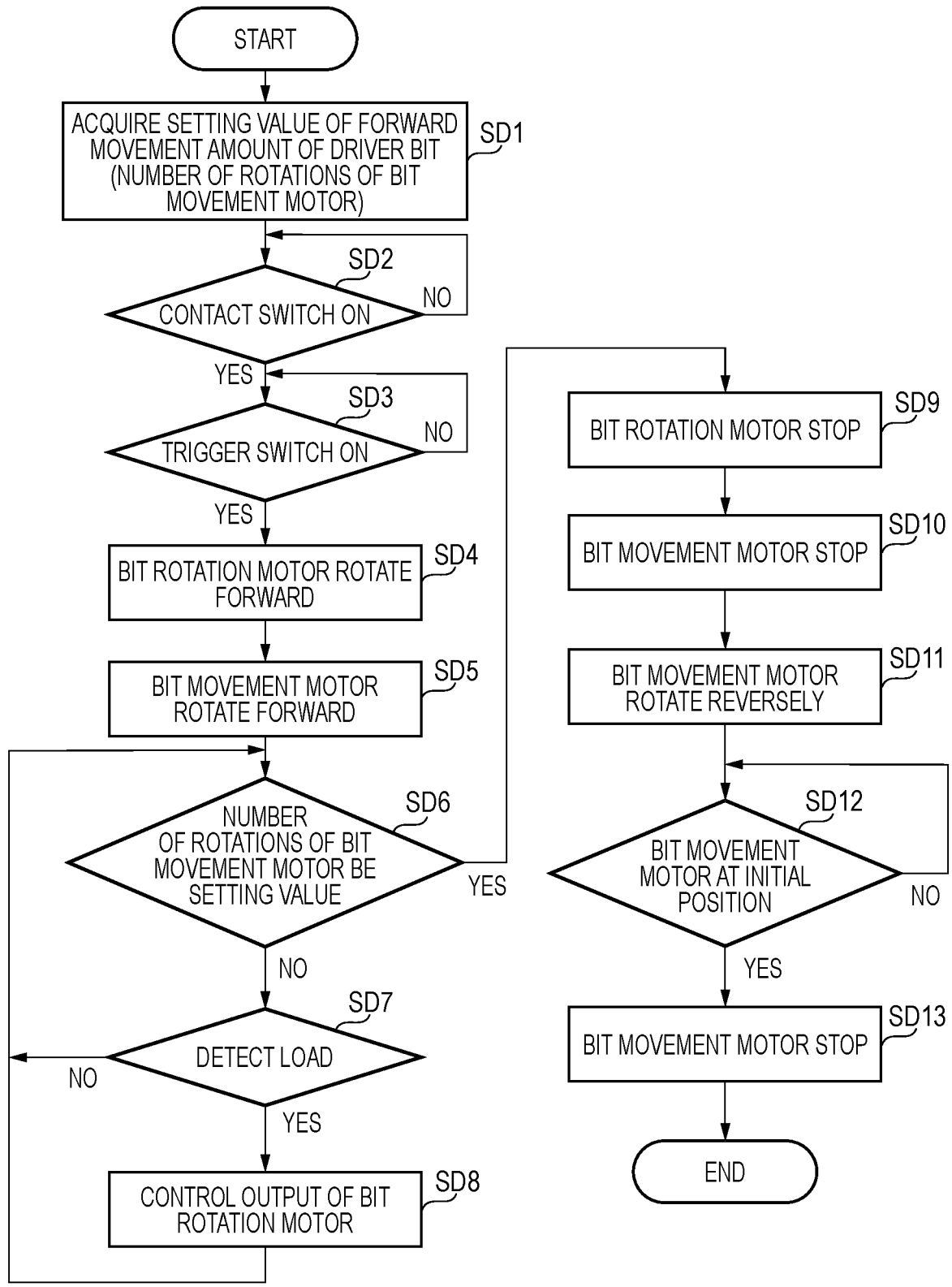
FIG. 21 is a flowchart showing another modification of the operation of the fastening tool according to the present embodiment.
Figure 22A:
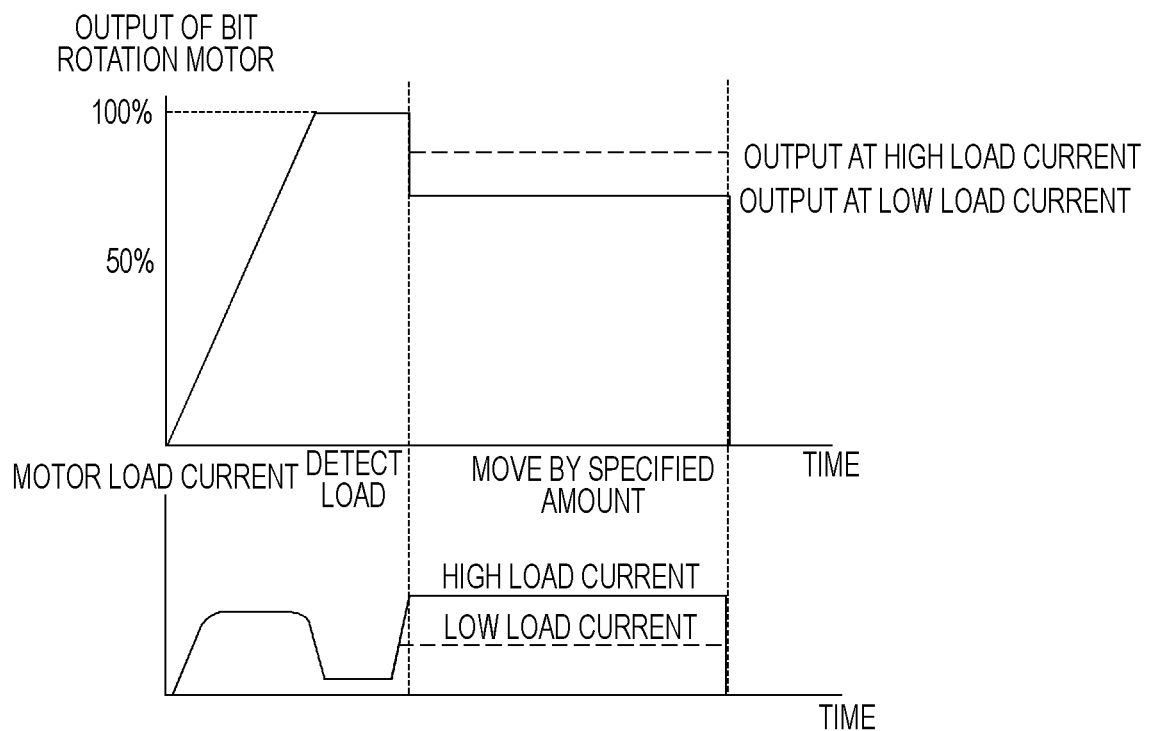
FIG. 22A is a graph showing a relationship between a load and control over the bit rotation motor.
Figure 22B:
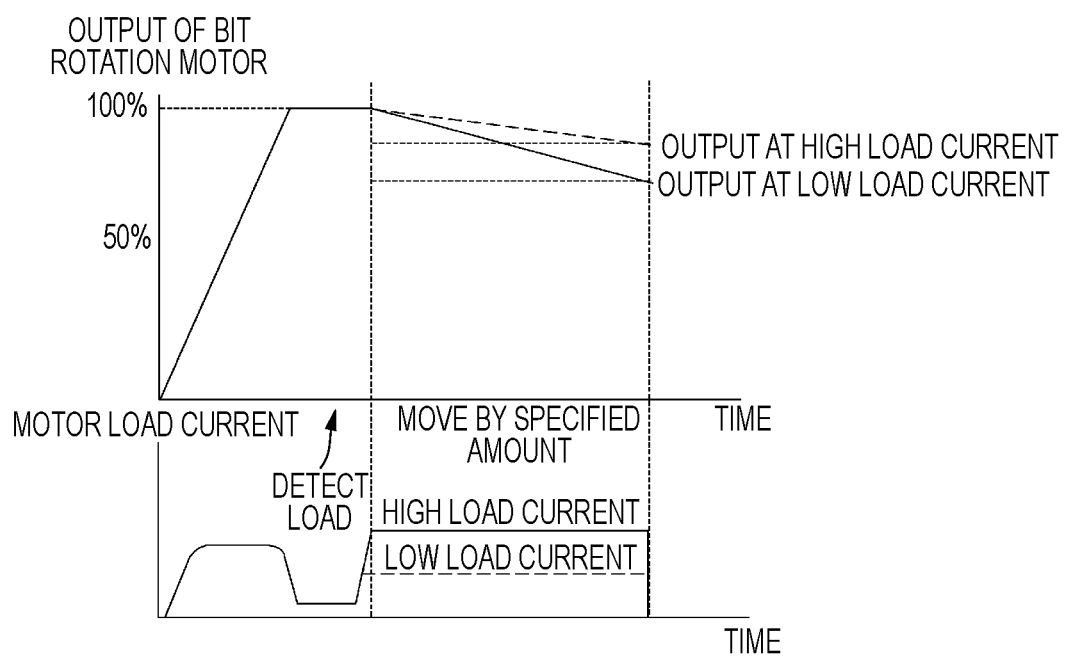
FIG. 22B is a graph showing a relationship between a load and control over the bit rotation motor.

FIG. 21 is a flowchart showing another modification of the operation of the fastening tool according to the present embodiment. FIGS. 22A and 22B are graphs showing relationships between loads and control over the bit rotation motor. Next, the other modification of the fastening operation of the fastening tool according to the present embodiment will be described with reference to the drawings. In this modification, a load applied to the bit rotation motor 40 is detected to control the bit rotation motor 40.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SD1 of FIG. 21, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SD2, the trigger 9 is operated, and the trigger switch portion 90 is turned on in step SD3, the control unit 100 drives the bit rotation motor 40 of the first drive unit 4 in step SD4, and drives the bit movement motor 50 of the second drive unit 5 in step SD5.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target based on a load applied to the bit rotation motor 40, the number of rotations of the bit rotation motor 40, a load applied to the bit movement motor 50, the number of rotations of the bit movement motor 50, and the like, thereby causing the driver bit 2 to follow the screw to be screwed into the fastening target.

In step SD6, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 detects a load applied to the bit rotation motor 40 in step SD7, and when the control unit 100 detects a predetermined load, the control unit 100 controls the bit rotation motor 40 in step SD8.

A rotation speed of the driver bit 2 differs depending on a magnitude of the load applied to the bit rotation motor 40. If a current value and a voltage value applied to the bit rotation motor 40 are the same, the higher the load applied to the bit rotation motor 40, the lower the rotation speed. Therefore, the control unit 100, as a fluctuation detection unit that detects a factor causing a fluctuation in a rotation speed of the bit rotation motor 40, detects a load applied to the bit rotation motor 40, and decreases output of the bit rotation motor 40, such as decreasing a voltage value applied to the bit rotation motor 40 or decreasing a current value applied to the bit rotation motor 40, as the load applied to the bit rotation motor 40 is low, as compared with a case where the load is high. For example, a threshold value serving as a reference for determining the magnitude of the load may be set in advance. When the detected load applied to the bit rotation motor 40 is equal to or more than the threshold value, the voltage value, the current value, or output of the bit rotation motor 40 or the like may be controlled to be decreased, and when the detected load applied to the bit rotation motor 40 is less than the threshold value, the voltage value, the current value, or the output of the bit rotation motor 40 or the like may be controlled to be increased.

Accordingly, when the load applied to the bit rotation motor 40 is low, the rotation speed of the bit rotation motor 40 is decreased, thereby preventing an increase in the rotation speed as compared with the case where the load is high, and preventing a difference in the rotation speed of the bit rotation motor 40 due to the magnitude of the load applied to the bit rotation motor 40. Therefore, occurrence of variation in a speed at which the screw 200 is fastened is prevented.

When the control unit 100 determines that the number of rotations of the bit movement motor 50 reaches the setting value selected by the setting portion 110 and the tip end of the driver bit 2 reaches the set operation end position P2 in step SD6, the control unit 100 stops driving of the bit rotation motor 40 in step SD9, stops rotation of the bit movement motor 50 in the positive direction in step SD10, and then reversely rotates the bit movement motor 50 in step SD11.

When the bit movement motor 50 rotates in the reverse direction, which is the other direction, the pulley 52 rotates in the reverse direction, so that the wire 54 is pulled out from the pulley 52, and the moving member 32 in which the second moving member 32c is pressed by the biasing member 33 and the holding member 30 connected to the moving member 32 by the first moving member 32a move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SD12, the control unit 100 stops the reverse rotation of the bit movement motor 50 in step SD13.

In control for decreasing output of the bit rotation motor 40, as shown in FIG. 22A, after a predetermined load is detected, the output may be decreased so that the rotation speed becomes constant until the bit rotation motor 40 rotates at the number of rotations for moving the driver bit 2 to the operation end position. As shown in FIG. 22B, after the predetermined load is detected, the output may be gradually decreased so as to reach a target rotation speed until the bit rotation motor 40 rotates at the number of rotations for moving the driver bit 2 to the operation end position.

A fluctuation in a power supply voltage causes a difference in the rotation speed of the driver bit 2, and the lower the power supply voltage, the lower the rotation speed. Therefore, the control unit 100, as the fluctuation detection unit that detects a factor causing a fluctuation in the rotation speed of the bit rotation motor 40, detects the power supply voltage, and decreases the output of the bit rotation motor 40 as the power supply voltage is high, as compared with a case where the power supply voltage is low.

Accordingly, when the power supply voltage is high, the rotation speed of the bit rotation motor 40 is decreased as compared with a case where the power supply voltage is low, so that occurrence of a difference in the rotation speed of the bit rotation motor 40 due to a fluctuation in the power supply voltage is prevented. Therefore, occurrence of variation in the speed at which the screw 200 is fastened is prevented.

The control unit 100 may set the target rotation speed of the bit rotation motor 40, detect the rotation speed of the bit rotation motor 40, compare the detected rotation speed of the bit rotation motor 40 with the target rotation speed of the bit rotation motor 40 set in advance, and control the bit rotation motor 40 so as to achieve the target rotation speed.

If the rotation speed of the bit rotation motor 40 is decreased, it becomes a factor that a working speed of fastening the screw to the fastening target is decreased. On the other hand, during a stop processing of the bit rotation motor 40 after the screw is tightened to a target screw tightening depth set by the setting portion 110, the screw is tightened to the fastening target by rotation of the driver bit 2 until rotation of the bit rotation motor 40 is completely stopped. Therefore, the faster the rotation speed of the bit rotation motor 40 immediately before the rotation is stopped, the more the screw is tightened beyond the target.

Thus, a factor that a quality of a screw tightening operation is decreased due to the difference in the rotation speed of the bit rotation motor 40 is the rotation speed immediately before the rotation of the bit rotation motor 40 is stopped. Therefore, if the rotation speed of the bit rotation motor 40 is constant, without an influence of a load, immediately before the movement amount (forward movement amount) of the holding member 30 and the moving member 32 reaches the target screw tightening depth set by the setting portion 110, a desired effect can be obtained.

The load applied to the bit rotation motor 40 increases when tightening of the screw to the fastening target is started, but the load fluctuates depending on a material of the fastening target and the like. Therefore, after the detection of the load described above for controlling the rotation speed of the bit rotation motor 40, control over the rotation speed of the bit rotation motor 40 described above based on the load, the power supply voltage, and the like is executed until the target screw tightening depth is reached.

A timekeeping unit is provided. The control unit 100 may control the rotation speed of the bit rotation motor 40 based on the load, the power supply voltage, and the like after a predetermined time elapses from start of driving of the bit rotation motor 40 (forward rotation). A position detection unit that detects the position of the holding member 30 and the moving member 32 may be provided. After the position of the holding member 30 and the moving member 32 reaches a predetermined position, the above control over the rotation speed of the bit rotation motor 40 based on the load, the power supply voltage, and the like may be executed. The predetermined position of the holding member 30 and the moving member 32 at which the control over the rotation speed of the bit rotation motor 40 is executed is set between a position where the above load is detected and a position where the target screw tightening depth is reached for controlling the rotation speed of the bit rotation motor 40.

In a method of setting the target rotation speed of the bit rotation motor 40 and controlling output, it is considered that the target screw tightening depth is reached before the rotation speed of the bit rotation motor 40 is decreased to the target rotation speed due to an influence of a length of a control execution section or the like. Therefore, during control of decreasing the rotation speed of the bit rotation motor 40 to the target rotation speed, braking control over the bit rotation motor 40 may be performed. For example, when a deviation between the target rotation speed of the bit rotation motor 40 and a detected actual rotation speed is large, the braking control over the bit rotation motor 40 may be performed until the deviation between the actual rotation speed and the target rotation speed falls within a specified range, and when the deviation falls within the specified range, the control of decreasing the rotation speed of the bit rotation motor 40 to the target rotation speed may be performed.

Further, if the driver bit 2 and the screw are disengaged after the driver bit 2 reaches the target screw tightening depth, the screw is not tightened any more even if the driver bit 2 rotate. Therefore, after the driver bit 2 moves forward until the driver bit 2 reaches the target screw tightening depth, the bit movement motor 50 may be rotated reversely before the rotation of the bit rotation motor 40 is stopped. The rotation of the bit holding portion 3 and the movement of the bit holding portion 3 in the axial direction may be performed by a single motor. The control unit 100 may detect a factor that causes a rotation speed of the motor to fluctuate, such as a load applied to the single motor, and control the motor.

Figure 23:
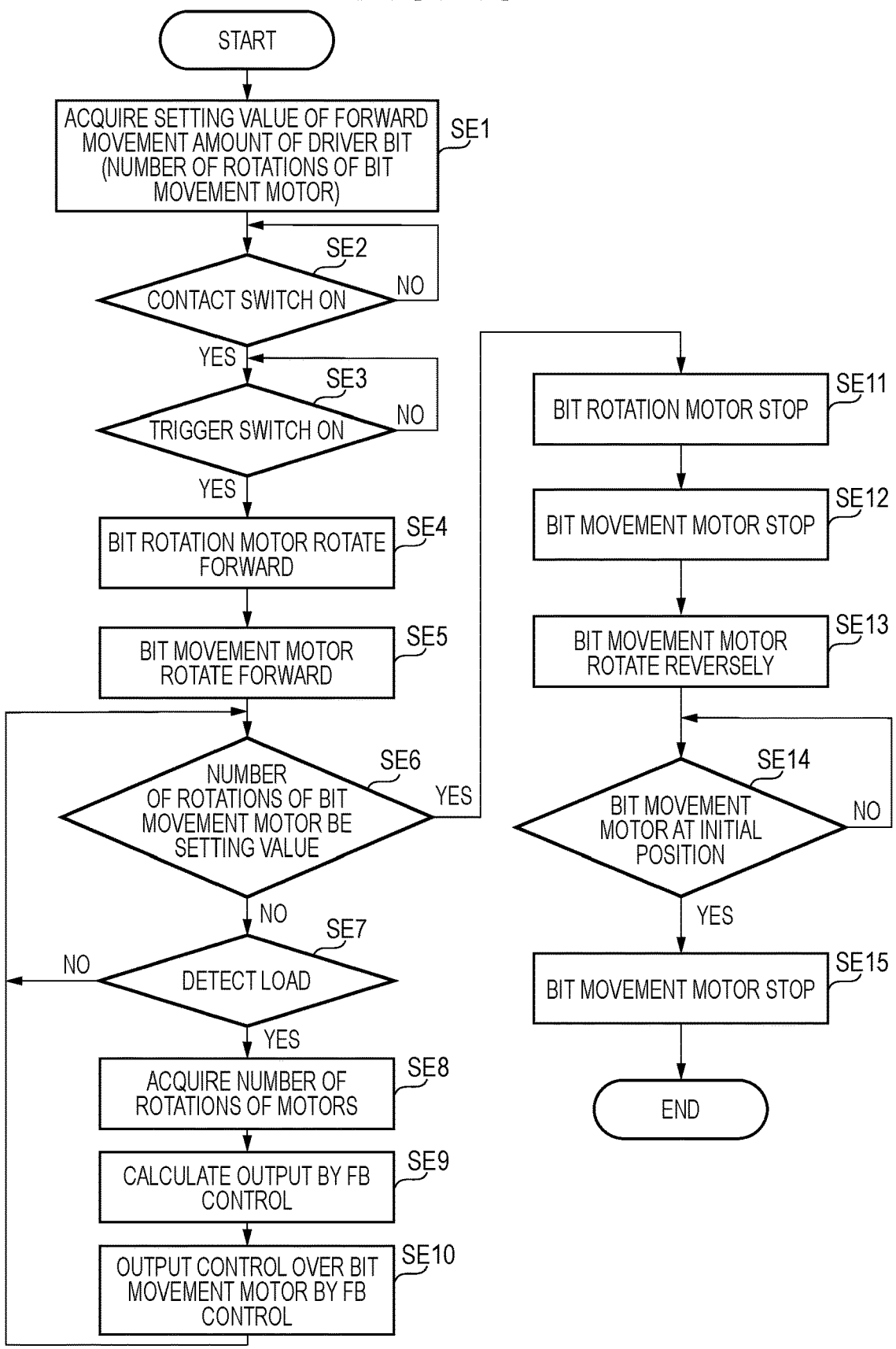
FIG. 23 is a flowchart showing another modification of the operation of the fastening tool according to the present embodiment.
Figure 24A:
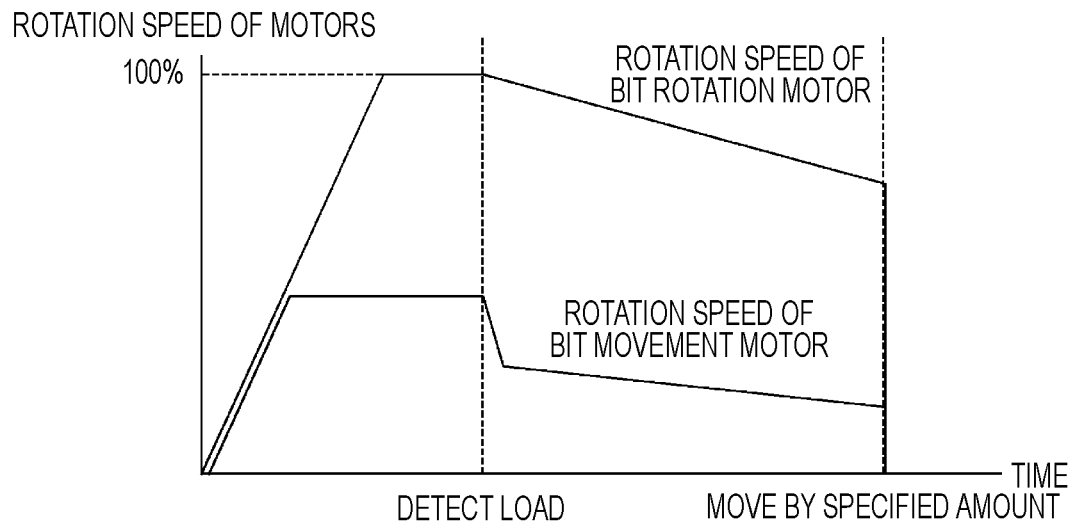
FIG. 24A is a graph showing a relationship between rotation speeds of the bit rotation motor and the bit movement motor under feedback control.
Figure 24B:
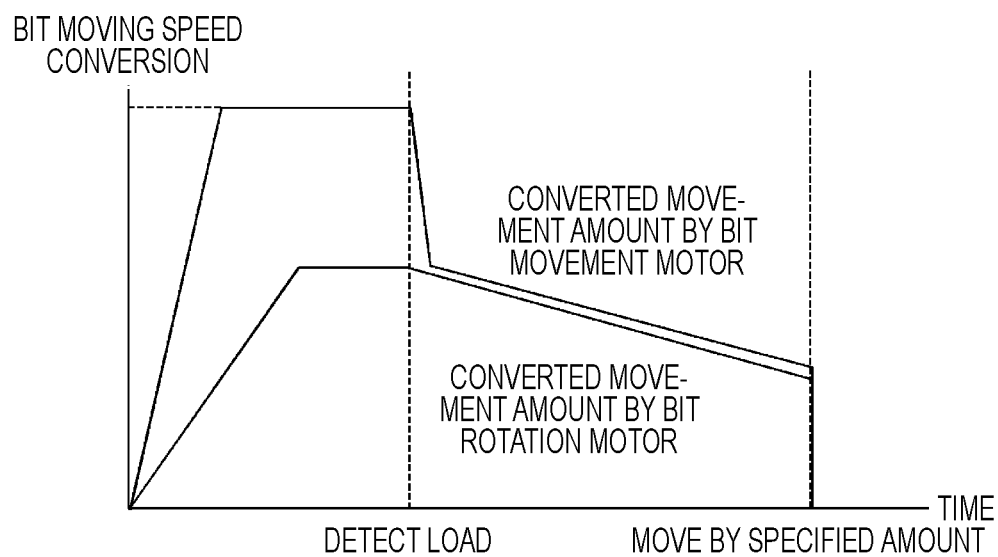
FIG. 24B is a graph showing a relationship between a moving speed of the screw by rotation of the bit rotation motor and a moving speed of a driver bit by the bit movement motor under the feedback control.

FIG. 23 is a flowchart showing another modification of the operation of the fastening tool according to the present embodiment. FIG. 24A is a graph showing a relationship between rotation speeds of the bit rotation motor and the bit movement motor under feedback (FB) control. FIG. 24B is a graph showing a relationship between a moving speed of the screw by the rotation of the bit rotation motor and a moving speed of the driver bit by the bit movement motor under the feedback (FB) control. Next, the other modification of the fastening operation of the fastening tool according to the present embodiment will be described with reference to the drawings. In this modification, the moving speed of the screw by the rotation of the bit rotation motor 40 and the moving speed of the driver bit by the bit movement motor 50 are synchronized by the feedback control.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SE1 of FIG. 23, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SE2, the trigger 9 is operated, and the trigger switch portion 90 is turned on in step SE3, the control unit 100 drives the bit rotation motor 40 of the first drive unit 4 in step SE4, and drives the bit movement motor 50 of the second drive unit 5 in step SE5.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target, thereby causing the driver bit 2 to follow the screw to be screwed into the fastening target.

In step SE6, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 detects a load applied to the bit movement motor 50 in step SE7, and when the control unit 100 detects a predetermined load, the control unit 100 acquires a rotation speed of the bit rotation motor 40 and a rotation speed of the bit movement motor 50 in step SE8.

In step SE9, the control unit 100 calculates a target rotation speed of the bit movement motor 50 based on a gear ratio of the speed reducer of the bit rotation motor 40 and the rotation speed of the bit rotation motor 40 or calculates a target rotation speed of the bit rotation motor 40 based on a gear ratio of the speed reducer of the bit movement motor 50 and the rotation speed of the bit movement motor 50 so that by fastening the screw 200 to the fastening target by the rotation of the bit rotation motor 40, a moving speed when the screw 200 is moved in the forward direction, a moving speed of the holding member 30 and the moving member 32 which move in the forward direction by the rotation of the bit movement motor 50, and the moving speed of the driver bit 2 attached to the holding member 30 substantially coincide with one another as shown in FIG. 24B.

In step SE10, the control unit 100 controls the bit movement motor 50 in the present example by the feedback control based on the target rotation speed of the bit rotation motor 40, the target rotation speed of the bit movement motor 50, the gear ratio of the speed reducer, and the like. For example, the control is performed by increasing or decreasing PWM output to the bit movement motor 50 and adjusting the rotation speed.

When it is determined that the number of rotations of the bit movement motor 50 reaches the setting value selected by the setting portion 110 and the tip end of the driver bit 2 reaches the set operation end position P2 in step SE6, the control unit 100 stops driving of the bit rotation motor 40 in step SE11, stops rotation of the bit movement motor 50 in the positive direction in step SE12, and then reversely rotates the bit movement motor 50 in step SE13.

When the bit movement motor 50 rotates in the reverse direction, which is the other direction, the pulley 52 rotates in the reverse direction, so that the wire 54 is pulled out from the pulley 52, and the moving member 32 in which the second moving member 32c is pressed by the biasing member 33 and the holding member 30 connected to the moving member 32 by the first moving member 32a move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SE14, the control unit 100 stops the reverse rotation of the bit movement motor 50 in step SE15.

The feedback control described above is control required after the fastening target and the screw 200 come into contact with each other and loads on the bit rotation motor 40 and the bit movement motor 50 fluctuate. Therefore, control when the feedback control is not executed is set as a first control mode, and control when the feedback control is executed is set as a second control mode, and the first control mode is executed before a predetermined load is detected in one or both of the bit rotation motor 40 and the bit movement motor 50. When the predetermined load is detected in one or both of the bit rotation motor 40 and the bit movement motor 50, the first control mode is switched to the second control mode, and the second control mode is executed. Accordingly, it is possible to prevent a delay in an operation time.

As a unit that improves responsiveness of the feedback control and implements more stable work quality, an acceleration or deceleration limit value for the bit movement motor 50 may be changed when the feedback control is executed after the load is detected and when the feedback control is not executed before the load is detected. Normally, when the PWM output is performed to the motor, by limiting an acceleration amount per unit time in order to stabilize the output of the motor, control is executed to prevent an acceleration current at the time of starting in particular from becoming excessive. However, when the above feedback control is executed while acceleration is limited at the time of starting the bit movement motor 50, the PWM output generated by the feedback control is limited and applied to the bit movement motor 50, so that responsiveness to the feedback control is deteriorated. Therefore, during execution of the feedback control, it is desirable to set an acceleration limit amount to be larger than that at the time of starting the motor when the feedback control is not executed.

Figure 25:
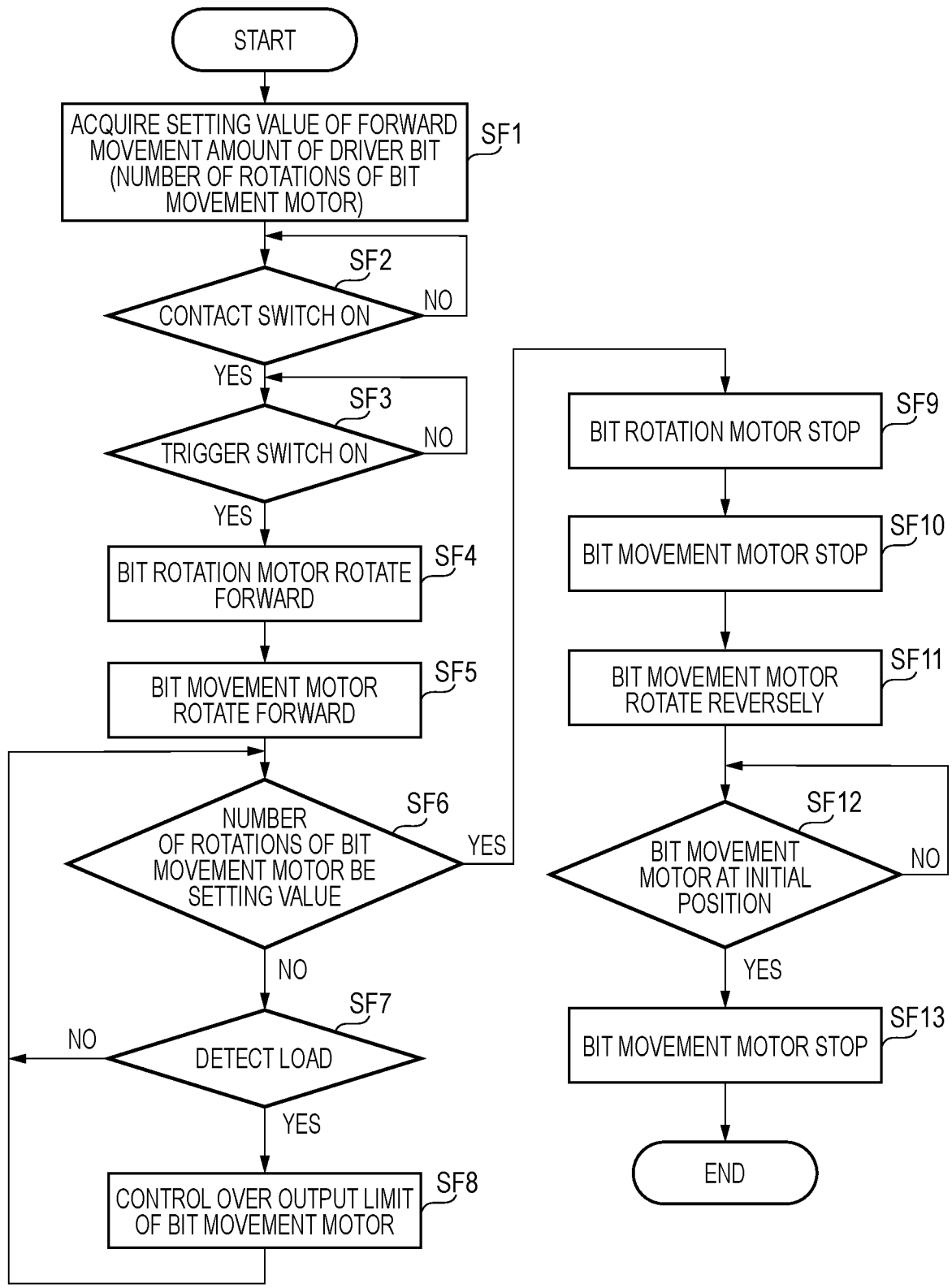
FIG. 25 is a flowchart showing another modification of the operation of the fastening tool according to the present embodiment.
Figure 26A:
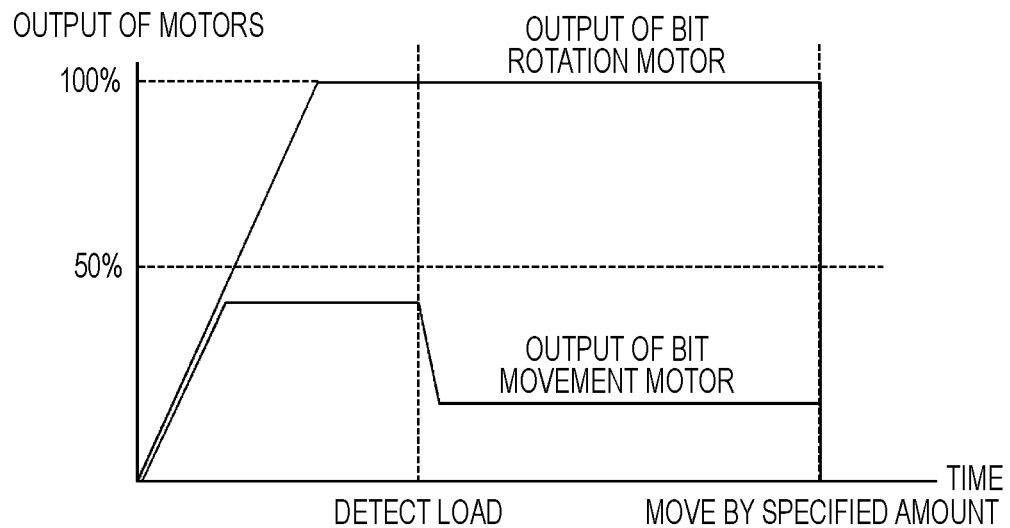
FIG. 26A is a graph showing a relationship between a load and control over the bit movement motor.
Figure 26B:
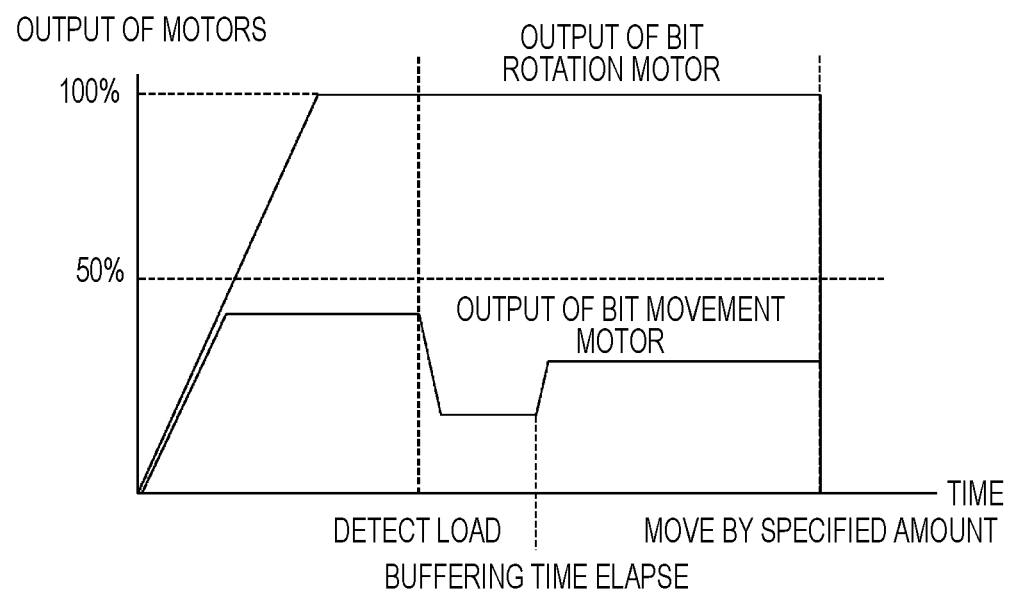
FIG. 26B is a graph showing a relationship between a load and control over the bit movement motor.

FIG. 25 is a flowchart showing another modification of the operation of the fastening tool according to the present embodiment. FIGS. 26A and 26B are graphs showing relationships between loads and control over the bit movement motor. Next, the other modification of the fastening operation of the fastening tool according to the present embodiment will be described with reference to the drawings. In this modification, a load applied to the bit movement motor 50 is detected to control the bit movement motor 50.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SF1 of FIG. 25, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SF2, the trigger 9 is operated, and the trigger switch portion 90 is turned on in step SF3, the control unit 100 drives the bit rotation motor 40 of the first drive unit 4 in step SF4, and drives the bit movement motor 50 of the second drive unit 5 in step SF5.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target, thereby causing the driver bit 2 to follow the screw to be screwed into the fastening target.

In step SF6, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 detects a load applied to the bit movement motor 50 in step SF7, and when the control unit 100 detects a predetermined load, the control unit 100 controls the bit movement motor 50 in step SF8.

When the holding member 30 and the moving member 32 move in the forward direction by driving of the bit movement motor 50, in order to prevent occurrence of an excessive impact when the screw 200 is pressed against the fastening target, the bit rotation motor 40 performs maximum output within an assumed range in order to prevent a fastening speed from being decreased, and output of the bit movement motor 50 is limited by lowering a voltage value applied to the bit movement motor 50, lowering a current value supplied to the bit movement motor 50, or the like.

When a ratio of a forward movement amount of the driver bit 2 per rotation of the bit movement motor 50 to a forward movement amount of the screw per rotation of the bit rotation motor 40 becomes low, the forward movement amount of the driver bit 2 by the bit movement motor 50 cannot catch up with the forward movement amount of the screw by the bit rotation motor 40, and therefore cam-out occurs. On the other hand, when the ratio of the forward movement amount of the driver bit 2 per rotation of the bit movement motor 50 to the forward movement amount of the screw per rotation of the bit rotation motor 40 becomes high, the forward movement amount of the driver bit 2 by the bit movement motor 50 greatly exceeds the forward movement amount of the screw by the bit rotation motor 40, and therefore an excessive force is required to press the fastening tool 1 in a fastening target direction by the operator.

Therefore, as a target value of an output limitation, it is preferable that the ratio of the forward movement amount of the driver bit 2 per rotation of the bit movement motor 50 to the forward movement amount of the screw per rotation of the bit rotation motor 40 is about 0.8 time to 5 times. Accordingly, it is possible to prevent occurrence of cam-out, and without requiring an excessive force for pressing the fastening tool 1 toward the fastening target direction by the operator, it is possible to prevent occurrence of an excessive impact when the screw 200 is pressed against the fastening target.

When the load on the bit movement motor 50 generated after the fastening target and the screw 200 contact with each other is detected, the output of the bit movement motor 50 is limited, and thus, when the screw 200 is pressed against the fastening target, the holding member 30 and the moving member 32 are decelerated, so that it is possible to obtain an effect of further preventing impact.

In control for limiting output of the bit movement motor 50, as shown in FIG. 26A, after a predetermined load is detected, the output of the bit movement motor 50 may be limited so that the rotation speed becomes constant until the bit rotation motor 40 rotates at the number of rotations for moving the driver bit 2 to the operation end position. As shown in FIG. 26B, the bit movement motor 50 is rotated forward at a first rotation speed until the predetermined load is detected. After the predetermined load is detected, the bit movement motor 50 is rotated forward at a second rotation speed that is reduced in the rotation speed in order to weaken impact when the screw 200 is pressed against the fastening target. Further, after a predetermined buffering time elapses in which the impact when the screw 200 is pressed against the fastening target is weakened, the output may be limited so as to be a constant rotation speed at a third rotation speed that is slower than the first rotation speed and faster than the second rotation speed until the bit rotation motor 40 rotates at the number of rotations for moving the driver bit 2 to the operation end position.

A fluctuation in the power supply voltage causes a difference in the moving speed (forward speed) of the holding member 30 and the moving member 32. The higher the power supply voltage, the faster the moving speed, and the more likely an excessive impact occurs when the screw 200 is pressed against the fastening target. Therefore, the control unit 100 detects the power supply voltage, and decreases the output of the bit movement motor 50 as the power supply voltage is high, as compared with the case where the power supply voltage is low.

Accordingly, occurrence of the difference in the rotation speed of the bit movement motor 50 due to the fluctuation in the power supply voltage is prevented. Therefore, when the screw 200 is pressed against the fastening target, occurrence of an excessive impact is prevented, and occurrence of variation in a speed at which the screw 200 is pressed against the fastening target is prevented.

When it is determined that the number of rotations of the bit movement motor 50 reaches the setting value selected by the setting portion 110 and the tip end of the driver bit 2 reaches the set operation end position P2 in step SF6, the control unit 100 stops driving of the bit rotation motor 40 in step SF9, stops rotation of the bit movement motor 50 in the positive direction in step SF10, and then reversely rotates the bit movement motor 50 in step SF11.

When the bit movement motor 50 rotates in the reverse direction, which is the other direction, the pulley 52 rotates in the reverse direction, so that the wire 54 is pulled out from the pulley 52, and the moving member 32 in which the second moving member 32c is pressed by the biasing member 33 and the holding member 30 connected to the moving member 32 by the first moving member 32a move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SF12, the control unit 100 stops the reverse rotation of the bit movement motor 50 in step SF13.

Figure 27:
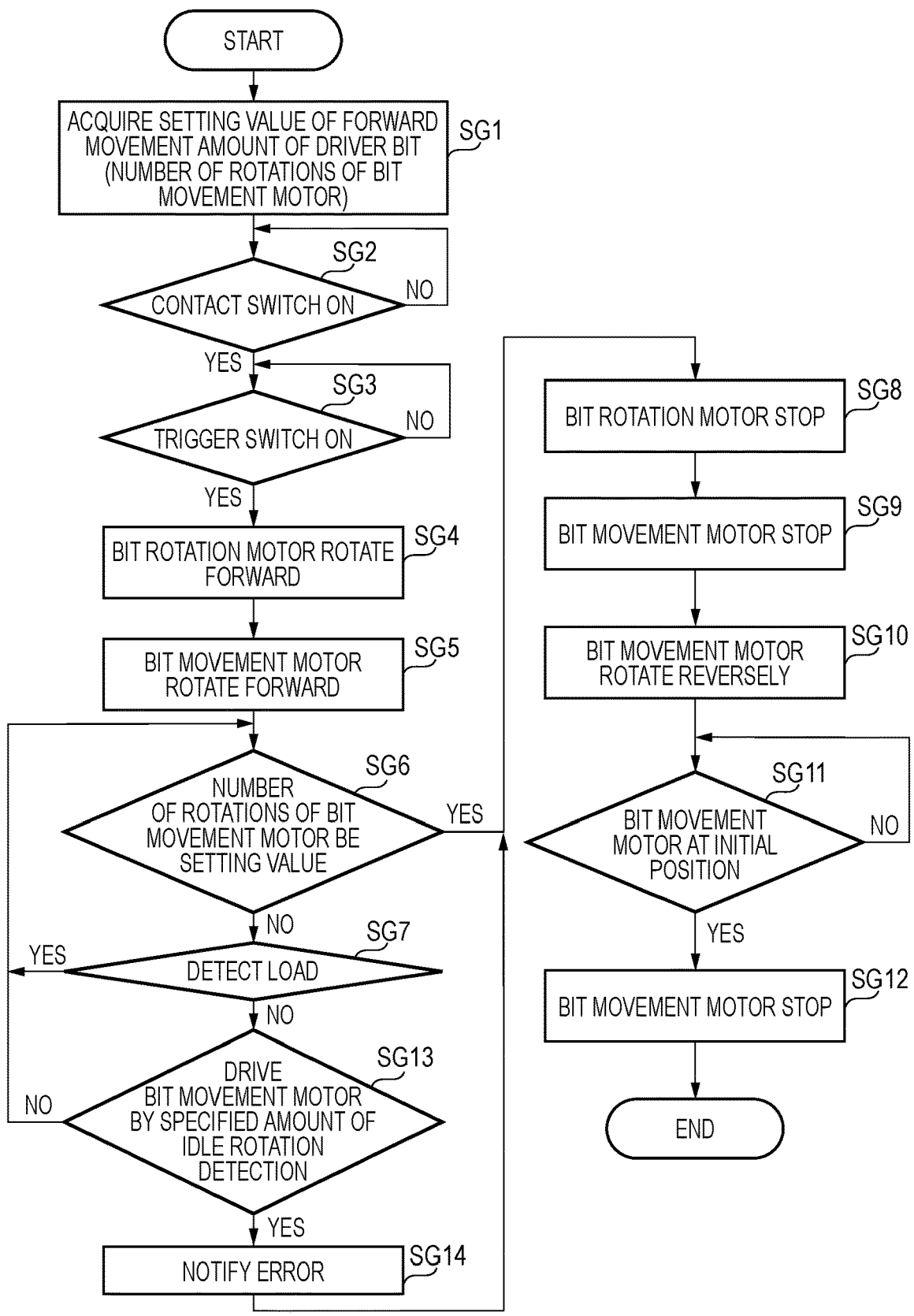
FIG. 27 is a flowchart showing another modification of the operation of the fastening tool according to the present embodiment.

FIG. 27 is a flowchart showing another modification of the operation of the fastening tool according to the present embodiment. Next, the other modification of the fastening operation of the fastening tool according to the present embodiment will be described with reference to the drawings. In this modification, a load applied to the bit movement motor 50 or the like is detected, and driving in a state where there is no screw is prevented.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SG1 of FIG. 27, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SG2, the trigger 9 is operated, and the trigger switch portion 90 is turned on in step SG3, the control unit 100 drives the bit rotation motor 40 of the first drive unit 4 in step SG4, and drives the bit movement motor 50 of the second drive unit 5 in step SGS.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target, thereby causing the driver bit 2 to follow the screw to be screwed into the fastening target.

In step SG6, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 detects a load applied to one or both of the bit rotation motor 40 and the bit movement motor 50 in step SG7. When the screw 200 is pressed against the fastening target and a predetermined load is detected, the bit movement motor 50 continues to rotate in the positive direction until the number of rotations of the bit movement motor 50 reaches the setting value selected by the setting portion 110.

When the control unit 100 determines that the number of rotations of the bit movement motor 50 reaches the setting value selected by the setting portion 110 and the tip end of the driver bit 2 reaches the set operation end position P2 in step SG6, the control unit 100 stops driving of the bit rotation motor 40 in step SG8, stops rotation of the bit movement motor 50 in the positive direction in step SG9, and then reversely rotates the bit movement motor 50 in step SG10.

When the bit movement motor 50 rotates in the reverse direction, which is the other direction, the pulley 52 rotates in the reverse direction, so that the wire 54 is pulled out from the pulley 52, and the moving member 32 in which the second moving member 32c is pressed by the biasing member 33 and the holding member 30 connected to the moving member 32 by the first moving member 32a move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SG11, the control unit 100 stops the reverse rotation of the bit movement motor 50 in step SG12.

When the bit rotation motor 40 and the bit movement motor 50 rotate in the positive direction in a state where the screw 200 is not in the injection port 81a, the screw 200 is not pressed against the fastening target, so that loads applied to the bit rotation motor 40 and the bit movement motor 50 do not increase. Therefore, if a predetermined load is not detected even if the driver bit 2 attached to the holding member 30 moves forward by a specified movement amount with reference to a length of the smallest screw 200 to be loaded, it can be determined that there is no screw 200.

Therefore, in step SG13, the control unit 100 determines whether the bit movement motor 50 rotates by a specified movement amount with reference to the length of the smallest screw 200 to be loaded or by a specified amount of idle rotation detection by which the driver bit 2 attached to the holding member 30 moves forward. When it is determined that a predetermined load is not detected in one or both of the bit rotation motor 40 and the bit movement motor 50 and that the bit movement motor 50 rotates by the specified amount of idle rotation detection, the control unit 100 determines that there is no screw 200, and notifies an error in step SG14. In processing of steps SG8 to SG12 described above, driving of the bit rotation motor 40 and the bit movement motor 50 is stopped.

The control unit 100 may detect the load applied to one or both of the bit rotation motor 40 and the bit movement motor 50 by a change in a current flowing through the motor except for a change in the current generated at the time of starting the motor. The detection may be performed based on a change in a voltage flowing through the motor except for a change in the voltage generated at the time of starting the motor. The rotation of the bit holding portion 3 and the movement of the bit holding portion 3 in the axial direction may be performed by a single motor. The control unit 100 may detect a load applied to the single motor and prevent driving in a state in which there is no screw.

Next, another modification of the fastening operation of the fastening tool according to the present embodiment will be described. In this modification, in the feedback control in which the moving speed of the driver bit by the bit movement motor 50 follows (is synchronized with) the moving speed of the screw by the rotation of the bit rotation motor 40, a moving speed of the bit holding portion 3 is calculated using a lead length of the screw 200 acquired at the time of a previous screw tightening operation. In the present modification, the lead length of the screw 200 means a distance by which the screw 200 advances in one rotation.

Figure 28:
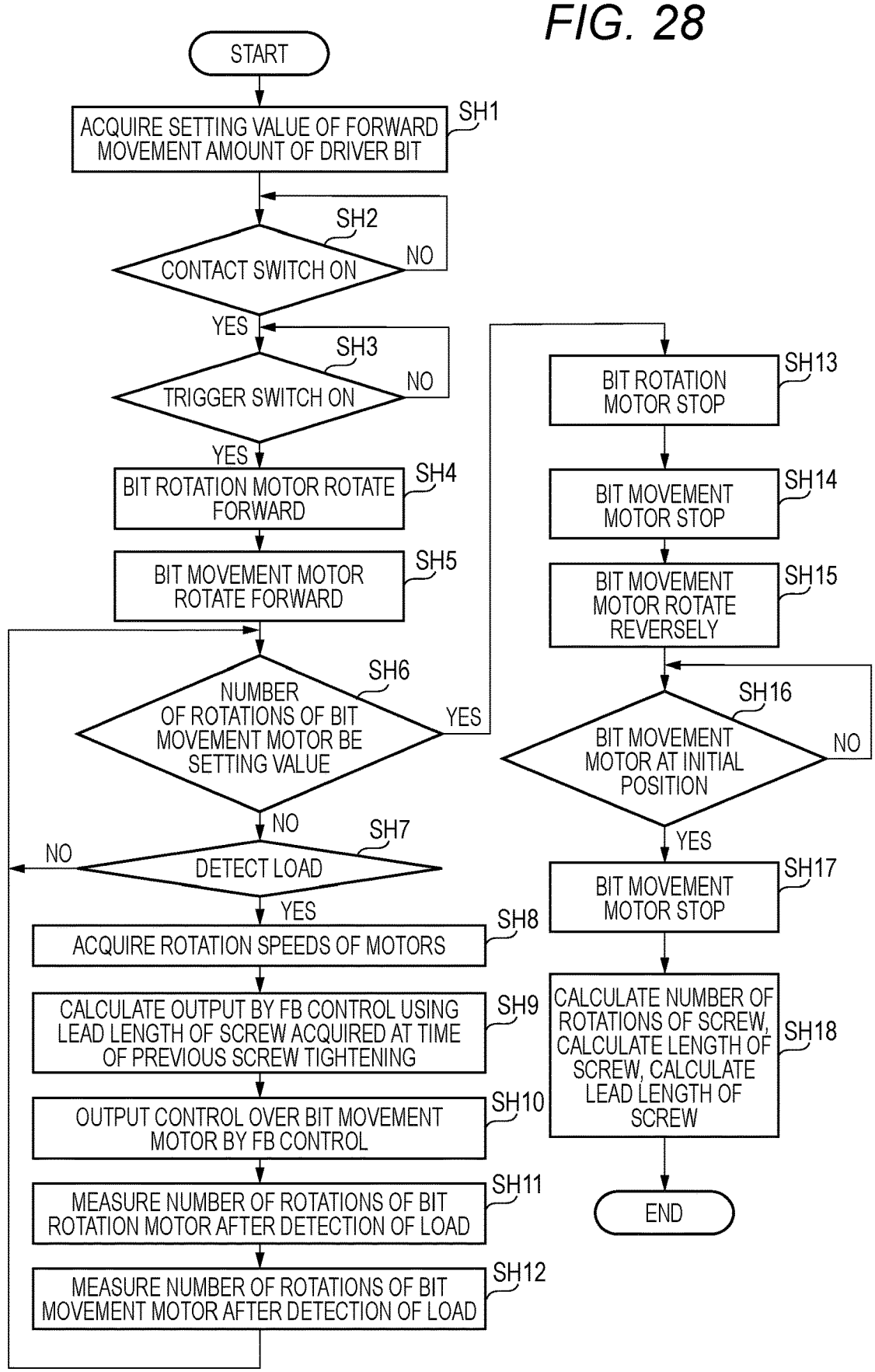
FIG. 28 is a flowchart showing another modification of the operation of the fastening tool according to the present embodiment.

FIG. 28 is a flowchart showing another modification of the operation of the fastening tool according to the present embodiment. Since a graph showing a relationship between the rotation speeds of the bit rotation motor and the bit movement motor under the feedback (FB) control is the same as that in FIG. 24A, and a graph showing a relationship between the moving speed of the screw by the rotation of the bit rotation motor and the moving speed of the driver bit by the bit movement motor under the feedback (FB) control is the same as that in FIG. 24B, the description of each graph will be described with reference to FIGS. 24A and 24B.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SH1 of FIG. 28, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SH2, the trigger 9 is operated, and the trigger switch portion 90 is turned on in step SH3, the control unit 100 drives the bit rotation motor 40 of the first drive unit 4 in step SH4, and drives the bit movement motor 50 of the second drive unit 5 in step SH5.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target, thereby causing the driver bit 2 to follow the screw to be screwed into the fastening target.

In step SH6, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 detects a load applied to at least one of the bit rotation motor 40 and the bit movement motor 50 in step SH7, and when the control unit 100 detects a predetermined load, the control unit 100 acquires a rotation speed of the bit rotation motor 40 and a rotation speed of the bit movement motor 50 in step SH8.

In step SH9, the control unit 100 calculates the target rotation speed and the like of the bit movement motor 50 using information of the lead length of the screw 200 acquired at the time of the previous screw tightening operation. Specifically, the target rotation speed of the bit movement motor 50 obtained based on the lead length of the screw 200, the rotation speed of the bit rotation motor 40, the gear ratio of the speed reducer, and the like so that by fastening the screw 200 to the fastening target by the rotation of the bit rotation motor 40, the moving speed when the screw 200 is moved in the forward direction, the moving speed of the holding member 30 and the moving member 32 which move in the forward direction by the rotation of the bit movement motor 50, and the moving speed of the driver bit 2 attached to the holding member 30 substantially coincide with one another as shown in FIG. 24B. For example, the control unit 100 calculates the target rotation speed of the bit movement motor 50 based on a following equation (1).

$$\text{Target rotation speed of bit movement motor } 50 = \text{(gear ratio of speed reducer of bit movement motor 50/gear ratio of speed reducer of bit rotation motor 40} \times \text{circumferential length of pulley 52/lead length of screw 200)} \times \text{rotation speed of bit rotation motor 40} \quad (1)$$

In step SH10, the control unit 100 controls the bit movement motor 50 so as to achieve the calculated target rotation speed in the present example by the feedback control based on the rotation speed of the bit rotation motor 40, the gear ratio of the speed reducer, and the like. For example, the control is performed by increasing or decreasing PWM output to the bit movement motor 50 and adjusting the rotation speed.

In step SH11, the control unit 100 measures the number of rotations of the bit rotation motor 40 after detection of the load applied to the bit rotation motor 40 or the bit movement motor 50. In step SH12, the control unit 100 measures the number of rotations of the bit movement motor 50 after the detection of the load applied to the bit rotation motor 40 or the bit movement motor 50. The number of rotations of the bit rotation motor 40 and the number of rotations of the bit movement motor 50 measured in steps SH11 and SH12 are stored in a memory (not shown) and used in step SH18 of calculating the lead length of the screw 200 at the time of a next screw tightening operation. Upon completion of the measurement in step SH12, the processing returns to step SH6.

When it is determined that the number of rotations of the bit movement motor 50 reaches the setting value selected by the setting portion 110 and the tip end of the driver bit 2 reaches the set operation end position P2 in step SH6, the control unit 100 stops driving of the bit rotation motor 40 in step SH13, stops rotation of the bit movement motor 50 in the positive direction in step SH14, and then reversely rotates the bit movement motor 50 in step SH15.

When the bit movement motor 50 rotates in the reverse direction, which is the other direction, the pulley 52 rotates in the reverse direction, so that the wire 54 is pulled out from the pulley 52, and the moving member 32 in which the second moving member 32c is pressed by the biasing member 33 and the holding member 30 connected to the moving member 32 by the first moving member 32a move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SH16, the control unit 100 stops the reverse rotation of the bit movement motor 50 in step SH17.

When a series of screw tightening operation is completed, the control unit 100 calculates the lead length of the screw 200 in a following procedure in step SH18. The calculation of the lead length of the screw 200 may be executed in parallel with reverse rotation control over the bit movement motor 50 or the like before and after the processing of step SH13 or step SH14, other than after the screw tightening operation being ended.

First, the number of rotations of the screw 200 is calculated based on a following equation (2).

Number of rotations of screw 200=number of rotations of bit rotation motor 40 from start of screw tightening(after load detection) to end of tightening of screw 200(step SH11)/gear ratio of speed reducer of bit rotation motor 40    (2)

In the above equation (2), the number of rotations of the bit rotation motor 40 is acquired in an entire section from the load detection to the end of tightening of the screw 200, but the present disclosure is not limited thereto, and the number of rotations of the bit rotation motor 40 may be acquired in a part of sections of the entire section.

Next, a length of the screw 200 is calculated based on a following equation (3).

Length of screw 200(movement amount of driver bit 2 from start of screw tightening to end of tightening of screw 200)=number of rotations of bit movement motor 50 from start of screw tightening to end of screw tightening(step SH12)/gear ratio of speed reducer of bit movement motor 50×circumferential length of pulley 52    (3)

In the above equation (3), the number of rotations of the bit movement motor 50 is acquired in an entire section from the load detection to the end of tightening of the screw 200, but the present disclosure is not limited thereto, and the number of rotations of the bit movement motor 50 may be acquired in a part of sections of the entire section.

Next, the lead length of the screw 200 is calculated based on a following equation (4).

Lead length of screw 200=length of screw 200(equation (3))/number of rotations of screw 200 (equation (2))    (4)

The control unit 100 stores the calculated lead length of the screw 200 in the memory (not shown), and resets the calculated lead length as a lead length to be used in calculating the rotation speed of the bit movement motor 50 and the like after the load detection in the next screw tightening operation. Thus, in the present modification, the lead length of the used screw 200 is determined (calculated) from the screw tightening operation of one cycle, and an entering speed (moving speed) of the driver bit 2 with respect to the fastening target per rotation and the rotation speed of the bit movement motor 50 at the time of the next screw tightening operation are calculated using the determined lead length.

According to the present modification, by estimating the lead length of the screw 200 used for the screw tightening operation, it is possible to accurately calculate an entering depth and an entering speed of the screw 200 into the fastening target by driving of the bit rotation motor 40. Accordingly, it is possible to cause the moving speed of the driver bit 2 to follow the entering speed of the screw 200 with high accuracy during the screw tightening after the load detection, and it is possible to reduce a work load by reducing a force pressing the fastening tool 1 at the time of the screw tightening, and it is possible to improve driving quality by preventing occurrence of floating up of the fastening tool 1.

Next, another modification of the fastening operation of the fastening tool according to the present embodiment will be described. In this modification, in the feedback control in which the moving speed of the driver bit by the bit movement motor 50 follows the moving speed of the screw by the rotation of the bit rotation motor 40, the target rotation speed of the bit movement motor 50 is calculated using the lead length of the screw set by a lead length setting portion 120.

Figure 29:
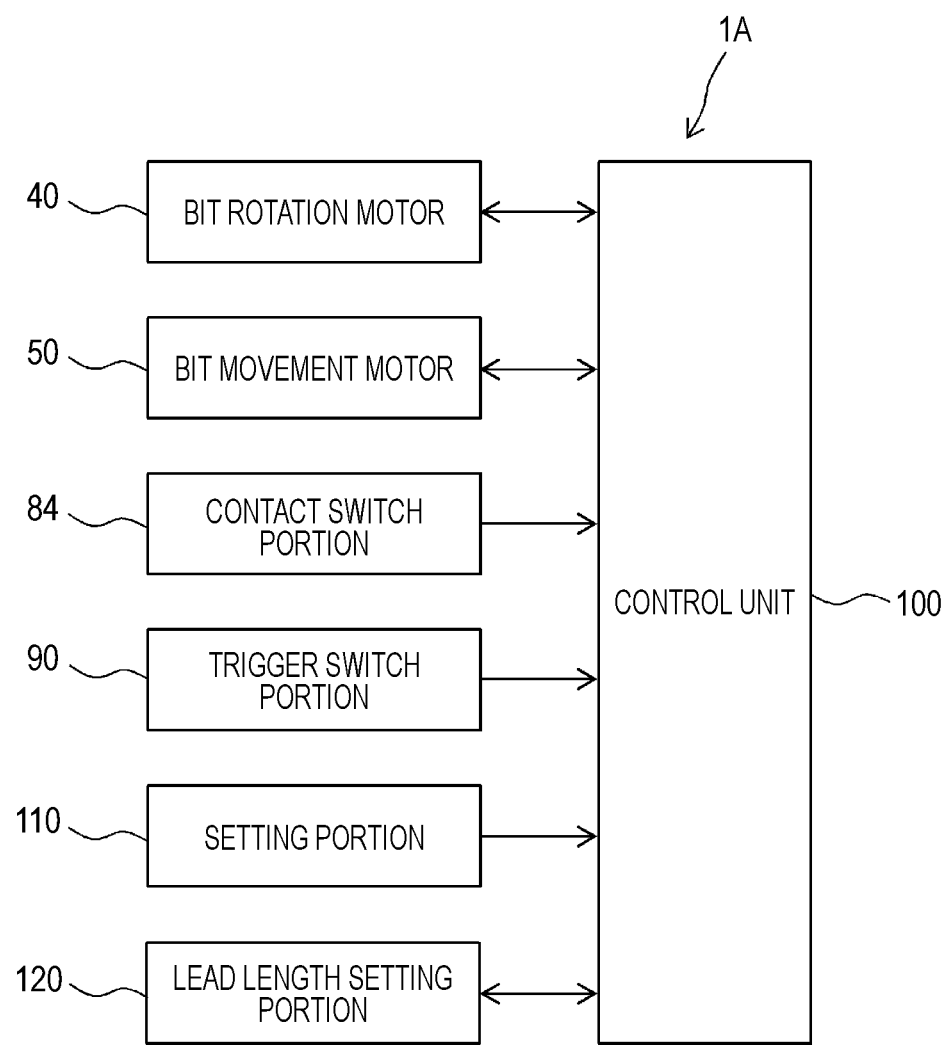
FIG. 29 is a block diagram showing another modification of the operation of the fastening tool according to the present embodiment.

FIG. 29 is a block diagram showing another modification of the operation of the fastening tool according to the present embodiment. As shown in FIG. 29, the bit rotation motor 40, the bit movement motor 50, the contact switch portion 84, the trigger switch portion 90, the setting portion 110, and the lead length setting portion 120 are connected to the control unit 100 of a fastening tool 1A.

The lead length setting portion 120 receives setting of the lead length according to a type of the screw 200, and outputs information of the received lead length to the control unit 100. The lead length setting portion 120 may be provided in the tool body 10, for example. In this case, the lead length setting portion 120 may be implemented by an operation portion such as a button or a rotary dial. By operating the button or the like, the user may manually and directly input the lead length of the screw 200, or the user may select a specific lead length from a plurality of lead lengths set in advance. For example, an information processing terminal such as a personal computer, a tablet, or a smartphone may be provided with a function of the lead length setting portion 120. The lead length of the screw 200 input by the information processing terminal may be transmitted to the control unit 100 in the fastening tool 1 by wired or wireless communication.

The control unit 100 changes the lead length used when calculating the rotation speed of the bit movement motor 50 to be described later to the lead length of the screw 200 set by the lead length setting portion 120. Accordingly, information of the lead length of the screw 200 at the time of the previous screw tightening operation can be switched to information of the lead length that matches the type of the screw 200 used in a current screw tightening operation.

Figure 30:
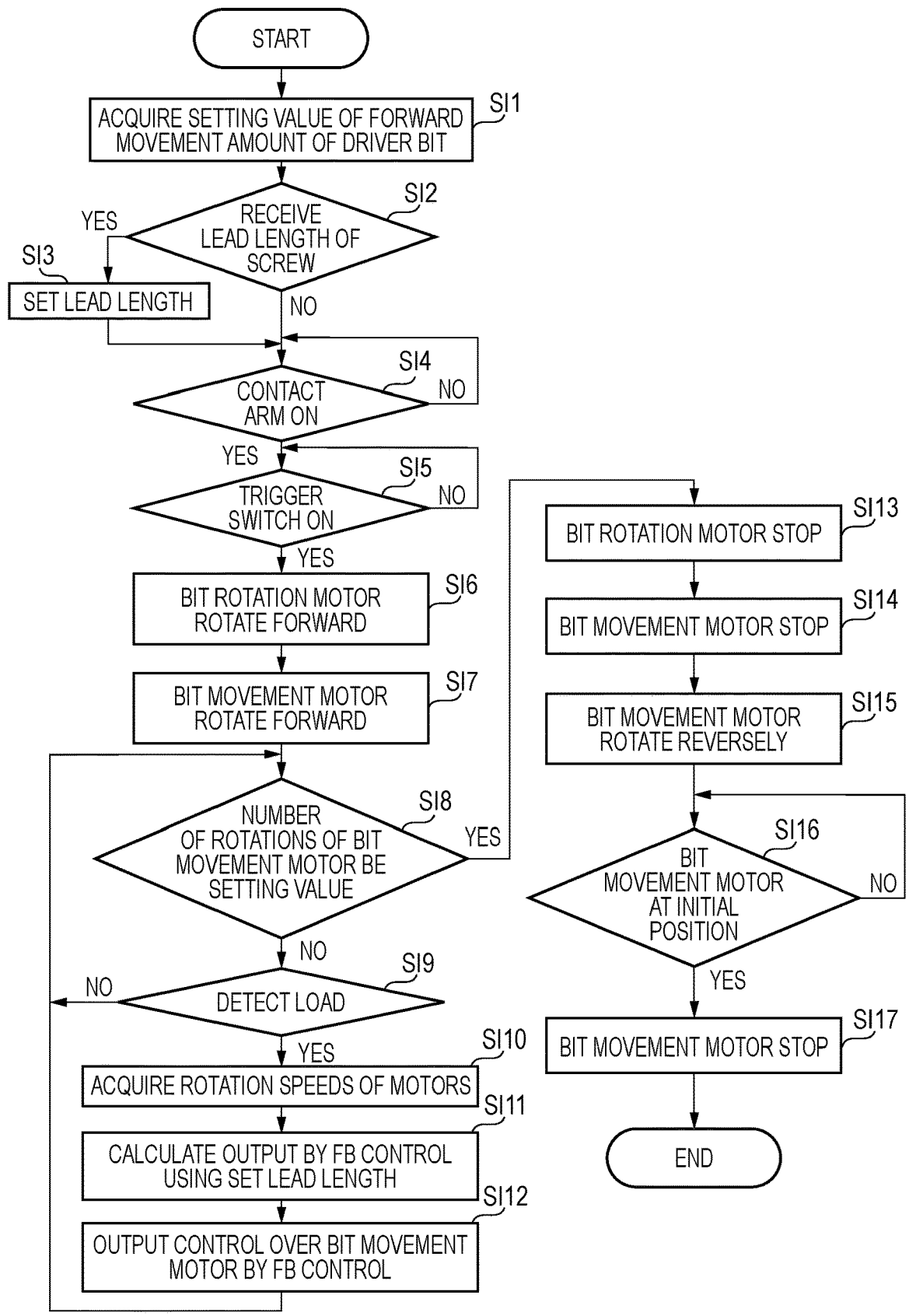
FIG. 30 is a flowchart showing another modification of the operation of the fastening tool according to the present embodiment.

FIG. 30 is a flowchart showing another modification of the operation of the fastening tool according to the present embodiment. Since a graph showing a relationship between the rotation speeds of the bit rotation motor and the bit movement motor under the feedback (FB) control is the same as that in FIG. 24A, and a graph showing a relationship between the moving speed of the screw by the rotation of the bit rotation motor and the moving speed of the driver bit by the bit movement motor under the feedback (FB) control is the same as that in FIG. 24B, the description of each graph will be described with reference to FIGS. 24A and 24B.

In the standby state of the fastening tool 1A, as shown in FIG. 1A, the tip end of the driver bit 2 is positioned at the standby position P1 on the rear side of the injection passage 80, and the screw 200 can be supplied to the injection passage 80.

In step SI1 of FIG. 30, the control unit 100 sets the number of rotations of the bit movement motor 50 that defines the forward movement amount of the driver bit 2 based on a setting value selected by the setting portion 110.

In step SI2, the lead length setting portion 120 receives setting of the lead length according to the type of the screw 200 based on an operation of the operator. When the setting of the lead length is received, the processing proceeds to step SI3. When the setting of the lead length of the screw 200 is not received, the setting of the lead length used in the previous screw tightening operation is maintained.

In step SI3, the control unit 100 sets the lead length of the screw 200 received by the lead length setting portion 120 as the lead length used when calculating the rotation speed of the bit movement motor 50 to be described later. Information on the lead length of the screw 200 received by the lead length setting portion 120 is stored in the memory (not shown). When a new lead length is set, the processing proceeds to step SI4.

When the contact member 81 is pressed against the fastening target, the contact switch portion 84 is pressed by the contact arm 82, the contact switch portion 84 is turned on in step SI4, the trigger 9 is operated, and the trigger switch portion 90 is turned on in step SI5, the control unit 100 drives the bit rotation motor 40 of the first drive unit 4 in step SI6, and drives the bit movement motor 50 of the second drive unit 5 in step SI7.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction. Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31. Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target, thereby causing the driver bit 2 to follow the screw to be screwed into the fastening target.

In step SI8, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 proceeds to step SI9.

The control unit 100 detects whether a load is applied to at least one of the bit rotation motor 40 and the bit movement motor 50 in step SI9, and when the control unit 100 detects a predetermined load, the control unit 100 acquires a rotation speed of the bit rotation motor 40 and a rotation speed of the bit movement motor 50 in step SI10.

In step SI11, the control unit 100 obtains target rotation speeds of the bit rotation motor 40 and the bit movement motor 50 based on the lead length of the screw 200 set by the lead length setting portion 120, the rotation speed of the bit rotation motor 40, the rotation speed of the bit movement motor 50, the gear ratio of the speed reducer, and the like so that by fastening the screw 200 to the fastening target by the rotation of the bit rotation motor 40, the moving speed when the screw 200 is moved in the forward direction and the moving speed of the driver bit 2 which moves in the forward direction by the rotation of the bit movement motor 50 substantially coincide with each other (see FIG. 24B). For example, the control unit 100 calculates the target rotation speed of the bit movement motor 50 based on a following equation (5).

Target rotation speed of bit movement motor 50=
(gear ratio of speed reducer of bit movement motor 50/gear ratio of speed reducer of bit rotation motor 40×circumferential length of pulley 52/lead length of screw 200)×rotation speed of bit rotation motor 40     (5)

In step SI12, the control unit 100 controls the bit movement motor 50 so as to achieve the calculated target rotation speed in the present example by the feedback control based on the rotation speed of the bit rotation motor 40, the rotation speed of the bit movement motor 50, the gear ratio of the speed reducer, and the like. For example, the control is performed by increasing or decreasing PWM output to the bit movement motor 50 and adjusting the rotation speed.

When it is determined that the number of rotations of the bit movement motor 50 reaches the setting value selected by the setting portion 110 and the tip end of the driver bit 2 reaches the set operation end position P2 in step SI8, the control unit 100 stops driving of the bit rotation motor 40 in step SI13, stops rotation of the bit movement motor 50 in the positive direction in step SI14, and then reversely rotates the bit movement motor 50 in step SI15.

When the bit movement motor 50 rotates in the reverse direction, which is the other direction, the pulley 52 rotates in the reverse direction, so that the wire 54 is pulled out from the pulley 52, and the moving member 32 in which the second moving member 32c is pressed by the biasing member 33 and the holding member 30 connected to the moving member 32 by the first moving member 32a move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SI16, the control unit 100 stops the reverse rotation of the bit movement motor 50 in step SI17.

A unit that switches the setting of the lead length of the screw 200 may be other than the lead length setting portion 120. Specifically, a communication unit may be provided in the fastening tool 1A or the like, a non-power supply communication unit may be provided on a connecting band (reel) side to which a plurality of screws 200 loaded in the screw accommodating portion 6 are attached, and short-range wireless communication may be performed between the communication unit and the non-power supply communication unit. A non-wireless communication unit stores, for example, an IC chip in which the type of the screw 200 and the lead length of the screw 200 are stored in association with each other. When the connecting band is accommodated in the screw accommodating portion 6, the communication unit wirelessly communicates with the non-wireless communication unit to acquire the lead length of the screw 200 for performing the screw tightening operation, and the control unit 100 switches the setting of the lead length to the acquired new lead length. Examples of a short-range wireless communication method include a non-contact method using an electromagnetic field, a radio wave, or the like, Bluetooth (registered trademark), and the like.

A unit that switches the setting of the lead length of the screw 200 may be an identification unit that mechanically identifying a dimension of the connecting band loaded in the screw accommodating portion 6. In this case, the lead length varies depending on the type of the screw 200, and along with this, a width of the connecting band, a position of a groove, the number, and the like are also different. Therefore, the lead length of the screw 200 is acquired by mechanically identifying a type of the connecting band from a difference of these connecting bands.

According to the present modification, even when the type of the screw 200 to be used is different, the lead length setting portion 120 can switch the setting of the lead length. Therefore, since the lead length can be switched to the lead length of the screw 200 actually used in the screw tightening operation, for example, compared with a case where the rotation speed of the bit movement motor 50 is calculated using a previous lead length, it is possible to accurately calculate the entering depth and the entering speed of the screw 200 into the fastening target by driving of the bit rotation motor 40. Accordingly, it is possible to cause the moving speed of the driver bit 2 to follow the entering speed of the screw 200 with high accuracy during the screw tightening after the load detection, and it is possible to reduce a work load by reducing a force pressing the fastening tool 1A at the time of the screw tightening, and it is possible to improve driving quality by preventing occurrence of floating up of the fastening tool 1A.

Next, another modification of the fastening operation of the fastening tool according to the present embodiment will be described. In this modification, in the feedback control in which the moving speed of the driver bit by the bit movement motor 50 follows (is synchronized with) the moving speed of the screw by the rotation of the bit rotation motor 40, a current value of the bit movement motor 50 is controlled to fall within a range of specified values during the screw tightening operation.

Figure 31:
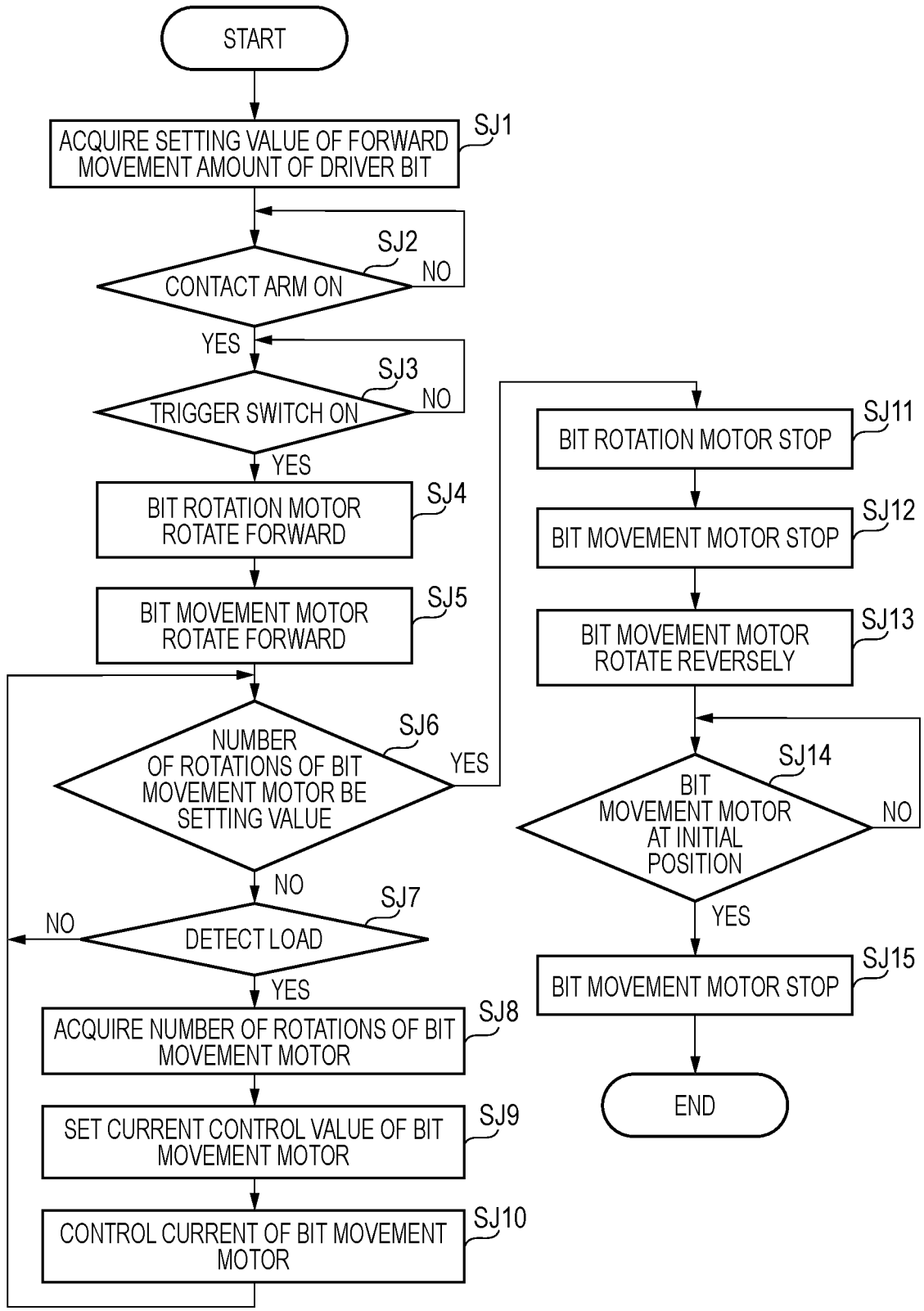
FIG. 31 is a flowchart showing another modification of the operation of the fastening tool according to the present embodiment.
Figure 32:
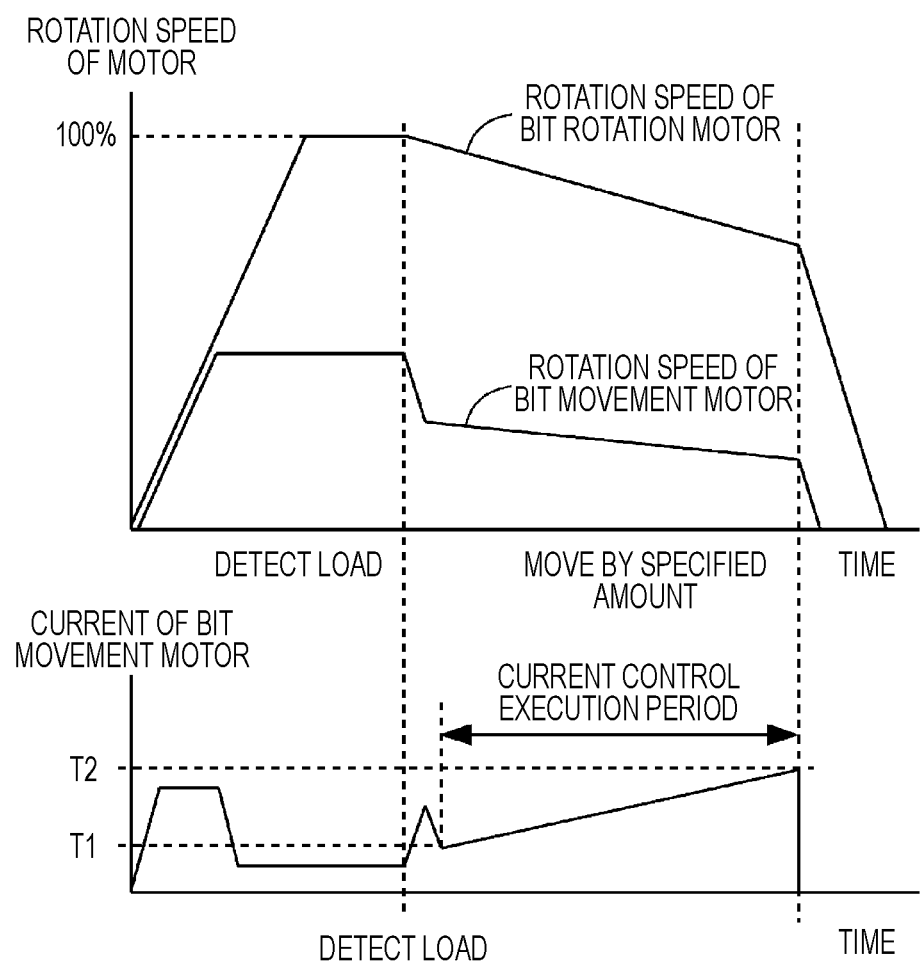
FIG. 32 is a graph showing a relationship between a load and control over the bit movement motor at the time of screw tightening.
Figure 33:
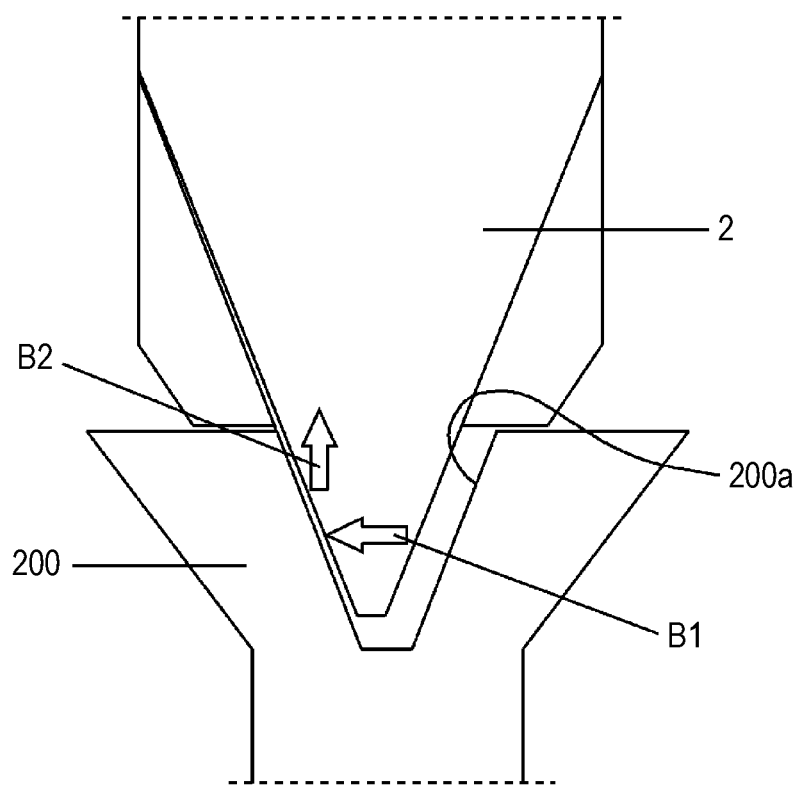
FIG. 33 is a view showing an engagement state between the driver bit and a recess of the screw at the time of the screw tightening.

FIG. 31 is a flowchart showing another modification of the operation of the fastening tool according to the present embodiment. FIG. 32 is a graph showing a relationship between a load and control over the bit movement motor. FIG. 33 is a view showing an engagement state between the driver bit and a recess of the screw at the time of the screw tightening.

In the standby state of the fastening tool 1, as shown in FIG. 1A, the tip end of the driver bit 2 is positioned at the standby position P1 on the rear side of the injection passage 80, and the screw 200 can be supplied to the injection passage 80.

In step SJ1 of FIG. 31, the control unit 100 sets the number of rotations of the bit movement motor 50 that defines the forward movement amount of the driver bit 2 based on a setting value selected by the setting portion 110. When the contact member 81 is pressed against the fastening target, the contact switch portion 84 is pressed by the contact arm 82, the contact switch portion 84 is turned on in step SJ2, the trigger 9 is operated, and the trigger switch portion 90 is turned on in step SJ3, the control unit 100 drives the bit rotation motor 40 of the first drive unit 4 in step SJ4, and drives the bit movement motor 50 of the second drive unit 5 in step SJ5.

When the bit movement motor 50 is driven to rotate in the positive direction, which is the one direction, the pulley 52 rotates in the positive direction, so that the wire 54 is wound around the pulley 52, and the moving member 32 in which the second moving member 32c is connected to the wire 54 and the holding member 30 connected to the moving member 32 by the first moving member 32a move in the forward direction.

Accordingly, the driver bit 2 held by the holding member 30 moves in the forward direction indicated by the arrow A1, engages with the screw 200 supplied to the injection port 81a of the nose portion 8, moves the screw 200 in the forward direction, and presses the screw 200 against the fastening target.

When the bit rotation motor 40 is driven to rotate in the positive direction, which is the one direction, the holding member 30 rotates together with the rotation guide member 31.

Accordingly, the driver bit 2 held by the holding member 30 rotates the screw 200 in the positive direction (clockwise) and screws the screw 200 into the fastening target. The control unit 100 moves the driver bit 2 in the forward direction by the second drive unit 5 in conjunction with an operation of rotating the driver bit 2 by the first drive unit 4 to screw the screw into the fastening target, thereby causing the driver bit 2 to follow the screw to be screwed into the fastening target.

In step SJ6, the control unit 100 determines whether the number of rotations of the bit movement motor 50 reaches the setting value selected by the setting portion 110 and the tip end of the driver bit 2 reaches the set operation end position P2. When it is determined that the number of rotations of the bit movement motor 50 does not reach the setting value selected by the setting portion 110, the control unit 100 detects a load applied to the bit movement motor 50 in step SJ7, and when the control unit 100 detects a predetermined load, the control unit 100 acquires the number of rotations of the bit movement motor 50 in step SJ8.

When the control unit 100 determines in step SJ9 that the screw tightening operation is being performed based on the detection of the predetermined load, the control unit 100 sets the current value of the bit movement motor 50 in accordance with the acquired number of rotations of the bit movement motor 50 so that the current value of the bit movement motor 50 falls within a range of specified values set in advance. Accordingly, at the time of the screw tightening operation, for example, even in a case where forward movement of the screw 200 is fast or slow depending on a state of the fastening target, an output torque is constant. Therefore, after causing the driver bit 2 to follow the screw 200 moving forward, it is possible to perform the screw tightening operation without requiring an excessive force for the operator to press the fastening tool 1 against the fastening target.

As shown in FIG. 32, after the load of the screw tightening is detected, a target value of the current of the bit movement motor 50 is set so as to gradually increase in accordance with an increase in the load during the screw tightening operation or a decrease in the rotation speed of the bit rotation motor 40 during the screw tightening operation. This is because of a following reason. Although it is necessary to maintain engagement between the driver bit 2 and the recess of the screw during the screw tightening operation, when the screw tightening operation proceeds and the load during the screw tightening operation increases, as shown in FIG. 33, forces acting in a direction B1 and a direction B2 in which the engagement between the driver bit 2 and the screw 200 is released increase along a wall surface 200a of an engagement portion of the recess of the screw. Therefore, it is necessary to increase a force for pressing the driver bit 2 against the screw 200 to prevent the driver bit 2 from disengaging the screw 200, and it is desirable to increase the current value of the bit movement motor 50 every time the screw tightening operation proceeds.

Therefore, as shown in FIG. 32, when the current value immediately after the load in the screw tightening operation is detected is set to a first specified value T1 and the current value at an end of the screw tightening operation is set to a second specified value T2, the control unit 100 sets the first specified value T1 to fall within a range of 10A or more and 30A or less and sets the second specified value T2 to fall within a range of more than 30A and 60A or less, for example. In this case, the control unit 100 sets the current value of the bit movement motor 50 so as to gradually increase from the set first specified value T1 toward the second specified value T2 in a current control execution period. When the number of rotations of the bit movement motor 50 acquired in step SJ8 is lower than a threshold value set in advance, it is preferable to set current values of the first specified value T1 and the second specified value T2 to be higher values within the set ranges, compared with a case where the number of rotations of the bit movement motor 50 is higher than the threshold value. Each of the first specified value T1 and the second specified value T2 may be appropriately changed by the operator through the operation portion or the like. After the specified values are set, the processing proceeds to step SJ10.

In step SJ10, the control unit 100 controls the current value of the bit movement motor 50 so that the current value falls within a range between the set first specified value T1 and second specified value T2. For example, the control unit 100 controls the current value of the bit movement motor 50 within a range between the first specified value T1 and the second specified value T2 by PWM control by switching ON or OFF of a switching element of a drive circuit, and adjusts the rotation speed of the bit movement motor 50.

When it is determined that the number of rotations of the bit movement motor 50 reaches the setting value selected by the setting portion 110 and the tip end of the driver bit 2 reaches the set operation end position P2 in step SJ6, the control unit 100 stops driving of the bit rotation motor 40 in step SJ11, stops rotation of the bit movement motor 50 in the positive direction in step SJ12, and then reversely rotates the bit movement motor 50 in step SJ13.

When the bit movement motor 50 rotates in the reverse direction, which is the other direction, the pulley 52 rotates in the reverse direction, so that the wire 54 is pulled out from the pulley 52, and the moving member 32 in which the second moving member 32*c* is pressed by the biasing member 33 and the holding member 30 connected to the moving member 32 by the first moving member 32*a* move in the rearward direction.

When the bit movement motor 50 rotates reversely to an initial position where the wire 54 is pulled out from the pulley 52 by a predetermined amount and the holding member 30 and the moving member 32 move in the rearward direction to a position where the tip end of the driver bit 2 returns to the standby position P1 in step SJ14, the control unit 100 stops the reverse rotation of the bit movement motor 50 in step SJ15.

According to the present modification, since the current value of the bit movement motor 50 is controlled so as to fall within the range between the first specified value T1 and the second specified value T2, the force (load) of pressing the screw 200 by the driver bit 2 can be controlled to be constant. Accordingly, even in a case where the forward movement of the screw 200 is fast or slow depending on a working state, it is possible to cause the moving speed of the driver bit 2 to follow the entering speed of the screw 200 in a state where the engagement between the driver bit 2 and the recess of the screw 200 is maintained. As a result, it is possible to prevent occurrence of floating up of the fastening tool 1 and improve driving quality while reducing the work load without excessively pressing the fastening tool 1 at the time of screw tightening.

Furthermore, the present disclosure further relates to a fastening tool including: a bit holding portion which detachably holds a driver bit and is configured to rotate in a circumferential direction of the driver bit and move in an axial direction of the driver bit; a first motor configured to rotate the bit holding portion; a second motor configured to move the bit holding portion along the axial direction; and a control unit configured to control a position of the bit holding portion along the axial direction by the number of rotations of the second motor. The control unit performs control to cause a moving speed of the bit holding portion moved by rotation of the second motor to follow a moving speed of a screw when the screw is moved when the screw is fastened to a fastening target by rotation of the first motor.

In the present disclosure, a moving speed of the driver bit follows the moving speed of the screw when the screw is fastened to the fastening target.

Furthermore, the present disclosure further relates to a fastening tool including: a bit holding portion which detachably holds a driver bit and is configured to rotate in a circumferential direction of the driver bit and move in an axial direction of the driver bit; a first motor configured to rotate the bit holding portion; a second motor configured to move the bit holding portion along the axial direction; and a control unit configured to control a position of the bit holding portion along the axial direction by the number of rotations of the second motor. The control unit controls a moving speed of the bit holding portion by rotation of the second motor with respect to a rotation speed of the first motor.

In the present disclosure, a moving speed of the driver bit is controlled in each of an operation of pressing the screw against the fastening target and an operation of fastening the screw to the fastening target.

The invention claimed is:
1. A fastening tool comprising:
a bit holding portion which detachably holds a driver bit and which is configured to rotate in a circumferential direction of the driver bit and move in an axial direction of the driver bit;
a first motor configured to rotate the bit holding portion;
a second motor configured to move the bit holding portion along the axial direction; and
a control unit configured to control a position of the bit holding portion along the axial direction by the number of rotations of the second motor, wherein
the control unit is configured to control a moving speed of a screw moved by rotation of the first motor or a rotation speed of the first motor,
the control unit is configured to control a moving speed of the bit holding portion moved by rotation of the second motor to follow the moving speed of a screw moved by being fastened to a fastening target by rotation of the first motor, and
the control unit is configured to calculate a moving speed of the bit holding portion based on a lead length of the screw.

2. The fastening tool according to claim 1, wherein
the control unit is configured to control a rotation speed of the second motor based on a rotation speed of the first motor, or control the rotation speed of the first motor based on the rotation speed of the second motor.

3. The fastening tool according to claim 1, wherein
the control unit controls the moving speed of the bit holding portion moved by rotation of the second motor to follow the moving speed of the screw moved by rotation of the first motor, when a load applied to the first motor or the second motor is detected.

4. The fastening tool according to claim 1, wherein
the control unit is configured to calculate the lead length of the screw using the number of rotations of the first motor or a movement amount of the bit holding portion measured after a load applied to the first motor or the second motor is detected, and calculate the moving speed of the bit holding portion based on the calculated lead length.

5. The fastening tool according to claim 1, further comprising:
a lead length setting portion configured to set the lead length, wherein
the control unit is configured to calculate the moving speed of the bit holding portion based on the lead length of the screw set by the lead length setting portion.

6. The fastening tool according to claim 1, wherein
the control unit is configured to control the moving speed of the bit holding portion moved by rotation of the second motor based on the rotation speed of the first motor.

7. The fastening tool according to claim 6, wherein
the control unit is configured to control the moving speed of the bit holding portion moved by rotation of the second motor based on a load applied to the first motor or the second motor.

8. The fastening tool according to claim 7, wherein
the control unit controls the second motor such that the load on the second motor falls within a range of specified values, after the load is detected.

9. The fastening tool according to claim 1, wherein
the control unit is configured to control the moving speed of the bit holding portion moved by rotation of the second motor based on a fluctuation in a power supply voltage.

* * * * *